United States Patent
Muthugopalakrishnan et al.

(10) Patent No.: US 10,796,347 B2
(45) Date of Patent: Oct. 6, 2020

(54) SYSTEM AND METHOD FOR CONTROLLING DISTRIBUTION OF ELECTRONIC COUPONS

(75) Inventors: Manickababu Muthugopalakrishnan, Fremont, CA (US); Nahrin Reihaneh, San Jose, CA (US); Durgamba Desaraju, Sunnyvale, CA (US); Steven R. Boal, Los Altos, CA (US)

(73) Assignee: QUOTIENT TECHNOLOGY INC., Mountain View, CA (US)

( * ) Notice: Subject to any disclaimer, the term of this patent is extended or adjusted under 35 U.S.C. 154(b) by 1996 days.

(21) Appl. No.: 12/016,160

(22) Filed: Jan. 17, 2008

(65) Prior Publication Data

US 2008/0215438 A1    Sep. 4, 2008

Related U.S. Application Data

(60) Provisional application No. 60/885,552, filed on Jan. 18, 2007.

(51) Int. Cl.
   *G06Q 30/04* (2012.01)
   *G06Q 30/02* (2012.01)

(52) U.S. Cl.
   CPC .......... *G06Q 30/04* (2013.01); *G06Q 30/0247* (2013.01); *G06Q 30/0277* (2013.01)

(58) Field of Classification Search
   CPC .................................................... G06Q 30/02
   USPC ........................................................ 705/14
   See application file for complete search history.

(56) References Cited

U.S. PATENT DOCUMENTS

| | | | |
|---|---|---|---|
| 4,723,212 A | 2/1988 | Mindrum et al. |
| 4,745,468 A | 5/1988 | Von Kohorn |
| 4,791,281 A | 12/1988 | Johnsen et al. |
| 4,876,592 A | 10/1989 | Von Kohrn |
| 4,882,675 A | 11/1989 | Nichtberger et al. |
| 4,896,791 A | 1/1990 | Smith |
| 4,910,672 A | 3/1990 | Off et al. |
| 4,926,255 A | 6/1990 | Von Kohorn |

(Continued)

FOREIGN PATENT DOCUMENTS

| | | |
|---|---|---|
| AU | 2006/294868 | 6/2011 |
| EP | 0 512 509 B1 | 11/1992 |

(Continued)

OTHER PUBLICATIONS

Microsoft, Configuring Account Lockout Policies, Feb. 1, 2001, https://technet.microsoft.com/en-us/library/dd277400.aspx, see sections Account Lockout Threshold and Reset Account Lockout Threshold After.*

(Continued)

*Primary Examiner* — Arthur Duran
(74) *Attorney, Agent, or Firm* — Hickman Palermo Becker Bingham LLP

(57) ABSTRACT

A system for displaying an advertisement from an advertisement database on a client computer on a network including a processing circuit configured to receive a display request for an advertisement, to determine an advertisement display limit and a number of times the advertisement has been displayed. The processing circuit is also configured to provide access to display the advertisement based on the advertisement display limit and the number of times the advertisement has been displayed.

25 Claims, 28 Drawing Sheets

(56) References Cited

U.S. PATENT DOCUMENTS

| | | |
|---|---|---|
| 4,949,256 A | 8/1990 | Humble |
| 5,034,807 A | 7/1991 | Von Kohorn |
| 5,056,019 A | 10/1991 | Schultz et al. |
| 5,057,915 A | 10/1991 | Von Kohorn |
| 5,128,752 A | 7/1992 | Von Kohrn |
| 5,227,874 A | 7/1993 | Von Kohrn |
| 5,245,533 A | 9/1993 | Marshall |
| 5,249,044 A | 9/1993 | Von Kohrn |
| 5,283,731 A | 2/1994 | Lalonde |
| 5,283,734 A | 2/1994 | Von Kohorn |
| 5,285,278 A | 2/1994 | Holman |
| 5,287,181 A | 2/1994 | Holman |
| 5,305,195 A | 4/1994 | Murphy |
| 5,305,197 A | 4/1994 | Axler et al. |
| 5,353,218 A | 10/1994 | De Lapa et al. |
| 5,361,871 A | 11/1994 | Gupta |
| 5,368,129 A | 11/1994 | Von Kohorn |
| 5,380,991 A | 1/1995 | Valencia et al. |
| 5,401,946 A | 3/1995 | Weinblatt |
| 5,420,606 A | 5/1995 | Begum |
| 5,459,306 A | 10/1995 | Stein et al. |
| 5,483,049 A | 1/1996 | Schulze, Jr. |
| 5,488,423 A | 1/1996 | Walkingshaw et al. |
| 5,502,636 A | 3/1996 | Clarke |
| 5,504,519 A | 4/1996 | Remillard |
| 5,508,731 A | 4/1996 | Von Kohorn |
| 5,509,070 A | 4/1996 | Schull |
| 5,528,490 A | 6/1996 | Hill |
| 5,500,681 A | 9/1996 | Jones |
| 5,557,721 A | 9/1996 | Fite et al. |
| 5,594,910 A | 1/1997 | Filepp |
| 5,612,527 A | 3/1997 | Ovadia |
| 5,636,346 A | 6/1997 | Saxe |
| 5,642,485 A | 6/1997 | Deaton |
| 5,604,542 A | 8/1997 | Dedrick |
| 5,687,322 A | 11/1997 | Deaton et al. |
| 5,697,844 A | 12/1997 | Van Kohorn |
| 5,708,782 A | 1/1998 | Larson et al. |
| 5,710,884 A | 1/1998 | Dedrick |
| 5,710,886 A | 1/1998 | Christensen et al. |
| 5,713,795 A | 2/1998 | Von Kohorn |
| 5,715,314 A | 2/1998 | Payne |
| 5,724,521 A | 3/1998 | Dedrick |
| 5,759,101 A | 6/1998 | Von Kohorn |
| 5,761,648 A | 6/1998 | Golden et al. |
| 5,761,683 A | 6/1998 | Logan et al. |
| 5,774,869 A | 6/1998 | Toader |
| 5,791,991 A | 8/1998 | Small |
| 5,794,210 A | 8/1998 | Goldhaber et al. |
| 5,821,512 A | 10/1998 | O'Hagan et al. |
| 5,822,735 A | 10/1998 | De Lapa et al. |
| 5,845,302 A | 12/1998 | Cyman, Jr. |
| 5,848,396 A * | 12/1998 | Gerace ............. 705/10 |
| 5,855,007 A | 12/1998 | Jovicic |
| 5,884,033 A | 3/1999 | Duvall |
| 5,903,874 A | 5/1999 | Leonard et al. |
| 5,907,830 A | 5/1999 | Engel et al. |
| 5,909,549 A | 6/1999 | Compliment |
| 5,916,024 A | 6/1999 | Von Kohorn |
| 5,918,211 A | 6/1999 | Sloane |
| 5,918,213 A | 6/1999 | Bernard et al. |
| 5,969,678 A | 10/1999 | Stewart |
| 5,970,469 A | 10/1999 | Scroggie et al. |
| 5,979,757 A | 11/1999 | Tracy et al. |
| 6,002,771 A | 12/1999 | Nielsen |
| 6,006,269 A | 12/1999 | Phaal |
| 6,009,411 A | 12/1999 | Kepecs |
| 6,009,441 A | 12/1999 | Kepecs |
| 6,014,634 A | 1/2000 | Scroggie et al. |
| 6,018,748 A | 1/2000 | Smith |
| 6,041,309 A | 3/2000 | Laor |
| 6,045,310 A | 4/2000 | Kamakura et al. |
| 6,055,510 A | 4/2000 | Henrick et al. |
| 6,075,971 A | 6/2000 | Williams et al. |
| 6,129,276 A | 10/2000 | Jelen et al. |
| 6,134,532 A | 10/2000 | Lazarus et al. |
| 6,175,823 B1 | 1/2001 | Van Dusen |
| 6,185,541 B1 | 2/2001 | Scroggie |
| 6,226,098 B1 | 5/2001 | Kulakowski et al. |
| 6,278,979 B1 | 8/2001 | Williams |
| 6,292,786 B1 | 9/2001 | Deaton et al. |
| 6,298,329 B1 | 10/2001 | Walker et al. |
| 6,298,446 B1 | 10/2001 | Schreiber et al. |
| 6,321,208 B1 | 11/2001 | Barnett et al. |
| 6,332,127 B1 | 12/2001 | Bandera et al. |
| 6,336,099 B1 | 1/2002 | Barnett et al. |
| 6,360,254 B1 | 3/2002 | Linden et al. |
| 6,337,935 B1 | 4/2002 | Deaton et al. |
| 6,377,986 B1 | 4/2002 | Philyaw et al. |
| 6,385,591 B1 | 5/2002 | Mankoff |
| 6,408,286 B1 | 6/2002 | Heiden |
| 6,418,472 B1 | 7/2002 | Mi et al. |
| 6,434,530 B1 | 8/2002 | Sloane et al. |
| 6,484,939 B1 | 11/2002 | Blaeuer |
| 6,615,179 B1 | 9/2003 | McNicol et al. |
| 6,638,316 B1 | 10/2003 | Tyler et al. |
| 6,687,346 B1 | 2/2004 | Serbin et al. |
| 6,721,804 B1 | 4/2004 | Rubin et al. |
| 6,862,575 B1 | 3/2005 | Anttila et al. |
| 6,892,180 B1 | 5/2005 | Pointeau et al. |
| 6,915,271 B1 | 7/2005 | Meyer et al. |
| 7,032,030 B1 | 4/2006 | Codignotto |
| 7,089,195 B2 * | 8/2006 | Rosenberg ............. 705/14.69 |
| 7,231,357 B1 | 6/2007 | Shanman et al. |
| 7,734,621 B2 | 6/2010 | Weitzman et al. |
| 7,784,702 B2 | 8/2010 | Michels |
| 7,933,984 B1 * | 4/2011 | Smith et al. ............. 709/224 |
| 7,962,931 B2 | 6/2011 | Bova |
| 8,000,496 B2 | 8/2011 | Keswanie et al. |
| 8,055,642 B2 | 11/2011 | Boal et al. |
| 8,165,078 B2 | 4/2012 | Walsh et al. |
| 2001/0001445 A1 | 5/2001 | Barnett |
| 2001/0014868 A1 | 8/2001 | Herz et al. |
| 2002/0073046 A1 | 6/2002 | David |
| 2002/0107738 A1 | 8/2002 | Beach et al. |
| 2002/0138345 A1 | 9/2002 | Dickson et al. |
| 2002/0143612 A1 | 10/2002 | Barik et al. |
| 2002/0178051 A1 | 11/2002 | Golden et al. |
| 2002/0184088 A1 * | 12/2002 | Rosenberg ............. 705/14 |
| 2002/0194069 A1 | 12/2002 | Thakur et al. |
| 2003/0083931 A1 | 5/2003 | Lang |
| 2003/0093314 A1 | 5/2003 | Leung |
| 2003/0097593 A1 | 5/2003 | Sawa et al. |
| 2003/0117635 A1 | 6/2003 | Roberts |
| 2003/0130889 A1 | 7/2003 | Fravel |
| 2003/0200146 A1 | 10/2003 | Levin et al. |
| 2004/0030598 A1 | 2/2004 | Boal |
| 2004/0039704 A1 | 2/2004 | Gilliam et al. |
| 2004/0088218 A1 | 5/2004 | Abraham |
| 2004/0098304 A1 | 5/2004 | Truong et al. |
| 2004/0137886 A1 | 7/2004 | Ross et al. |
| 2004/0141611 A1 | 7/2004 | Szrek et al. |
| 2004/0143502 A1 | 7/2004 | McClung |
| 2004/0193487 A1 | 9/2004 | Purcell et al. |
| 2004/0230476 A1 * | 11/2004 | Messer ............. 705/10 |
| 2004/0230485 A1 | 11/2004 | Barnett et al. |
| 2004/0236702 A1 | 11/2004 | Fink |
| 2005/0149404 A1 | 7/2005 | Barnett |
| 2005/0149613 A1 | 7/2005 | Amjadi |
| 2005/0239448 A1 | 10/2005 | Bayne |
| 2005/0262005 A1 | 11/2005 | Woolston |
| 2005/0267804 A1 | 12/2005 | Lonsbury et al. |
| 2006/0026067 A1 | 2/2006 | Nicholas et al. |
| 2006/0074756 A1 | 4/2006 | Boykin |
| 2006/0122883 A1 | 6/2006 | Lynn |
| 2006/0136294 A1 | 6/2006 | Linden et al. |
| 2006/0143307 A1 | 6/2006 | Codignotto |
| 2006/0143477 A1 | 6/2006 | Stevens |
| 2006/0212350 A1 | 9/2006 | Ellis et al. |
| 2006/0224457 A1 * | 10/2006 | Rosenberg ............. 705/14 |
| 2007/0033106 A1 * | 2/2007 | Mason ............. 705/14 |
| 2007/0073579 A1 * | 3/2007 | Immorlica et al. ............. 705/14 |
| 2007/0073690 A1 | 3/2007 | Boal |
| 2007/0150452 A1 | 6/2007 | Tsurumaki et al. |

(56) References Cited

U.S. PATENT DOCUMENTS

| | | | |
|---|---|---|---|
| 2007/0156528 A1 | 7/2007 | Hopp et al. | |
| 2007/0244745 A1 | 10/2007 | Boal | |
| 2007/0255821 A1 | 11/2007 | Ge | |
| 2007/0262860 A1 | 11/2007 | Salinas | |
| 2007/0288313 A1 | 12/2007 | Brodson et al. | |
| 2007/0293200 A1 | 12/2007 | Roundtree et al. | |
| 2008/0065485 A1 | 3/2008 | Hammond et al. | |
| 2008/0097844 A1 | 4/2008 | Hsu et al. | |
| 2008/0162200 A1* | 7/2008 | O'Sullivan et al. | 705/7 |
| 2008/0163128 A1* | 7/2008 | Callanan et al. | 715/856 |
| 2008/0177603 A1 | 7/2008 | Muthogopalakrishnan | |
| 2008/0183576 A1 | 7/2008 | Kim et al. | |
| 2008/0208688 A1 | 8/2008 | Byerley et al. | |
| 2008/0215438 A1 | 9/2008 | Muthugopalakrishnan et al. | |
| 2008/0267500 A1 | 10/2008 | Keswani et al. | |
| 2009/0070207 A1 | 3/2009 | Engel et al. | |
| 2009/0216643 A1 | 8/2009 | Yamada | |
| 2009/0259535 A1 | 10/2009 | Chow | |
| 2009/0287558 A1 | 11/2009 | Seth et al. | |
| 2009/0307066 A1 | 12/2009 | Lonsbury et al. | |
| 2009/0307076 A1 | 12/2009 | Muthogopalakrishnan | |
| 2010/0042490 A1 | 2/2010 | Boal | |
| 2010/0057549 A1 | 3/2010 | Boal | |
| 2010/0094689 A1 | 4/2010 | Fodor | |
| 2010/0124235 A1 | 5/2010 | Walsh et al. | |
| 2010/0174598 A1 | 7/2010 | Khan et al. | |
| 2010/0205059 A1* | 8/2010 | Yehoshua et al. | 705/14.55 |
| 2010/0241494 A1 | 9/2010 | Kumar et al. | |
| 2011/0093318 A1 | 4/2011 | Guday et al. | |
| 2011/0106598 A1 | 5/2011 | McCann et al. | |
| 2011/0153410 A1 | 6/2011 | Muthugopalakrishnan et al. | |
| 2017/0323303 A1 | 11/2017 | Muthu | |

FOREIGN PATENT DOCUMENTS

| | | |
|---|---|---|
| JP | 2002/298052 A | 10/2002 |
| JP | 2007287067 A | 11/2007 |
| JP | 2009169766 A | 7/2009 |
| KR | 20090052846 A | 5/2009 |
| WO | WO 95/01060 | 1/1995 |
| WO | WO 97/23838 | 7/1997 |
| WO | WO 00/60517 | 10/2000 |
| WO | WO 02/095535 A2 | 11/2002 |
| WO | WO 2007/048063 A2 | 4/2007 |
| WO | WO 01/16853 A1 | 3/2011 |

OTHER PUBLICATIONS

International Searching Authority, "Notification concerning transmittal of international preliminary report on patentability and Written Opinion", international application No. PCT/US2008/051345, dated Nov. 26, 2009, 12 pages.
Claims, international application No. PCT/US2008/051345, 5 pages.
European Office Action received in Application No. 08705982.0 dated Dec. 29, 2010, (4 pages).
Current Claims of European Application No. 08705982.0, (5 pages).
Canadian Office Action received in Canadian application No. 2,644,904 dated Jan. 31, 2011 (2 pages).
Current Claims of Canadian application No. 2,644,904 dated Jan. 2011 (7 pages).
"Acu-Trac and Cox Launch Interactive Couponing Service," Electronic Marketplace Report, IAC Newsletter Database, Information Access Company, Mar. 21, 1995, 2 pages.
Douglass, "Cruising for Food Savings on Internet," The San Diego Union-Tribune, Apr. 20, 1996, Section: Business, p. C1, 2 pages.
Freitag, "In this Computer Age, Who Needs Coupons?," The New York Times, Jun. 15, 1989—p. A1 (2 pages).
Graham, I., "The HTML Sourcebook, $2^{nd}$ edition, A Complete Guide to HTML 3.0", Wiley Publishing Company, 1996, pp. 233-234.
ImageSafe, "ImageSaft-Image copy protection," undated, 3 pages. http://www.cellspark.com/imagesafe.html.

Spethmann, "Coupons Shed Low-Tech Image," Brandweek, Oct. 24, 1994, pp. 30-31. http://login.vnuemedia.com/bw/esearch/article_display.jsp?vnu_content_id=546705.
Sutherland, "Promotion Profile," Marketing & Media Decisions, vol. 24, No. 10, Oct. 1989, pp. 103(1).
Tanner, "A New Dimension in Marketing", Progressive Grocer, May 1987, pp. 133, 134 & 136.
"Tracking Shoppers with Personal Bar Codes," The New York Times, Jun. 18, 1989.
Wilkies, "Catalina, Coupons Online in Tests," Advertising Age, Aug. 28, 1995, p. 15.
Anderson, "CoolSavings.com Settles Patent-Infringement Suit," The Industry Standard Magazine, Jan. 13, 2000, 2 pages. http://archves.cnn.com/2000/TECH/computing/04/03/coupon.patent.idg/index.html.
Anderson, "Online-coupon companies battle over patents," CNN.com—Technology, Apr. 3, 2000, 4 pages. http://web.archive.org/web/20010712032039/www.thestandard.com/article/0,1902,8853,00.html?.
Wolverton, "Coolsavings settles e-coupon patent dispute," CNET News, Jul. 10, 2000, 2 pages. http://news.cnet.com/Coolsavings-settles-e-coupon-patent-dispute/2100-1017_3-242969.html?tag=mncol.
Wolverton, "Coolsavings settle patent suit," CNET News, Dec. 13, 2000, 2 pages. http://news.cnet.com/Coolsavings-settles-patent-suit/2100-1017_3-249876.html?tag=mncol.
Canadian Patent Office, "Office Action", app. No. 2,644,904, dated Aug. 3, 2010, 2 pages.
Claims, Canadian app No. 2,644,904, 7 pages.
Microsoft Windows XP version 2002 screen shot showing controls disabled be admin (1 page).
Australian Patent Office, "Office Action" Application No. 2008206204, Applicant: Coupons.com, dated Jun. 17, 2011, 4 pages.
Current Claims in Application No. 2008206204, Applicant: Coupons.com, 2 pages, dated Jun. 2011.
Canadian Intellectual Property Office, "Office Action" in application No. 2,672,294, dated Sep. 6, 2013, 6 pages.
Current Claims in application No. 2,672,294, dated Sep. 2013, 7 pages.
U.S. Appl. No. 12/603,485, filed Oct. 21, 2009, Office Action, dated Jul. 7, 2014.
U.S. Appl. No. 12/821,095, filed Jun. 22, 2010, Final Office Action, dated Feb. 12, 2013.
Australian Office Action received in Application No. 2008249235 dated Sep. 21, 2011, 2 pages.
Australian Current Claims in Application No. 2008249235 dated Sep. 2011, 7 pages.
Current Claims in application No. 2,672,294, dated Feb. 2014, 7 pages.
Canadian Intellectual Property Office, "Examination Report" In application No. 2,672,294, dated Feb. 20, 2014, 3 pages.
International Searching Authority, Search Report and Written Opinion, in application No. PCT/US2011/029074 dated Jan. 10, 2013, 8 pages.
Current Claims in application No. PCT/US2011/029074, dated Jan. 2013, 6 pages.
European Patent Office, European Search Report, in application No. 09747527.1, dated Dec. 12, 2012, 6 pages.
Current Claims in application No. 09747527.1, dated Dec. 2012, 7 pages.
"Notification of Transmittal of the International Search Report and the Written Opinion of the International Searching Authority, or the Declaration" received in PCT Application No. PCT/US11/29074 dated Nov. 28, 2011 (13 pages).
Current Claims of PCT Application No. PCT/US11/29074 dated Nov. 2011 (6 pages).
Canadian Office Action received in Application No. 2,672,294 dated Dec. 5, 2011 (3 pages).
Current Claims of Canadian Application No. 2,672,294 dated Dec. 2011 (7 pages).
European Office Action received in Application No. 08170408.2 dated Dec. 8, 2011 (5 pages).

(56) References Cited

OTHER PUBLICATIONS

Current Claims of European Application No. 08170408.2 dated Dec. 2011 (5 pages).
Australian Office Action received in Application No. 2008249235 dated Jan. 4, 2012 (1 page).
Current Claims of Australian Application No. 2008249235 dated Jan. 2012 (6 pages).
European Patent Office, "Search Report" in application No. 11798528.3-1958, dated Mar. 13, 2014, 7 pages.
Current Claims in European application No. 11798528.3-1958, dated Mar. 2014, 5 pages.
IP Australia, "Patent Examination Report No. 1", in application No. 2009246344, dated Oct. 7, 2013, 4 pages.
Current Claims in application No. 2009246344, dated Oct. 2013, 6 pages.
U.S. Appl. No. 12/274,348, filed Nov. 19, 2008, Office Action, dated Oct. 25, 2011.
U.S. Appl. No. 11/372,243, filed Mar. 8, 2006, Office Action, dated Jun. 2, 2015.
U.S. Appl. No. 12/0106,165, filed Jan. 17, 2008, Office Action, dated Oct. 25, 2016.
U.S. Appl. No. 12/016,165, filed Jan. 17, 2008, Final Office Action, dated Jan. 31, 2015.
U.S. Appl. No. 12/016,165, filed Jan. 17, 2008, Office Action, dated Sep. 11, 2014.
U.S. Appl. No. 12/274,348, filed Nov. 19, 2008, Final Office Action, dated Sep. 17, 2010.
U.S. Appl. No. 12/274,348, filed Nov. 19, 2008, Interview Summary, dated Mar. 3, 2011.
U.S. Appl. No. 11/372,243, filed Mar. 8, 2006, Final Office Action, dated Sep. 23, 2015.
U.S. Appl. No. 12/821,096, filed Jun. 22, 2010, Final Office Action, dated Jun. 30, 2014.
U.S. Appl. No. 12/603,485, filed Oct. 21, 2009, Final Office Action, dated Nov. 14, 2014.
U.S. Appl. No. 12/603,485, filed Oct. 21, 2009, Office Action, dated Aug. 1, 2016.
U.S. Appl. No. 12/821,095, filed Jun. 22, 2010, Final Office Action, dated May 1, 2013.
U.S. Appl. No. 12/821,096, filed Jun. 22, 2010, Office Action, dated Nov. 8, 2012.
U.S. Appl. No. 12/821,096, filed Jun. 22, 2010, Restriciton Requirement, dated Sep. 19, 2012.
U.S. Appl. No. 12/821,096, filed Jun. 22, 2010, Final Office Action, dated Apr. 9, 2013.
U.S. Appl. No. 13/043,238, filed Mar. 8, 2011, Final Office Action, dated Jan. 29, 2016.
U.S. Appl. No. 13/043,238, filed Mar. 8, 2011, Office Action, dated Oct. 2, 2015.
U.S. Appl. No. 12/274,348, filed Nov. 19, 2008, Office Action, dated Apr. 14, 2010
Muthugopalakrishnan, U.S. Appl. No. 12/016,165, filed Jan. 17, 2008, Office Action, dated Feb. 10, 2017.
U.S. Appl. No. 13/043,238, filed Mar. 8, 2011, Notice of Allowance, dated Mar. 3, 2017.
Microsoft Windows Xp Version 2002, Screen Shot Showing Controls Disabled by admin, dated 2002, 1 page.
Muthu, U.S. Appl. No. 15/622,109, filed Jul. 27, 2017, Office Action, dated Sep. 30, 2019.

U.S. Appl. No. 13/043,238, filed Mar. 8, 2011, Examiner's Answer, dated Mar. 7, 2012.
U.S. Appl. No. 12/016,165, filed Jan. 17, 2008, Final Office Action, dated Nov. 28, 2011.
U.S. Appl. No. 12/465,634, filed May 13, 2009, Office Action, dated Dec. 1, 2011.
U.S. Appl. No. 12/274,348, filed Nov. 19, 2008, Notice of Allowance, dated Dec. 22, 2011.
U.S. Appl. No. 12/821,096, filed Jun. 22, 2010, Interview Summary, dated Mar. 11, 2014.
U.S. Appl. No. 12/603,485, filed Oct. 21, 2009, Final Office Action, dated Feb. 12, 2014.
U.S. Appl. No. 11/372,243, filed Mar. 8, 2006, Final Office Action, dated Mar. 26, 2014.
U.S. Appl. No. 12/603,485, filed Oct. 21, 2009, Office Action, dated Sep. 25, 2013.
U.S. Appl. No. 11/372,243, filed Mar. 8, 2006 Office Action, dated Nov. 1, 2013.
U.S. Appl. No. 12/968,031, filed Dec. 14, 2010, Office Action, dated Oct. 2, 2013.
Canadian Intellectual Property Office, "Search Report" in application No, 2,672,294, dated Mar. 31, 2015, 8 pages.
"Ukrop's Tests Data Base Marketing Program Electronic Couponing Tracks Buying Behavior of Valued Customers," Chain Store Age Executive, Sep. 1987, pp. 73-75.
Canadian Claims in application No. 2,672,294, dated Apr. 2016, 5 pages.
Canadian Claims in application No. 2,672,294, dated Aug. 28, 2015, 7 pages.
Canadian Claims in application No. 2,672,294, dated Dec. 2015, 4 pages.
Canadian Intellectual Property Office, "Search Report" in application No. 2,672,294, dated Apr. 18, 2016, 4 pages.
"Emaginet plans to 'push' its way into consumer mindest, pocketbook," Interactive Marketing News, vol. 4, No. 22, May 30, 1997, 2 pages.
Canadian Intellectual Property Office, "Search Report" in application No. 2,672,294, dated Dec. 16, 2015, 4 pages.
Web Design Help, vBulletin, Jelsoft Enterprises Ltd., Apr. 13-25, 2001, 7 pp.
Claims in Canadian Application No. 2,672,294, dated Mar. 2015, 7 pages.
Lemay, Laura, "Teach Yourself Web Publishing with HTML 3.0 in a Week", Sams Publishing, 1996, pp. 183.
Lindholm and Yellin, "The Java Virtual Machine Specification, Second Edition", Addison-Wesley, 1997-1999, pp. 269-270.
Purdue News, "New software protects ownership of Web images", Purdue News Service, Nov. 1998, 4 pp.
Robichaux, "Device That Delivers Discount Coupons Via TV Screen Is Set by Acu-Trac, Cox", Wall Street Journal, Oct. 4, 1994, p. B9.
Schneier, Bruce, "Applied Cryptography, Second Edition", John Wiley & Sons, Inc., 1996, pp. 357-368.
Canadian Intellectual Property Office, "Search Report" in application No. 2,672,294, dated Aug. 28, 2015, 10 pages.
U.S. Appl. No. 12/821,095, filed Jun. 22, 2010, Office Action, dated Sep. 5, 2012.
U.S. Appl. No. 12/821,096, filed Jun. 22, 2010, Office Action, dated Dec. 3, 2013.
U.S. Appl. No. 11/372,243, filed Mar. 8, 2006, Office Action, dated Jun. 19, 2013.

\* cited by examiner

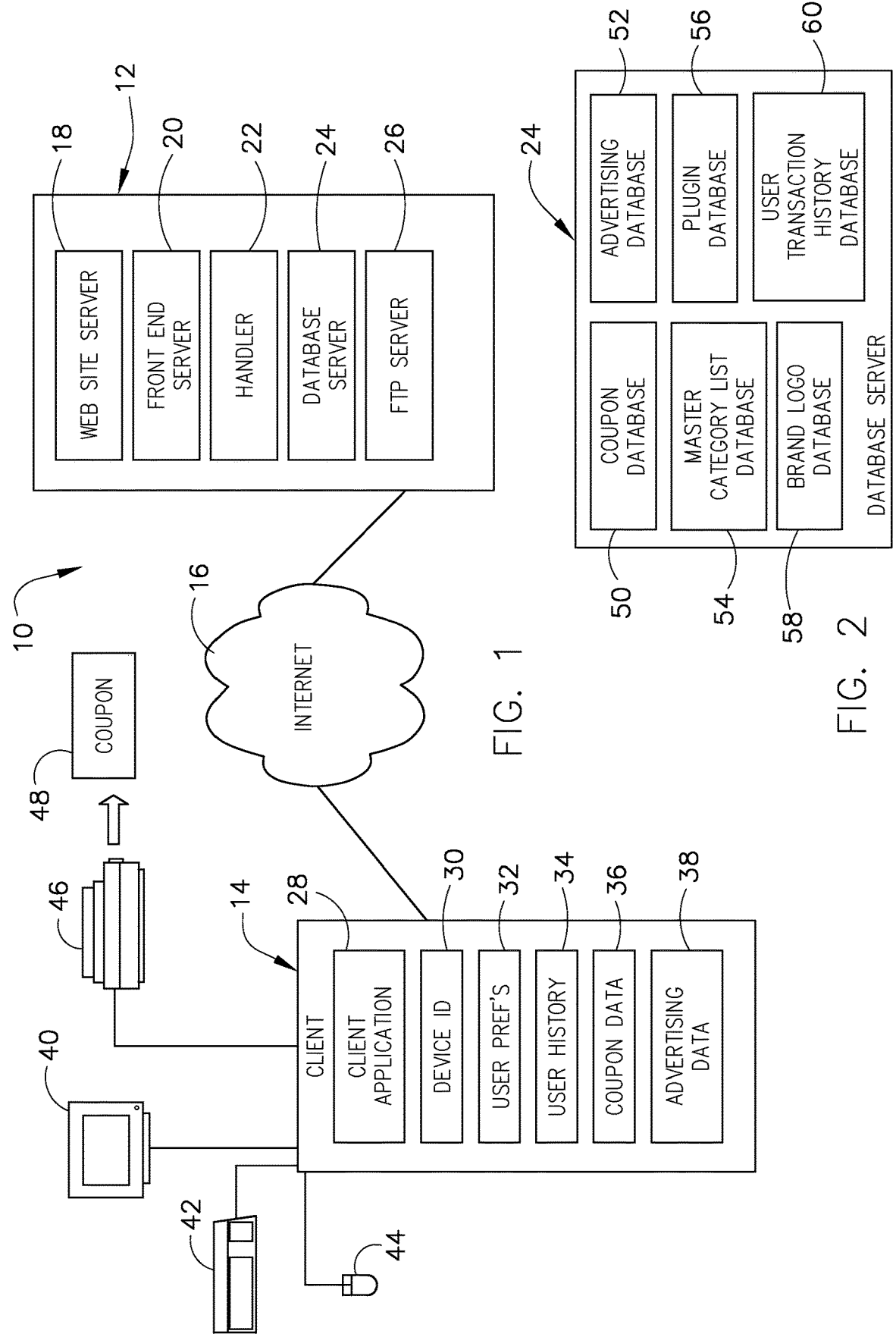

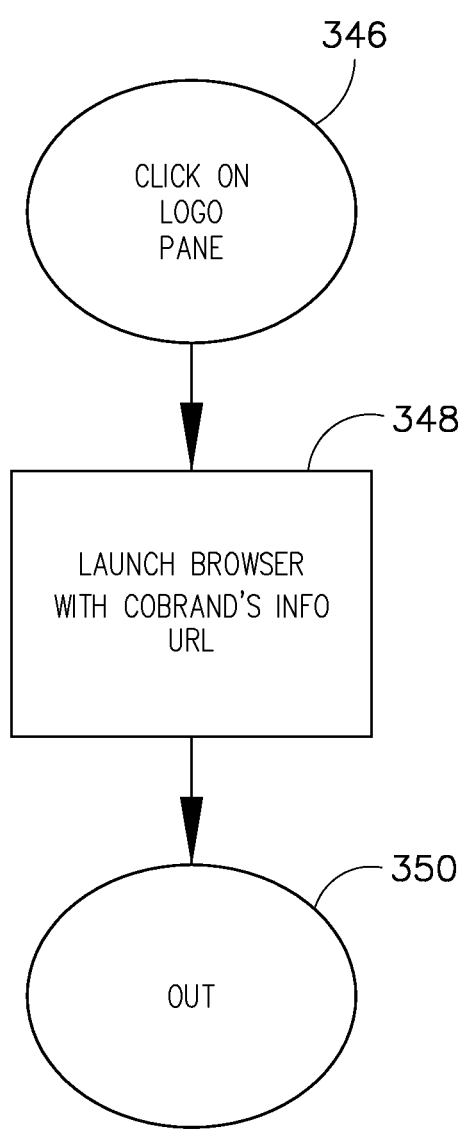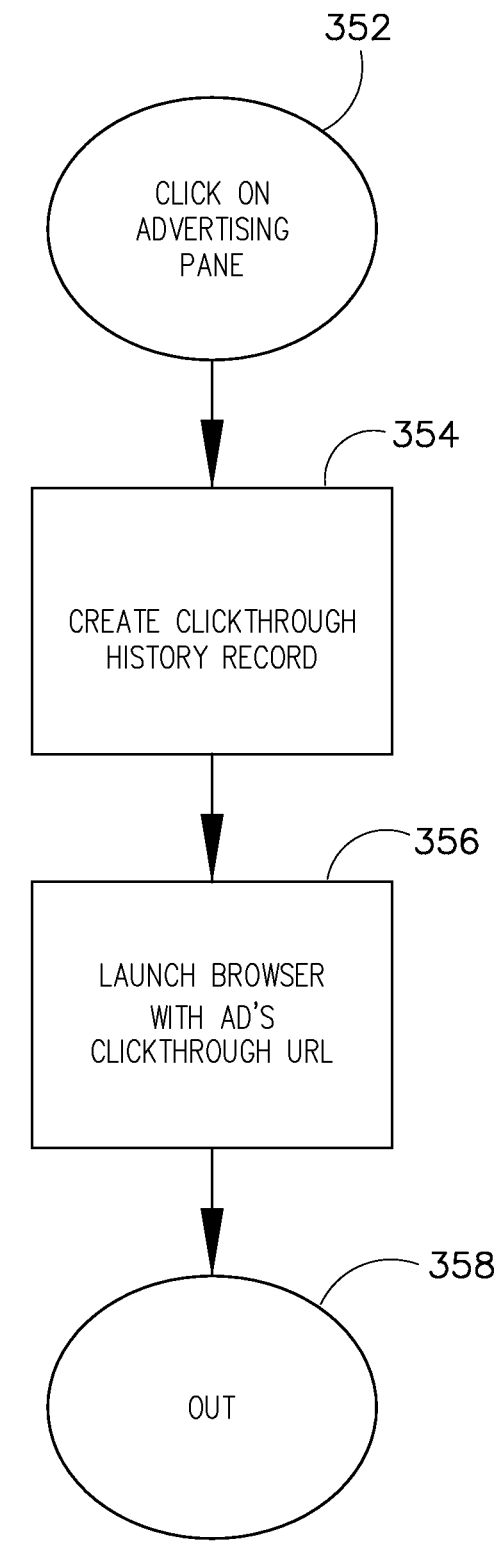

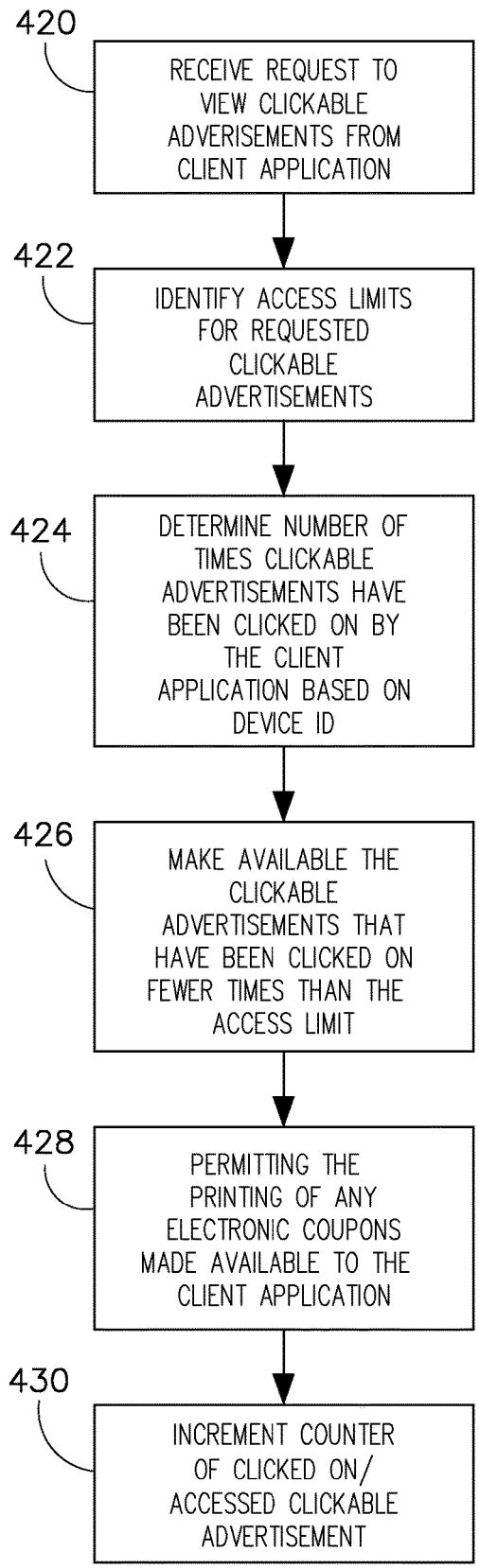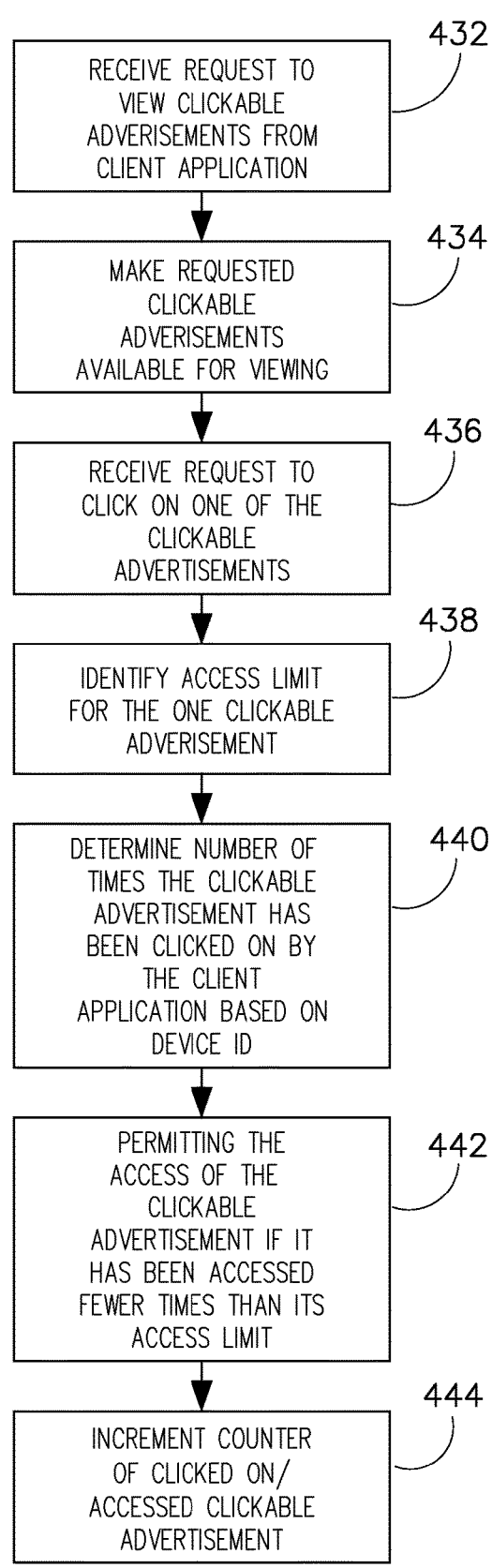

SYSTEM AND METHOD FOR CONTROLLING DISTRIBUTION OF ELECTRONIC COUPONS

CROSS-REFERENCE TO RELATED PATENT APPLICATIONS

This application claims the benefit of and priority to U.S. Provisional Patent Application Ser. No. 60/885,552, filed Jan. 18, 2007, entitled "System and Method for Controlling Distribution of Electronic Coupons", which is hereby expressly incorporated by reference.

BACKGROUND

The present disclosure relates generally to online systems and, more particularly, to a system and method for managing clickable advertisements and controlling the distribution of electronic coupons.

Pay per click advertising is an arrangement in which webmasters (operators of web sites), acting as publishers, display clickable advertisements from advertisers, in exchange for a charge per click. In this arrangement, click fraud is a significant problem and continues to create uncertainty in the online advertisement business. Click fraud increases expenses, decreases the credibility of the online advertisement infrastructure, and wastes management resources.

Examples of click fraud are in a pay per click online advertising system when a person, automated script, or computer program imitates a legitimate user of a web browser clicking on an ad for the purpose of generating a charge per click without having actual interest in the target of the ad's link.

Time and resources are also wasted in the distribution of electronic coupons. Every year, several hundred billion coupons are circulated in the United States. Nearly all are distributed using traditional "scatter gun" approaches, such as those included in Sunday circulars and direct mailings. However, consumers waste time clipping coupons that expire, or accumulate for years in undesirable places, such as kitchen drawers. Moreover, such traditional methods of coupon distribution do not effectively reach the ever increasing group of consumers that use public computer networks, such as the World Wide Web portion of the Internet (the "web").

One approach taken in response to these and other shortcomings involves providing for coupon delivery over the Internet, as seen by reference to U.S. Pat. No. 5,855,007 entitled "Electronic Coupon Communication System" issued to Jovicic et al. Jovicic et al. disclose a system for generating and redeeming unique product discount coupons over public computer networks such as the Internet. Jovicic et al., further disclose that the user of such a system must be registered in order to obtain the coupons, wherein registration requires the user to provide information sufficient to specifically identify a user, such as the user's name, address, Internet e-mail address, identification number, and the like. Jovicic et al., further disclose an Internet coupon server and a user display terminal in communication therewith. Once a displayed electronic coupon is selected by the user, the coupon server sequentially transmits the coupon's digital data pattern to the user's printing device. There are, however, numerous shortcomings to the system disclosed in Jovicic et al., as well as other systems, such as that disclosed in U.S. Pat. No. 5,761,648 to Golden et al.

BRIEF DESCRIPTION OF THE DRAWINGS

FIG. 1 is a diagrammatic and block diagram view of an electronic coupon distribution system, according to an exemplary embodiment;

FIG. 2 is a simplified block diagram showing, in greater detail, a database server portion of the main server system shown in FIG. 1;

FIGS. 22-23 are simplified flowchart diagram views showing alternate actions taken by the client system in response to selection by the user of a logo pane and an advertising pane, respectively, according to exemplary embodiments;

FIGS. 27A and 27B are flow diagrams of processes for controlling the number of clicks to a clickable advertisement, according to exemplary embodiments;

DETAILED DESCRIPTION OF THE EXEMPLARY EMBODIMENTS

Figures 3A, 3B:
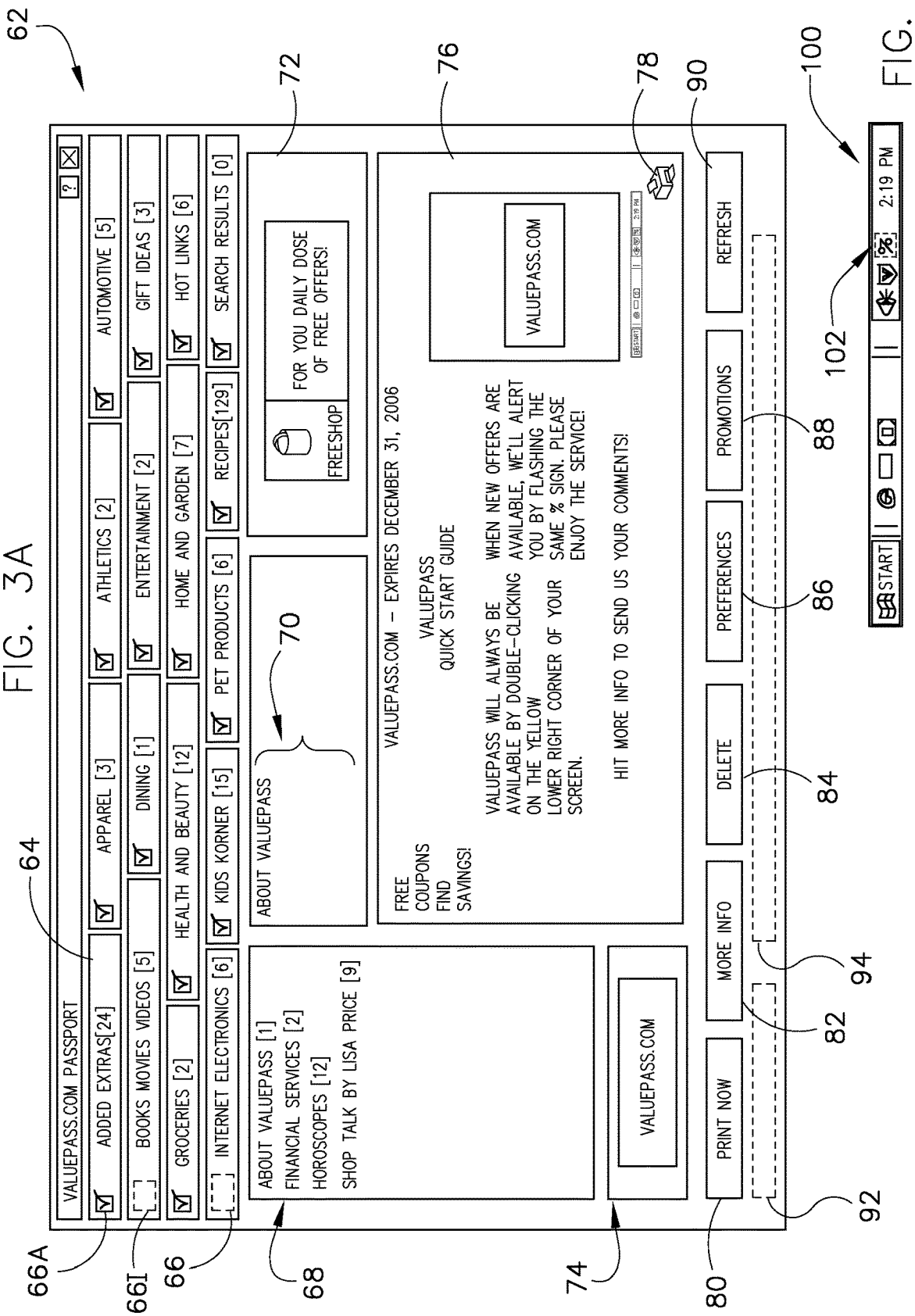
FIGS. 3A-3B illustrate a screen display defining an interface associated with a client system portion, according to an exemplary embodiment.

Referring now to the drawings wherein like reference numerals are used to identify identical components in the various views, FIG. 1 shows an electronic coupon distribution system 10 in accordance with an exemplary embodiment. Electronic coupon distribution system 10 includes a main server system 12 and a client system 14 that is remote from main server system 12, connected together by a distributed computer network, such as the Internet 16. A user desiring to obtain electronic coupons uses client system 14 to interact with main server system 12 to obtain electronic coupons. An electronic coupon may be but is not limited to any advertisement that is electronic (e.g., electronic advertisement on website, electronic advertisement sent to client device, a hyper link based on a search result from a search engine or any other push/pull techniques).

Main server system 12 is configured to be connected to, or otherwise receive, coupon information from the issuer of such coupons (i.e., the coupon's sponsor). Although not shown, this function may be performed by a direct electronic connection with a sponsor system, or may involve loading data from a physically transportable data storage medium (e.g., diskette, tape, CD-ROM, etc.). The coupon sponsor may, and in most cases will, issue in connection with the coupon an associated set of instructions that define how the coupon is to be distributed. For example, such instructions may include restrictions as to the number of coupons that any one user may print out for redemption, the state and/or zip code associated with a user for such user to have access to the coupon, the expiration date, the item and discount amount, etc. Main server system 12 is further configured to be connected to, or otherwise receive, advertising information from an advertising sponsor. Although not shown, this function may be performed by direct electronic connection with the ad sponsor's system, or may involve loading data from a physically transportable data storage medium (i.e., diskette, tape, CD-ROM, etc.). The advertising impressions are displayed on client system 14, as described in greater detail below.

Main server system 12 may include a website server 18, a front-end server 20, a handler 22, a database server 24, and an FTP server 26.

Website server 18 is configured to provide "web pages" to consumers (including possible users of electronic coupon distribution system 10) with Internet access. Internet 16, more particularly, the World Wide Web portion thereof, "WWW", is an interconnected computer network that is generally distributed throughout the world on discrete interconnected computer nodes having software interfaces generally referred to as "web pages." Access to Internet 16 can be made by various methods; typically, however, a non-institutional user obtains access from one of a plurality of Internet Service Providers (ISPs), which in turn obtain authorized access to Internet 16. Navigation on the WWW portion of Internet 16 involves knowledge of a directory structure of various nodes of the Internet (i.e., an "address" to each given resource on Internet 16). Such an address is generally referred to as a Uniform Resource Locator (URL), which typically starts with a protocol name followed by a domain name, for example: http://www.valuepass.com. Website server 18 is configured to provide, among other things, an interface for effecting a download of client software that a consumer may download and execute to establish a client system 14 on his or her computer system. In this way the consumer may become an authorized user ("user") of electronic coupon distribution system 10. In particular, website server 18 may refer an Internet consumer to FTP server 26 for the client installation file.

Front-end server 20 provides multiple interface and allocation/direction features for electronic coupon distribution system 10. Front-end server 20 is the entity that is initially contacted by client system 14 at the start of each new session of electronic coupon distribution system 10, or when automatic coupon updates occur.

Handler 22 is configured to interface with database server 24. After a new session is established by a user, all subsequent requests by client system 14 may be directed to and are "handled" by handler 22. As a result, handler 22 may thereafter issue a request or a command to database server 24, or directly respond to client system (if configured to do so).

Database server 24 may comprise a plurality of physical, individual general purpose digital computers configured as database servers, which may be further configured in a cluster arrangement. Database server 24, in one embodiment, may be configured to operate using SQL server software, such as Microsoft SQL Server Version 7, commercially available from, for example, Microsoft Corporation, Redmond, Wash., U.S.A.

FTP server 26 may be configured to operate in cooperation with website server 18 to provide, for example, installation or setup programs. The installation program(s) are downloaded to a general-purpose computer (e.g., PC or a MAC) for installation of the client software in accordance with the present disclosure.

Client system 14 includes client application software 28, DeviceID data 30 (ID) data 30, user preference data 32, user history data 34, coupon data 36, and advertising data 38. In addition, client system 14 may comprise a general purpose computing apparatus configured to operate in accordance with an operating system having a graphical user interface, such as, for example, Windows 95/98/NT 4.0, and Apple Computer, Inc.'s. MAC OS Operating System for Macintosh platforms. Client system 14 may further include standard peripherals such as a display device 40, a keyboard 42, a pointing device, such as a mouse 44, and an output device, such as a printer 46, for producing a "hard copy" of a coupon 48. DeviceID data 30 may be stored on main server system 12, according to an exemplary embodiment. In exemplary embodiments, one, a few, a plurality or all DeviceID data 30 may be stored on main server system 12.

Client application software 28 comprises software compatible with and executing on client system 14 configured to implement the present disclosure as described herein. Client application software 28 performs various functions including, but not limited to, collecting user information, including preferences, communicating with main server system 12 via Internet 16, and providing an interface for the user for browsing through, and selecting, coupons for printout.

DeviceID data 30 may comprise a multi-digit number that is assigned by main server system 12, more particularly, database server 24, when a user registers with electronic coupon distribution system 10. DeviceID data 30 may have a format, such as XXXXXXXX, where X is a digit between 0-9. DeviceID data 30, however, does not specifically identify the user personally, but rather, more accurately associates a physical machine defining client system 14 with user profile information obtained during registration. DeviceID data 30 is stored on client system 14, main server system 12, or both as a part of a UserInfo object. If the DeviceID data 30 is stored on client system 14, then DeviceID data 30 is provided to main server system 12 when making requests, for example, for new coupon data. If a client system 14 operates multiple independent operating systems (e.g., a Mac operating system (a product of Apple Computer, Inc.) and a Windows operating system (a product of Microsoft Corp.)), then there can be a separate DeviceID data 30 for each operating system assigned to that client system 14. Main server system 12 can correlate the provided DeviceID data 30 with user information stored in a profile database. The user information may then be used in identifying coupons suitable for the user. In this embodiment, however, the user is not personally identified nor is it even possible (e.g., through the "hacking" of main server system 12) to identify the user personally, as such information is not even collected from the user. Accordingly, the approach described herein maintains privacy of the user of electronic coupon distribution system 10.

The UserInfo object further includes user information collected from the user of client system 14 indicative of one or more demographic characteristics of the user. In this embodiment, the user information is insufficient to specifically identify the user. In a constructed embodiment, such information comprises a postal zip code associated with the user, and a state in which the user resides. Client application software 28 allows the user to update this information after initial registration. In addition, the UserInfo object includes the mode in which the Internet is accessed, for example, through use of a modem (e.g., dial-up), through use of a Local Area Network (LAN), or use of a proxy server. The UserInfo object may further include the version number of the client application software 28.

User preference data 32 comprises two main groups. The first group of information contained in user preference data 32 includes information defining how often the main server system 12 is checked for new coupons. In a constructed embodiment, the options include one hour, two hours, four hours (the default), twice a day, and once a day. The first group of information contained in user preference data 32 may also include a miscellaneous item of information indicating whether the user prefers that certain coupons be automatically printed (this may be selected or deselected by the user). The second main group of information included in user preference data 32 includes a comprehensive listing of main categories of coupons selected by the user that the user wishes to receive. While the particular main coupon category descriptions may be changed on main server system 12 and downloaded to client system 14 at any time, exemplary categories include "Apparel", "Athletics", "Automotive", and "Internet Electronics", among others. A user can deselect a category, in which case coupons pertaining to that category will not be sent from main server system 12 to client system 14.

User history data 34 comprises data corresponding to events occurring at the remote client system 14, as well as other items pertaining to the operation of client system 14. All these items are stored in a user history file. For example, when a user is browsing through available coupons, each coupon that is selected for viewing is noted in the user history file. Likewise, when a coupon is selected for printing, that action is also recorded in the user history file. Other examples include when a coupon is actually printed, and when an advertising impression (described in further detail below) is displayed on display device 40. The information contained in the user history data 34 is encrypted by client application software 28 in accordance with a client system encryption strategy to protect the integrity of the data contained therein. The contents of the user history data 34 will be described and illustrated in greater detail in connection with FIG. 17.

Coupon data 36 includes information corresponding to the electronic coupons available (e.g., for browsing) on client system 14. Each electronic coupon, such as coupon 48, includes a plurality of items of information associated therewith.

Therefore, a structure is defined for each electronic coupon having the items of information set forth in Table 1 below.

TABLE 1

Electronic Coupon Data Structure

1. Electronic Coupon Sponsor Name
2. Product or Service Description
3. Savings or Discount Amount
4. The Number of Electronic Coupons Available for Printout
5. The Number of Electronic Coupons Printed Out Thus Far
6. Expiration Date
7. Optional Text/Image(S)
8. Coupon Identification Number In addition, when coupon 48 is actually printed out, additional information may be printed out on the "hard copy" of the electronic coupon. These additional items may include the DeviceID data 30, portions of the demographic data such as the postal zip code, one or more items of the user information contained in user preference data 32, the date and time, and optionally various Internet URLs. Coupon sponsors have found some of the information appearing on printed coupon 48 desirable. That is, when the user redeems coupon 48, for example, at a retail store, information appearing on coupon 48 (which is eventually returned by the retailer to the coupon issuer or sponsor) is available to the coupon sponsor. This information may thereafter be used in analyzing and assessing the efficacy of various advertising/promotional strategies. Coupon data 36 may be stored on a hard drive or the like associated with client system 14, and is preferably stored in an encrypted form. In particular, and in accordance with the present disclosure, coupon data 36 corresponding to electronic coupons is encrypted by main server system 12 in accordance with a server system encryption strategy. The encrypted coupon data is then transmitted to client system 14. Client system 14 further encrypts the once-encrypted coupon data in accordance with a client system encryption strategy to thereby generate doubly encrypted coupon data. The doubly encrypted coupon data 36 may then be stored on the client system 14. The foregoing encryption steps substantially minimize the occurrence of fraud in the distribution of electronic coupons compared to known systems. A user, for example, can therefore not easily defeat the coupon counting scheme that limits the number of printouts by, for example, exploring the client system's hard drive, identifying coupon data, and thereafter producing printed copies of the coupons. Use of the environment established by client application software 28 is therefore practically the only means for the user to obtain usable coupons 48.

Advertising data 38 comprises a plurality of advertising impressions wherein each impression may include a predetermined combination of text and images. Advertising data 38 is also stored on client system 14 in an encrypted form.

Display device 40, keyboard 42, mouse 44, and printer 46 may comprise an apparatus known to those of ordinary skill in the art.

FIG. 2 shows, in greater detail, database server 24 of main server system 12. As described above, database server 24 may comprise a plurality of physical database servers arranged in a cluster. Further physical machines may be added to provide for load balancing (i.e., scalability, and the ability to quickly add additional hardware as load and responsiveness criteria require). Database sever 24 may include a coupon database 50, an advertising database 52, a master category list master category list database 54, a plugin database 56, a brand logo database 58, and a user transaction history database 60.

Coupon database 50 includes coupon data similar to that described in connection with coupon data 36, but is more in the nature of a master coupon database including the entire universe or a larger set of electronic coupons available on electronic coupon distribution system 10.

Advertising database 52 includes a plurality of ad impressions, which may be a combination of text and/or images. Again, advertising database 52 is in the nature of a master advertising database including all of the advertising impressions included in main server system 12.

Master category list database 54 includes the main coupon category names presently established on electronic coupon distribution system 10. In addition, display characteristics, such as the color of a main coupon category button (to be described in connection with FIG. 3A) may also be stored in database 54.

Plugin database 56 includes information as to available plugins for use in connection with client application software 28 of client system 14. Plugin database 56 includes a plurality of plugins. The particular plugins that are selected for use in connection with client application software 28 depends on what added functionality has been configured in client system 14. For example, plugins may be configured to provide Zodiac information, recipe information, and stock quote information to the user. Additionally, a plugin may be configured to provide a new coupon style for the user. In this way, client system 14 can be updated remotely with new functionality.

Brand logo database 58 includes information as to how the user interface of client system 14 is "branded." The default "branding" of the user interface involves the display of a company logo of the assignee of the present disclosure. Also, a corresponding Internet URL for "click through" purposes is associated with the brand image. However, in alternate embodiments, other companies may arrange (e.g., through a referral of potential new users of electronic coupon distribution system 10) to have the user interface of client application software 28 "branded" with the referring company's logo (and Internet URL for "click through").

User transaction history database 60 includes information contained in user history data 34 uploaded from client system 14. User transaction history database 60 therefore contains information corresponding to actions or events taken by or involving the user of client system 14. User transaction history database 60 therefore includes a record for each coupon that has been downloaded or otherwise provided to client system 14. As each coupon is displayed, or printed by the user, for example, the corresponding record in user transaction history database 60 is updated.

Referring now to FIGS. 3A and 3B, FIG. 3A shows a Graphical User Interface (GUI) 62 displayed on display device 40 in connection with the execution of client application software 28. User interface 62 includes a plurality of main coupon category "buttons" 64 each having a respective status indicator 66 associated therewith. User interface 62 also includes a coupon subcategory list 68, a coupon list 70, an advertising pane 72, a logo pane 74, a main coupon display area 76, an "Add-To-Print-Cart" button 78, a "Print Now" button 80, a "More Info" button 82, a "Delete" button 84, a "Preferences" button 86, a "Promotions" button 88, a "Refresh" button 90, a printout status display area 92, and a general message display area 94.

Main coupon category buttons 64 allow the user of client system 14 to select the general category of coupons that the user is interested in viewing. For example, the user who is interested in browsing through entertainment coupons, would select the main category button 64 designated "Entertainment" using a pointing device such as mouse 44 (e.g., via "clicking" on the button). Status indicator 66 associated with each main coupon category button 64 indicates whether there are coupons under that main category that have not yet been displayed in coupon display area 76. As shown in FIG. 3A, when a status indicator 66 is "checked" (i.e., active), as indicated generally at $66_A$ for the main coupon category button labeled "Added Extras", such indication informs the user that coupons are available under that main coupon category that have not yet been displayed. Alternatively, when there are no undisplayed coupons under a main category, the "checked" status indicator 66 becomes inactive and is removed, as shown by a dashed line box designated $66_I$ where a status indicator would otherwise be displayed had it been "active."

When one of the plurality of main coupon category buttons 64 is selected, a corresponding subcategory list is displayed in coupon subcategory list 68. A user may then browse through the items contained in coupon subcategory list 68 and make a selection. When one of the items contained in coupon subcategory list 68 is selected by the user (e.g., via "clicking"), the corresponding individual coupons or informational messages are displayed in coupon list 70. The user may then select an item from coupon list 70, which will then be displayed in coupon display area 76. Through the foregoing interface, users of electronic coupon distribution system 10 can quickly and easily navigate from broad main coupon categories, to individual coupons, for printout and later redemption. If the user desires to print out a particular coupon, the user can select the print cart button 78 to add the selected coupon to a print cart or queue for subsequent printout on printer 46. Alternatively, the user may print the selected coupon immediately by selecting the "Print Now" button 80.

Advertising pane 72 is configured to display an advertising impression. In one embodiment, the advertising impression is selected from a plurality of advertising impressions as a function of a selected coupon subcategory. For example, a vendor of electronic equipment may arrange to have an ad impression for that vendor's company displayed in advertising pane 72 when the user selects a particular coupon subcategory from list 68 when the "Internet Electronics" category button 64 is selected. As a further feature, the advertiser may provide an Internet URL (e.g., to its home page) and have it associated with the ad impression. Client application software 28 is configured such that when a user selects (e.g., "clicks") advertising pane 72, an Internet browser program associated with client system 14 is launched and is directed to the URL as specified by the advertiser. This is a so-called "click through" occurrence, which is recorded in the user history file.

Logo pane 74 provides a display area through which the user interface 62 of electronic coupon distribution system 10 can be "branded." As with advertising pane 72, an Internet URL may be associated with the brand logo displayed in logo pane 74. Client application software 28 is configured such that when the user selects (e.g. "clicks") logo pane 74, an Internet browser program associated with client system 14 is launched and is directed to the specified URL.

The "Print Now" button 80 is configured under client application software 28 such that when selected, the coupon currently being viewed is printed out on printer 46. If there are one or more other coupons currently in the print queue, as a result of prior selection of the print cart button 78 for previously displayed coupons, then selection of the "Print Now" button 80 by the user will operate to print all such selected coupons 48 on printer 46.

The "More Info" button 82 is configured under client application software 28 to launch an Internet browser program associated with client system 14 when selected, and, further, to direct the browser to a specified URL. In accordance with a secure e-couponing embodiment of the present disclosure, predetermined ones of the coupons displayed in coupon display area 76 may be redeemed by the user electronically (as opposed to printing out the displayed coupon and physically tendering the same to the retailer). Generally, a portion of the coupon being displayed in coupon display area 76 will tell the user to click on the "More Info" button 82 to instantly redeem the coupon. Client application software 28 is configured to invoke, in response to the "click", the specified but completely hidden and inaccessible URL (including the appended promotional code) using an Internet browser program. Client application software 28 disables access to the invoked URL/code. For example, moving the mouse arrow over the coupon/ad does not cause the URL to be displayed, nor is "right-button clicking" operative to allow capture of the URL. Accordingly, the specified URL (and code) is neither displayed nor available, and cannot be discovered by, for example, "right-clicking" on coupon display area 76, like a web-based e-coupon distribution systems. The browser takes the user to the website corresponding the specified URL, where the appended promotional code is processed, and the user provided an opportunity to redeem the same. The present disclosure therefore provides secure electronic coupon distribution. In another embodiment, the specified URL that is invoked when the "More Info" button 82 is "clicked" comprises the URL associated with an advertiser's website (i.e., the advertiser associated with an ad impression displayed in advertising pane 72).

The "Delete" button 84 is configured under client application software 28 to delete the currently viewed coupon when selected by the user.

The "Preferences" button 86 is configured under client application software 28 to allow the user to set and/or modify the information contained in the user preference data 32, when selected by the user. For example, the refresh interval referred to above may be updated by the user to extend or foreshorten the coupon update interval.

The "Promotions" button 88 is configured under client application software 28 to prompt the user to enter a promotion code to obtain a special promotion coupon, when selected by the user. For example, a third-party website, or the like, may advise the user of a promotional code, with instruction to establish client system 14 (if they are not already a registered user), and then to enter the promotion code as described above, to obtain the promotional coupon.

The "Refresh" button 90 is configured under client application software 28 to transmit an update request from client system 14 to main server system 12, when selected by the user. This action, in-effect, requests that any new coupons waiting for the user on main server system 12 at that point in time be downloaded to client system 14. Additionally, any data in the user history file is uploaded.

Printout status display area 92 is provided for displaying messages pertaining to the status of the print cart (e.g., "Items to Print: 2").

Message display area 94 is provided for displaying various messages to the user of client system 14.

Referring now to FIG. 3B, the graphical user interface associated with the operating system of client system 14 may include a taskbar 100. In accordance with the present disclosure, taskbar icon 102 is provided. Client application software 28 is configured to display taskbar icon 102 to the user in a first display state when no new coupons or messages are available to the user. Taskbar icon 102 in the first display state may assume a static display. In constructed embodiment, taskbar icon 102 includes a generally black-colored "%" symbol on a yellow-colored background, all enclosed by a dashed-line box. Client application software 28 is further configured to display taskbar icon 102 in a second display state different from the first display state when new coupons or messages are available for the user. In a constructed embodiment, the second display state associated with taskbar icon 102 comprises a quasi-flashing display state wherein (i) the color of the "%" symbol is indexed or rotated through a plurality of different colors, and (ii) the dashed-line enclosure box is manipulated to give the sense of movement, particularly rotation, around the perimeter of taskbar icon 102.

Figure 4:
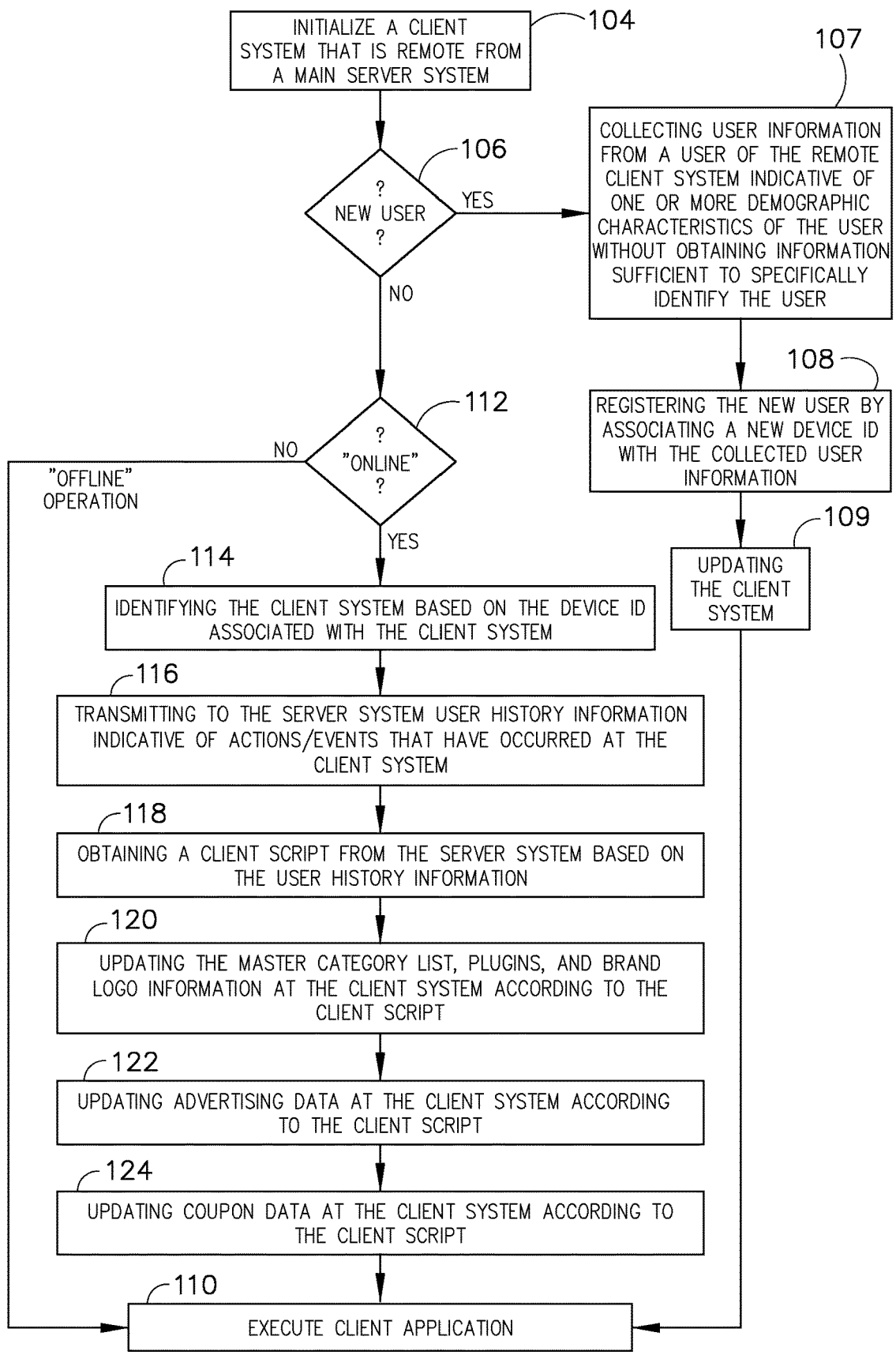
FIG. 4 is a simplified flowchart diagram view illustrating interactions between the client system, and the main server system, according to an exemplary embodiment.

Referring now to FIG. 4, a brief description of the operation of electronic coupon distribution system 10, particularly the main interactions between client system 14 and main server system 12, will now be set forth. Each time a new session is commenced, the basic steps set forth in FIG. 4 will be performed.

In step 104, client system 14, by way of execution of client application software 28, is initialized.

In step 106, client application software 28 determines whether there is an identified user device for client system 14, or whether the present user is a "new" user device. Client application software 28 may make this determination based on the existence or absence of particular files on client system 14 (e.g., a file containing a DeviceID data 30) indicative of whether or not this is a "new" user device. If "NO", then the method branches to step 112. Otherwise, if the answer to step 106 is "YES", then the method branches to step 107.

In step 107, client application software 28 obtains user information from the user. In particular, client application software 28 is configured to collect user information from a user of client system 14 indicative of one or more demographic characteristics of the user without obtaining information sufficient to specifically identify the user. In a constructed embodiment, the information obtained comprises a postal zip code associated with the user, and a State where the user resides. Personal information such as the user's name, e-mail address, residence address, social security number, telephone number, and the like is not obtained in step 107. In accordance with the present disclosure, the foregoing step provides useful information to main server system 12 in the selection of coupons appropriate for the user (e.g., geographic area). Coupons from merchants located geographically proximate the user's residence may be more easily redeemed by the user, thus increasing the efficacy of the coupon offer. Other information, such as the type of Internet connection (e.g., modem), may also be obtained from the user in step 107.

In step 108, main server system 12 registers the "new" user device. Main server system 12 determines whether the user of remote client system 14 is a "new" user devuce based on the presence or absence of DeviceID data 30 in a message from client system 14 to main server system 12. The "new" user device is then registered on main server system 12. Main server system 12 is configured to register the new user by performing, among other things, the steps of allocating a new DeviceID data 30, and associating the new DeviceID data 30 with the user information obtained in step 107. Through the foregoing, remote client system 14 can always be identified by its DeviceID data 30.

In step 109, client system 14 and main server system 12 communicate so as to update the master category list, plugins, brand logo information, advertising data and coupon data at the remote client system 14. This is done, for the first time client application software 28 is executed, by searching the main server system 12 for new information that has come into being between the time the installation or setup program that the user used to install client system 14 was populated with such data (the "sync" date), and the present time (the server date). The identified information is downloaded to thereby update client system 14. This step ensures that the user of client system 14 has the most up-to-date information in these categories. The method then proceeds to step 110 wherein main client application software 28 is executed.

When the answer to step 106 is "NO", then the method branches to step 112. In step 112, client application determines whether client system 14 is "online." Client system 14 is "online" when the user is connected to the Internet such that client system 14 can communicate with main server system 12. While this basic step will be described in greater detail below (FIG. 9), it bears emphasizing that client system 14, in an exemplary embodiment, will not force a connection to Internet 16. Rather, if there is no "online" connection, the user of client system 14 will have access to coupons in an "offline" mode of operation. Thus, if the answer to step 112 is "NO", then the method branches to step 110. Otherwise, when the answer step 112 is "YES", then the method branches to step 114.

In step 114, main server system 12 identifies the remote client system 14 based on a DeviceID data 30 provided by client system 14. In this way, main server system 12 can utilize the information "on file", such as state and zip code, for a variety of purposes. In a constructed embodiment, the state and zip code data are included in a request by front-end server 20 to database server 24 to select a server that will service this user for this session (described in detail in connection with FIG. 10). The response to the request is a virtual IP address to a particular handler 22, and a selected database "name" of a selected database server 24.

In step 116, main server system 12, particularly the assigned handler 22 and database server 24, is updated with any information contained in user history data 34 that has not yet been uploaded and processed. The user history file contains information indicative of actions taken by, or, events occurring in response to actions taken by, the user of remote client system 14. As described above, user history data 34 contains information such as the identity of coupons selected, coupons printed, advertising impressions displayed in advertising pane 72, etc. The assigned handler 22 in conjunction with database server 24 uses the user history file in at least two ways: (i) to produce data from which a user script can be built by the remote client system 14 and, (ii) to update the user transaction history database 60, which may then be queried to prepare reports that will be provided as feedback to the various advertising sponsors, coupon issuers, and coupon referral agents.

Step 118 involves obtaining a client script for execution by client system 14. Step 118 includes the substep of identifying coupons at main server system 12 suitable for the user. What is suitable for any particular user may be based on DeviceID data 30, the user information associated with DeviceID data 30, the main coupon categories selected by the user, the OS platform (e.g., MAC OS vs. Windows), the version of client application software 28, the cobrand ID, and the promotional code, if any. Use of these criteria can be either inclusive or exclusive. Client system 14 may be sent lists of undownloaded coupons, undownloaded ads, etc. The lists may only identify, for example, the coupons to be downloaded (not the coupon itself). Steps 120, 122, and 124 involve obtaining the actual coupon data, ad data, etc.

In step 120, the master category list, plugins, and brand logo information is updated, based on execution of the client script by client system 14. Particularly, client system 14 works through the list of needed items.

In step 122, advertising data comprising advertising impressions from advertising database 52 are updated at the remote client system 14. This step ensures that the user has the most up-to-date advertising available. Again, client system 14 works through a list of needed ads, sequentially making requests from database server 24.

In step 124, coupon data from coupon database 50 is updated at remote client system 14. Updating of the coupon data includes retrieving coupon data corresponding to the identified electronic coupons (i.e., the list provided as part of the client script).

Figure 5:
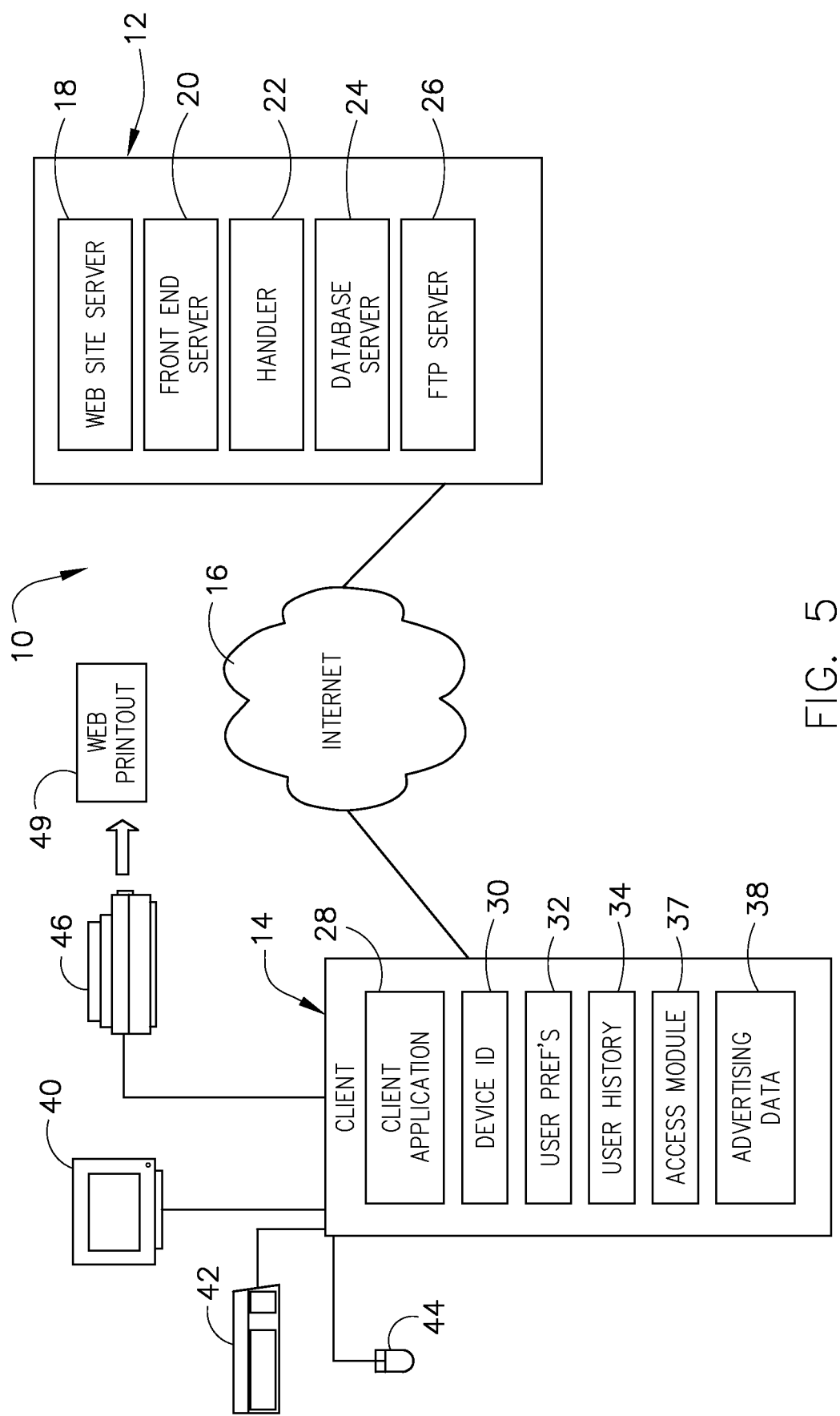
FIG. 5 is a diagrammatic and block diagram view of a system for controlling the number of clicks to a clickable advertisement, according to an exemplary embodiment.

In FIG. 5, a diagrammatic and block diagram view of a system for controlling the number of clicks to a clickable advertisement is shown, according to an exemplary embodiment. The system for controlling the number of clicks to a clickable advertisement includes additional features, such as an access module 37 and a web printout 49, according to an exemplary embodiment. Client application software 28, DeviceID data 30, user preferences 32, user history data 34, advertising data 38 and the other features listed in FIG. 1 operate in a similar manner as detailed in the description of FIG. 1.

Figure 6:
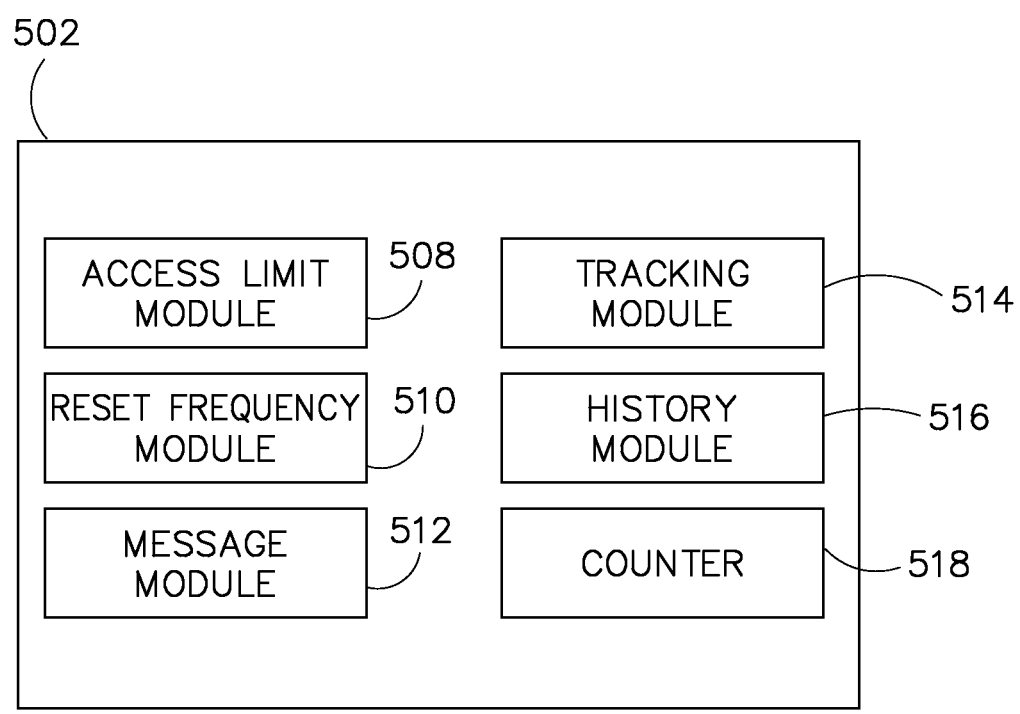
FIG. 6 is a block diagram showing, in greater detail, the system for controlling the number of clicks to a clickable advertisement shown in FIG. 5, according to an exemplary embodiment.

In FIG. 6, a block diagram of the system for controlling the number of clicks to a clickable advertisement shown in FIG. 5 is shown, according to an exemplary embodiment. The system for controlling the number of clicks to a clickable advertisement may include a processing circuit 502. Processing circuit 502 may include an access limit module 508, a reset frequency module 510, a message module 512, a tracking module 514, a history module 516 and a counter module 518, according to exemplary embodiments. Access limit module 508 may be configured to limit the amount of times an advertisement, website, or electronic coupon can be accessed. The amount of times an advertisement, website, or electronic coupon can be accessed may be determined manually or automatically. The manual process may include data entry by a user, system administrator, clerk, etc. The automatic process may include simple or complex algorithms, which may for example dynamically change the access limit based on inputs, such as time of day, time passed since last access attempt, advertising campaign strategy and timing, etc. It should be noted that any algorithm that is known to a person of ordinary skill in the art is hereby incorporated into this disclosure. One or more components of processing circuit 502 may be operable on client system 14, website server 16, or both. The term processing circuit and processor may be used interchangeably.

In an exemplary embodiment, counter module 518 monitors the number of times the advertisement, website, or electronic coupon has been accessed. Processing circuit 502 compares the number of times the advertisement, website, or electronic coupon has been accessed to the number of times the user is allowed to access the information based on the data stored in access limit module 508 to determine whether access should be granted.

In an exemplary embodiment, reset frequency module 510 is configured to reset the number of times the advertisement, website or electronic coupon has been access based on predetermined timeframe. For example, access limit module 508 may be set to limit the access to the advertisement, website, or electronic coupon to three times. However, reset frequency module 510 is configured to reset the number of times the advertisement, website, or electronic coupon has been accessed to zero every twenty-four hours. Therefore, the advertisement, website, or electronic coupon can be accessed up to three times every twenty-four hours. It should be noted that any reset time interval can be utilized and that reset frequency module 510 may be configured to increment access limit module 508. For example, access limit module 508 may be set to allow access three times. After a predetermined timeframe (e.g., twenty-four hours) has past, reset frequency module 510 may be configured to increment access limit module 508 to allow access six times.

In an exemplary embodiment, message module 512 is configured to transmit various messages. These messages may include access denial messages, access allowed messages, system status messages, promotional messages, informational messages, and/or system reporting messages.

In an exemplary embodiment, history module 516 is configured to store a history of all advertisement, website, or electronic coupons accessed by the computing device.

In an exemplary embodiment, tracking module 514 is configured to analyze the data stored in history module 516 to determine any patterns in the advertisements, websites, or electronic coupons accessed by the computing device that indicate misuse, fraud or other behavior warranting further evaluation.

Processing circuit 502 may be implemented with digital and/or analog components, such as one or more processors or logic devices, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processing circuit 502 may be implemented as a general purpose processor, such as a processor made by Intel® Corporation, Santa Clara, Calif. Processing circuit 502 may also be implemented as a dedicated processor, such as a controller, microcontroller, embedded processor, a digital signal processor (DSP), a network processor, a media processor, an input/output (I/O) processor, a media access control (MAC) processor, a field programmable gate array (FPGA), a programmable logic device (PLD), and so forth.

Figure 7:
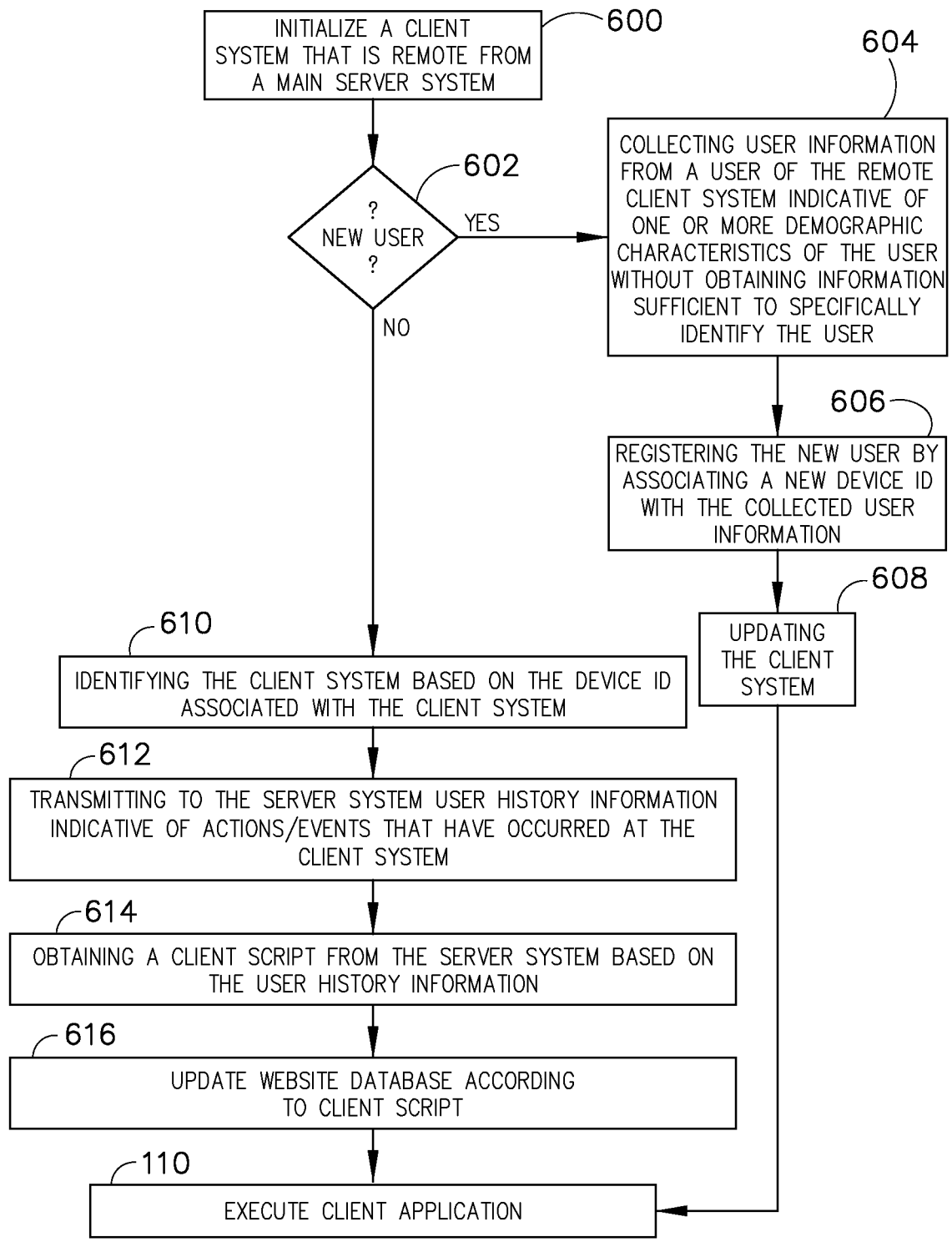
FIG. 7 is a simplified flowchart diagram view illustrating interactions between the client system, and the main server system, according to an exemplary embodiment.

In FIG. 7, a flowchart diagram view illustrating interactions between client system 14, and main server system 12 is shown, according to an exemplary embodiment. The process is started by initializing client system 14 that is remote from main server system 12 (step 600). The system determines whether the user is a new user (step 602). If the user is a new user device, then the system collects user information from a user of remote client system 14 indicative of one or more demographic characteristics of the user without obtaining information sufficient to specifically identify the user (step 604). The system registers the new user device by associating a new DeviceID data 30 with the collected user information (step 606). The system updates client system 14 (step 608). If the user is not a new user, then the system identifies client system 14 based on DeviceID data 30 associated with client system 14 (step 610). The system transmits to main server system 12 user history information indicative of actions/events that have occurred at client system 14 (step 612). The system obtains a client script from the server system based on the user history information (step 614). The system updates the website database according to client script (step 616). The system executes client application software 28 (step 616).

Figure 8:
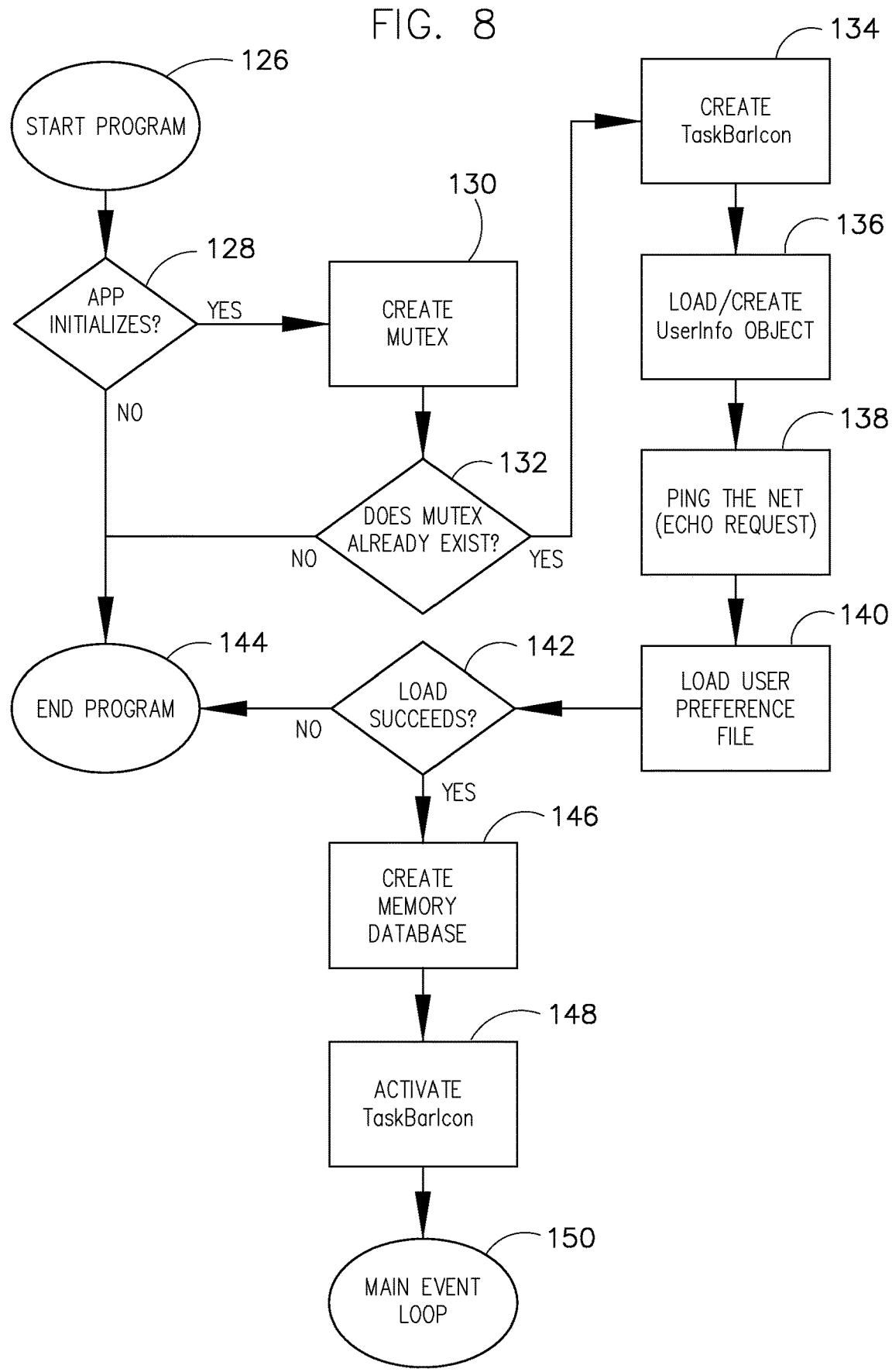
FIG. 8 is a simplified flowchart diagram view showing, in greater detail, the initial steps illustrated in FIG. 4 for system initialization, according to an exemplary embodiment.

FIG. 8 shows steps 104, 106, 107 and 112 of FIG. 4 in greater detail. The method begins in step 126 with initiation of client application software 28. In step 128, if client application software 28 properly initializes, then the method branches to step 130. Otherwise, the method branches to step 144 where execution of client application software 28 ends.

In step 130, a "mutex" is created by client application software 28. "Mutex" stands for "mutually exclusive." Programs or code segments that establish a mutex prevent other programs or code segments from running if they try to establish a mutex with the same ID. Client application software 28 employs mutex functionality in the Microsoft Operating system to ensure that only one instance of client application software 28 is running on any given client system 14. A second instance would be denied use of the mutex, and that instance would then exit.

In step 132, a test is performed to determine whether the mutex already exists. If the answer is "NO", the method branches to step 144 where client application software 28 ends. However, if the response to the inquiry in step 132 is "YES", then the method branches to step 134.

In step 134, taskbar icon 102 is created by client application software 28. The taskbar icon 102 is graphically illustrated in FIG. 3B. As described above, a quasi-flashing taskbar icon 102, in an exemplary embodiment, is a visual alert to the user of client system 14 that new coupons or offers are available for browsing. The method then proceeds to step 136.

In step 136, a UserInfo object is loaded (if it already exists) or created (if it does not already exist). If this is the first time the client application software 28 has been executed, the UserInfo object must be created. As described above, the UserInfo object includes DeviceID data 30, demographic data, proxy server information, if any and software version number. This information may be stored, for example, on a hard drive portion of client system 14. The method then proceeds to step 138.

In step 138, client system 14 transmits an echo request to main server system 12, which is received by front-end server 20. Inasmuch as client system 14 may be connected to the Internet in a variety of logically and physically different configurations (e.g., dial-up connection, proxy server, hidden proxy server such as in the case of AOL, etc.), step 138 is provided to ensure a virtual channel for messaging between client system 14 and main server system 12. The method then proceeds to step 140.

In step 140, a user preference file containing user preference data 32 is loaded into the memory of client system 14 for use by client application software 28. Initially, a default set of information is used, in which all coupon categories are selected and the refresh interval is set to 4 hours. The method then proceeds to step 142.

In step 142, a test is made by client application software 28 to determine whether the user preference file has loaded successfully. If the answer to this inquiry is "NO", then the method branches to step 144 ("end program"). This may occur when the user preference file has been deleted, for example. On the other hand, if the answer to step 142 is "YES", then the method branches to step 146.

In step 146, a memory database is created for maintaining user history events. This database is configured to contain the user actions taken by the user, ad impression displayed, etc., and to store the same for later transmittal to main server system 12 as user history data 34.

In step 148, taskbar icon 102 (FIG. 3B) is activated. This provides a visual cue to the user that client application software 28 is available, and, that coupon lists may be browsed, coupons selected and printed out, or any other function available on client application software 28. Under certain circumstances, taskbar icon 102 alerts the user to new coupons or offers.

In step 150, client application software 28 begins main event loop processing. In main event loop processing, certain action, such as, for example, selecting a main coupon category, selecting a coupon subcategory, selecting a particular coupon, displaying a coupon, printing a coupon, refreshing the local coupon database, etc., may be initiated by the user and detected and executed by client application software 28. While the program in accordance with an exemplary embodiment may be invoked manually by user of client system 14, many operating systems, notably Windows 95/98, allow the user to specify that the execution of client application software 28 should occur on startup of the computer on which client system 14 resides. Accordingly, without any further intervention by the user, upon each startup of client system 14, client application software 28 will initialize.

Figure 9:
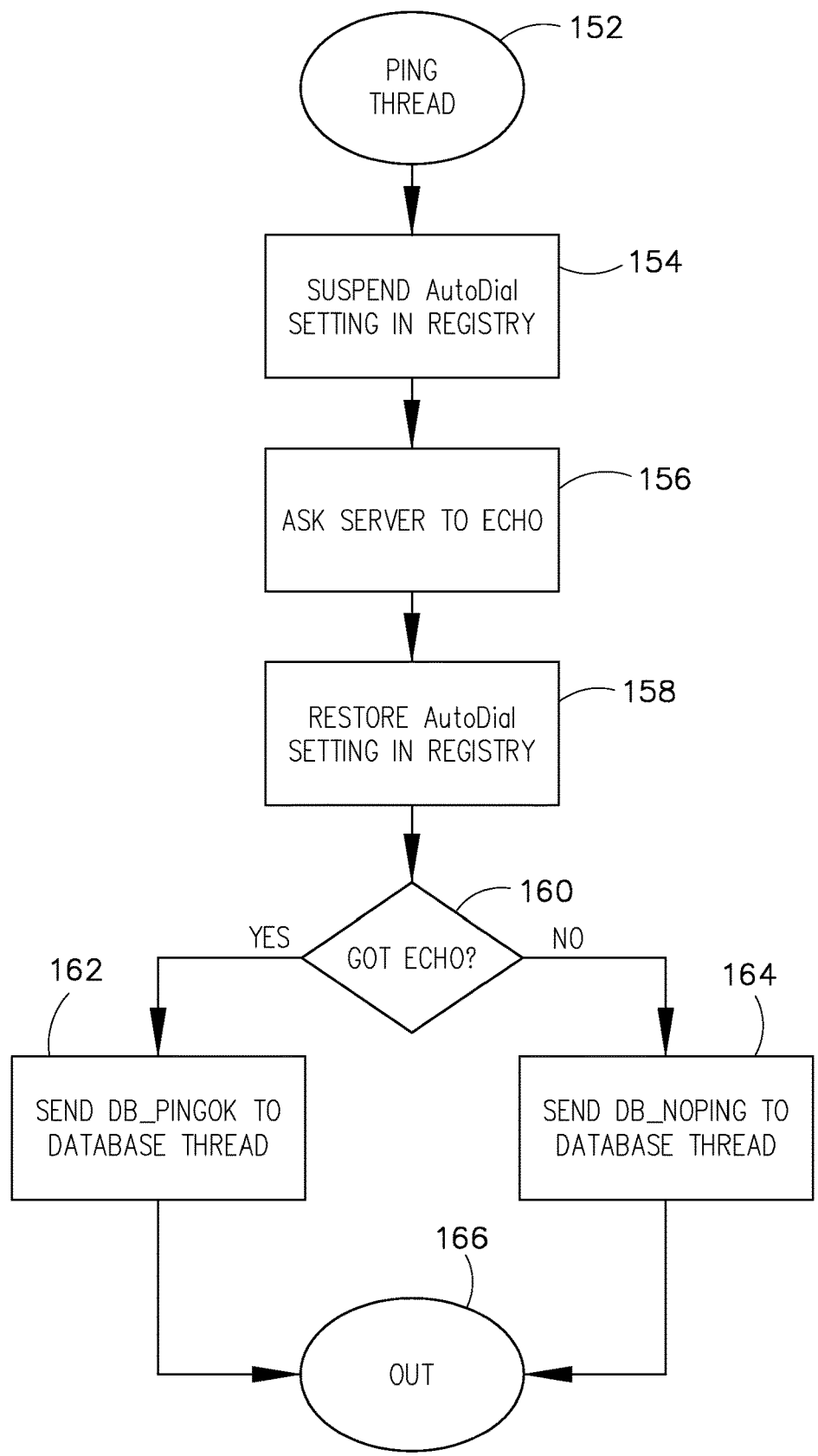
FIG. 9 is a simplified flowchart diagram view showing, in greater detail, an echo request step shown in block diagram form in FIG. 8, according to an exemplary embodiment.

FIG. 9 shows step 138 of FIG. 8 (the "echo request" or "ping the net" step) in greater detail. Execution of the method begins in step 152 wherein the "ping thread" portion of client application software 28 commences execution.

If client system 14 is not "online", client application software 28 will not force an Internet connection. Thus, in step 154, client application software 28 suspends the "AutoDial" setting in the Windows registry. This ensures that the echo request to front-end server 20 does not automatically cause a dialog window to be presented to the user asking for ISP Identification and Password information.

In step 156, client system 14 through execution of client application software 28, transmits a request to front-end server 20 to echo. The nature of the requested "echo" may simply be a return transmittal of an acknowledgement from front-end server 20.

In step 158, the "AutoDial" setting is restored in the Windows registry.

In step 160, the ping thread performs a test to determine whether the requested "echo" was received by way of a return transmission from front-end server 20. If the answer to this inquiry is "YES", then the method branches to step 162, wherein a positive indication that an echo response to the echo request was returned to the client system ("DB_PINGOK") is generated. The positive indication is provided to client application software 28 (particularly, a database thread portion thereof).

Otherwise, if no echo was received from front-end server 20, then a negative indication ("DB_NOPING") is sent to the database thread in step 164. In either case, control from steps 162 and 164 both proceed to step 166, which is an exit step from the ping thread portion of client application software 28.

Figure 10:
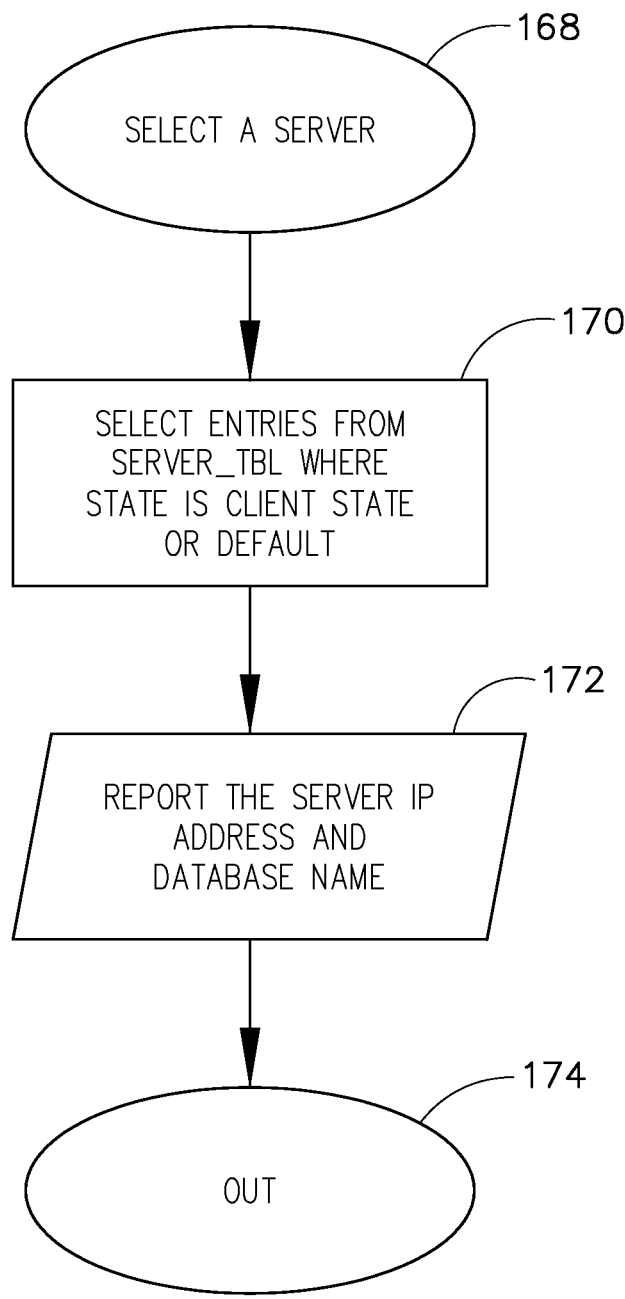
FIG. 10 is a simplified flowchart diagram view showing a server selection routine performed at the main server system, according to an exemplary embodiment.

FIG. 10 shows in detail the steps performed by main server system 12, particularly front-end server 20, in requesting that an appropriate handler 22 and database server 24 be selected for servicing client system 14. This "server select" operation occurs immediately after a successful "echo request" operation (FIG. 9). A plurality of database servers 24 may be deployed, the particular number of which is selected to match the quantity of incoming requests ("load") from the multiplicity of client systems 14 installed remotely. Step 168 marks the beginning of the method. At this point, main server system 12 has in its possession at least the demographic information previously collected (e.g., state and zip code) even if it is a "new user" with no assigned DeviceID data 30 yet. The database server receives the request. The method then proceeds to step 170.

In step 170, a database server 24 routine selects entries from a server table where the state in the table matches the state of residence provided by client system 14. The table entry information defines the logical entities that will service this client system 14.

In step 172, an Internet Protocol (IP) address and a database name are reported over Internet 16 to client system 14. Subsequent requests during this session from client system 14 regarding requests for updated data and the like will be sent in a message addressed to the selected server IP address (which points to a handler 22), and will include in that message the selected database name, which logically maps to entries selected in step 170 (e.g., these may be various advertisement databases 52, coupon databases 50, etc.). The selected IP address, in-effect, is a virtual IP address since there are a plurality of database servers 24, perhaps arranged in a cluster, that are physically provided in order to provide the desired load carrying capacity. The routing function is performed on main server system 12, by handler 22 in a manner known to those of ordinary skill in the art. The method ends in step 174.

Figure 11:
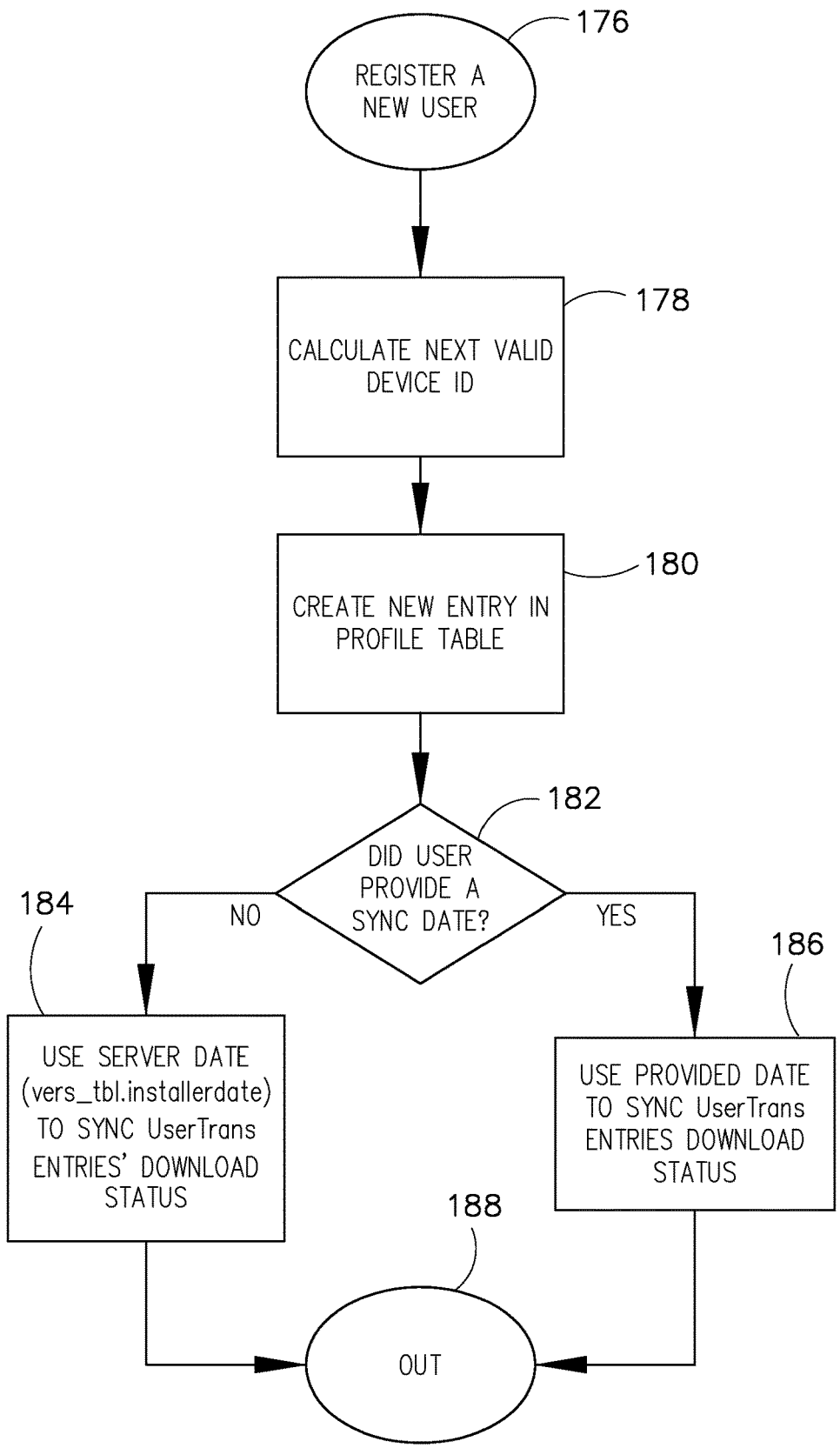
FIG. 11 is a simplified flowchart diagram view showing the steps for registration of a new user on the main server system, according to an exemplary embodiment.

FIG. 11 shows the steps performed on main server system 12 to register a new user device. The process begins in step 176 with commencement of the registration routine. In step 178, a new DeviceID data 30 is calculated by database server 24.

In step 180, a new entry or record is created in a user profile table. The profile entry will associate DeviceID data 30 with the user information collected from the user. The method then proceeds to step 182.

In step 182, database server 24 determines whether a "sync date" was provided from client system 14. This is a date that describes how "up-to-date" client system 14 is, particularly the coupon and advertising information portions thereof. The use of the sync date has been described above in connection with FIG. 4. This "sync date" is automatically provided from client system 14 to database server 24 via the assigned handler 22. If a "sync date" was not provided by client system 14, then the method branches to step 184 where a nominal sync date based on the version of the software installed on the client system is used for downloading and updating purposes. Alternatively, if the answer to step 182 is "YES", then the method branches to step 186.

In step 186, the date provided by client system 14 is used as the "sync date" to synchronize the data on client system 14 relative to the master data on main server system 12. It should be emphasized that the "sync date" is not a date that client application software 28 solicits from the user, but rather, is simply a date available within client application software 28 relating to how "current" the data is (i.e., coupon/advertising data, etc.). In either case, the method proceeds to and ends at step 188.

Figure 12:
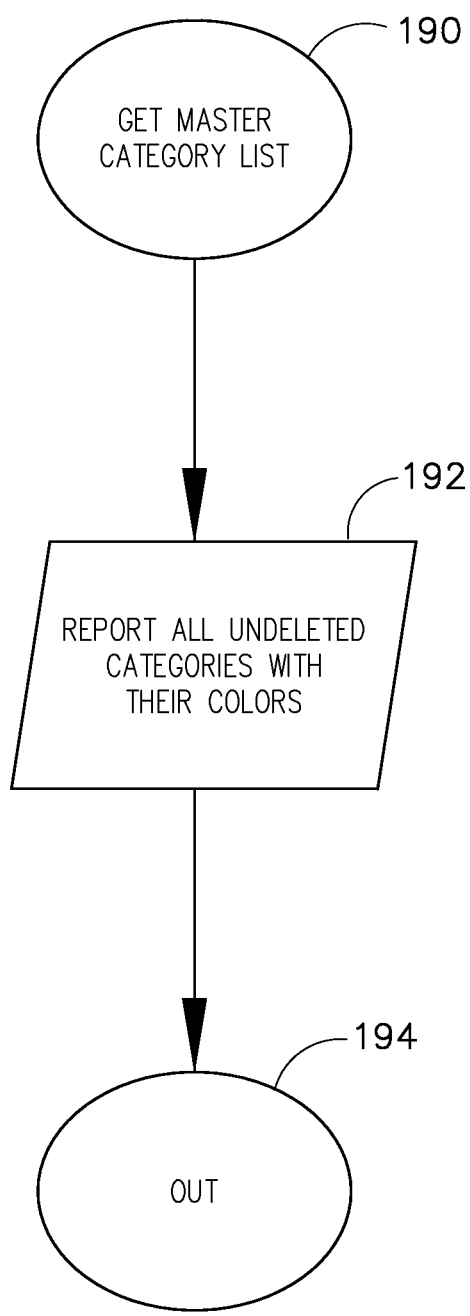
FIGS. 12-14 are simplified flowchart diagram views showing, in greater detail, the steps of updating the master category list, plugins, and brand logo information, respectively, that are shown in block diagram form in FIG. 4, according to an exemplary embodiment.

FIGS. 9, 10 and 11 show step 120 (FIG. 4) in greater detail. Referring to FIG. 12, step 190 represents a request to obtain a master category list (i.e., the up-to-date list). This request is made from client system 14 to the selected database server 24 via handler 22. Such a request is directed to the selected "virtual" IP address as described above. The master coupon category list (e.g., "Athletics", "Automotive", "Internet Electronics", etc.) may be updated on main server system 12, particularly database server 24. That is, categories may be added, and/or categories may be deleted. In either case, such a change will be reflected in user interface 62 of the respective client systems 14 when the next session is invoked by a user.

In step 192, all undeleted master coupon categories, along with their display color (as displayed on display device 40 of client system 14) are reported out to client system 14 for use by client application software 28. Step 194 ends the master coupon category list updating process.

Figure 13:
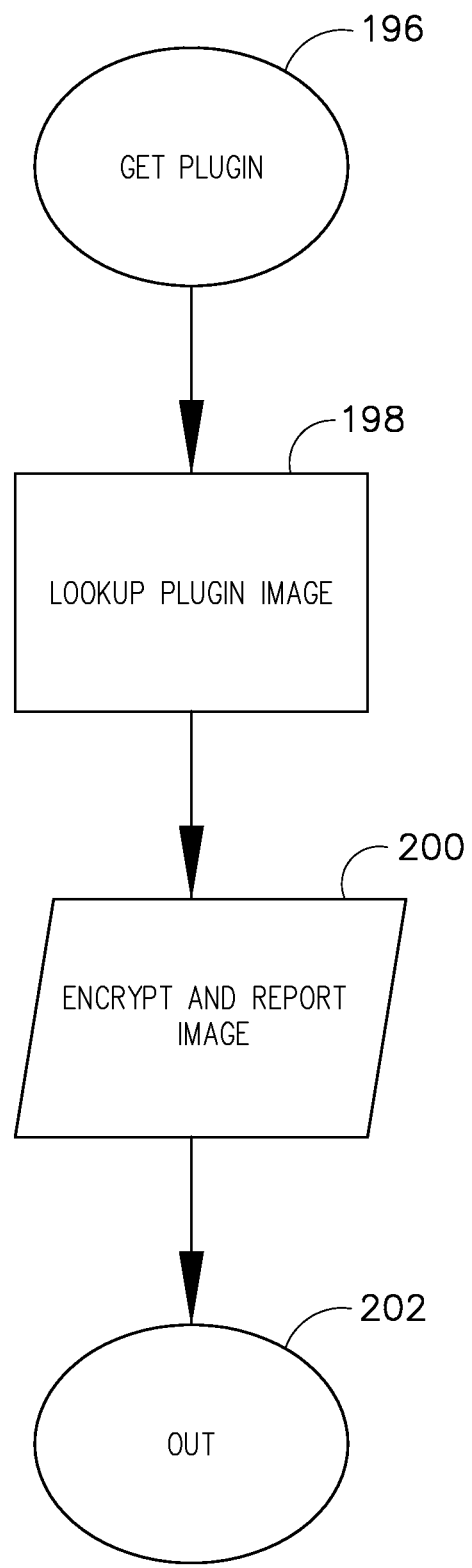

Referring now to FIG. 13, step 196 represents a request from client system 14 to database server 24 via handler 22 to obtain a new or an up-to-date plugin(s). It should be understood that for an existing user, client system 14 may be executing a client script that includes a list containing needed plugins. The process outlined in FIG. 13 would be executed for each plugin on the list.

In step 198, database server 24 performs a look-up of the needed plugin to locate the corresponding plugin file (or image).

In step 200, an "image" or copy of the file of the sought-after plugin is encrypted in accordance with a server system encryption strategy, and is reported or transmitted via Internet 16 to client system 14. In step 202, the plugin update process is completed.

Figure 14:
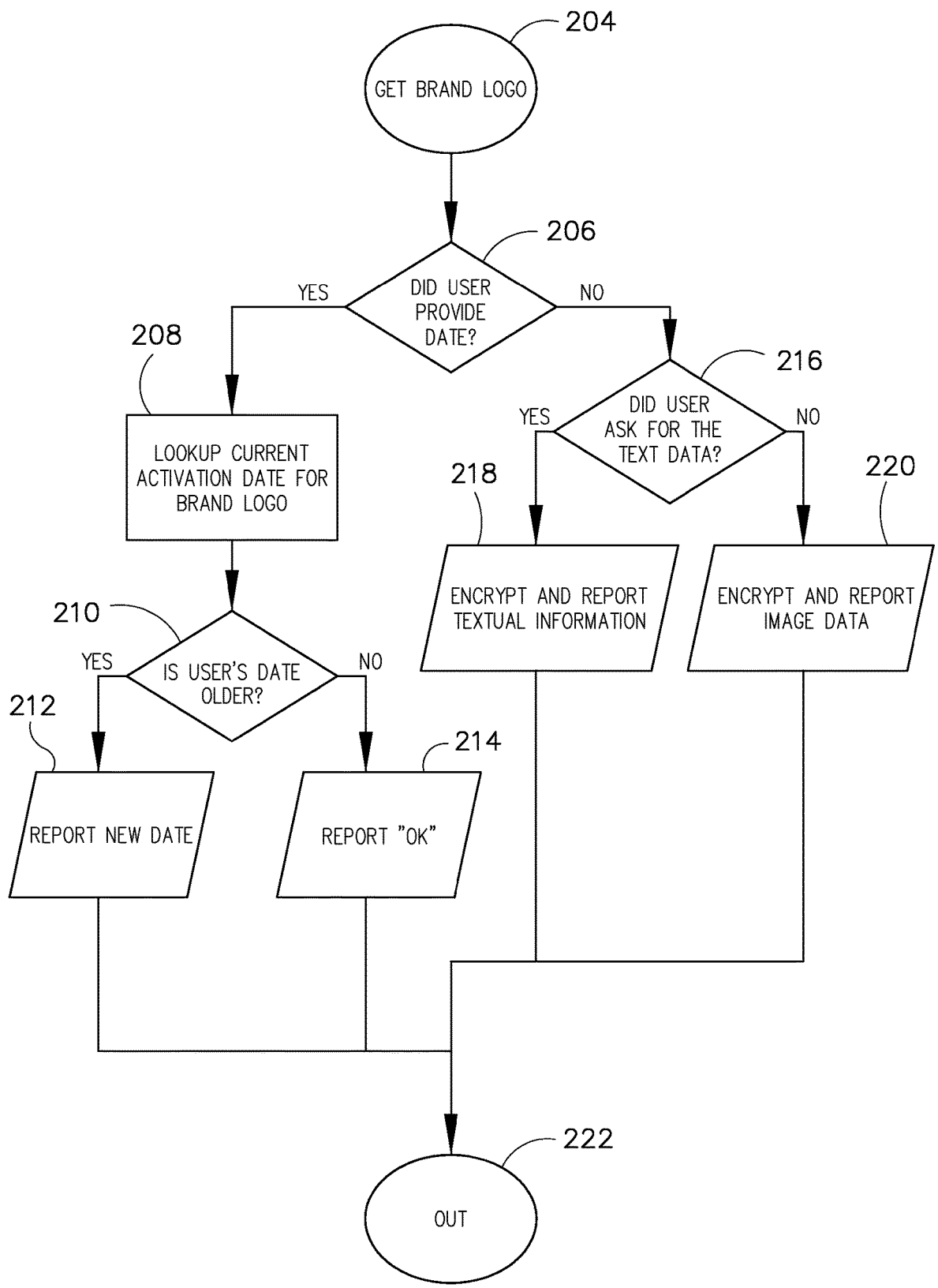

Referring now to FIG. 14, steps 204-222 illustrate the steps involved in determining whether to maintain a default brand logo in logo pane 74 (FIG. 3A), or, in the alternative, whether to download a different brand logo. While a default brand or company logo is associated with client system 14 initially, the default may be changed. For example, a user of Internet 16 may be informed of the existence of electronic coupon distribution system 10 by a third-party vendor who also maintains a website, and refers that Internet user to website server 18 of main server system 12. The referral mechanism, a hyperlink or the like to website server 18, appends the identification of the referring vendor to the HTTP reference (the ID herein referred to as the "cobrand ID"). Website server 18 is configured to recognize and respond to such appended data (the cobrand ID) by putting a "cookie" (i.e., a file used by Internet browser programs) on such Internet user's computer system that contains the cobrand ID. Then, if such potential user of electronic coupon distribution system 10 decides to download and install the client software, the client installation software will search for the "cookie." If it finds the "cookie", and certain other qualifying criteria are satisfied, then the cobrand ID will be passed to main server system 12 upon installation with a request to download the text or image data of the other (non-default) brand logo.

Some client systems 14 will be deployed with both a default brand logo, and an alternate brand logo (including text/images), in alternative embodiments. The following steps apply when client application software 28 determines that it should display an alternate brand logo.

In step 204, client system 14 requests a brand logo (non-default). The process proceeds to step 206.

In step 206, database server 24 determines whether client system 14 provided a date along with the request for the alternate brand logo. If so, then client system 14 already has the text/images corresponding to the brand logo and just needs to determine whether to turn the requested brand logo "on" at client system 14.

Thus, if the answer to step 206 is "YES", then the method branches to step 208. In step 208, database server 24 conducts a look-up to determine an activation date for the subject brand logo. The method then proceeds to step 210.

In step 210, database server 24 determines whether the client-provided date is "older" than the current activation date. If "YES", then the method branches to step 212, where the new activation date is reported out to client system 14. Client system 14 will therefore defer activation of the alternate, non-default brand logo until such new date. Otherwise, the method branches to step 214, where database server 24 reports an "ok" to client system 14. Client system 14 will then implement (i.e., display) the brand logo corresponding to the cobrand ID.

When the method branches to step 216, (a "NO" to step 206), database server 24 performs another test to determine whether client system 14 asked for text corresponding to the cobrand ID. If "YES", then the method branches to step 218, where the textual information is encrypted according to a server system encryption strategy, and reported out to client system 14. Otherwise, step 220 is performed, where image data corresponding to the cobrand ID is encrypted (according to a server system encryption strategy), and reported to client system 14. The method ends in step 222.

Figure 15:
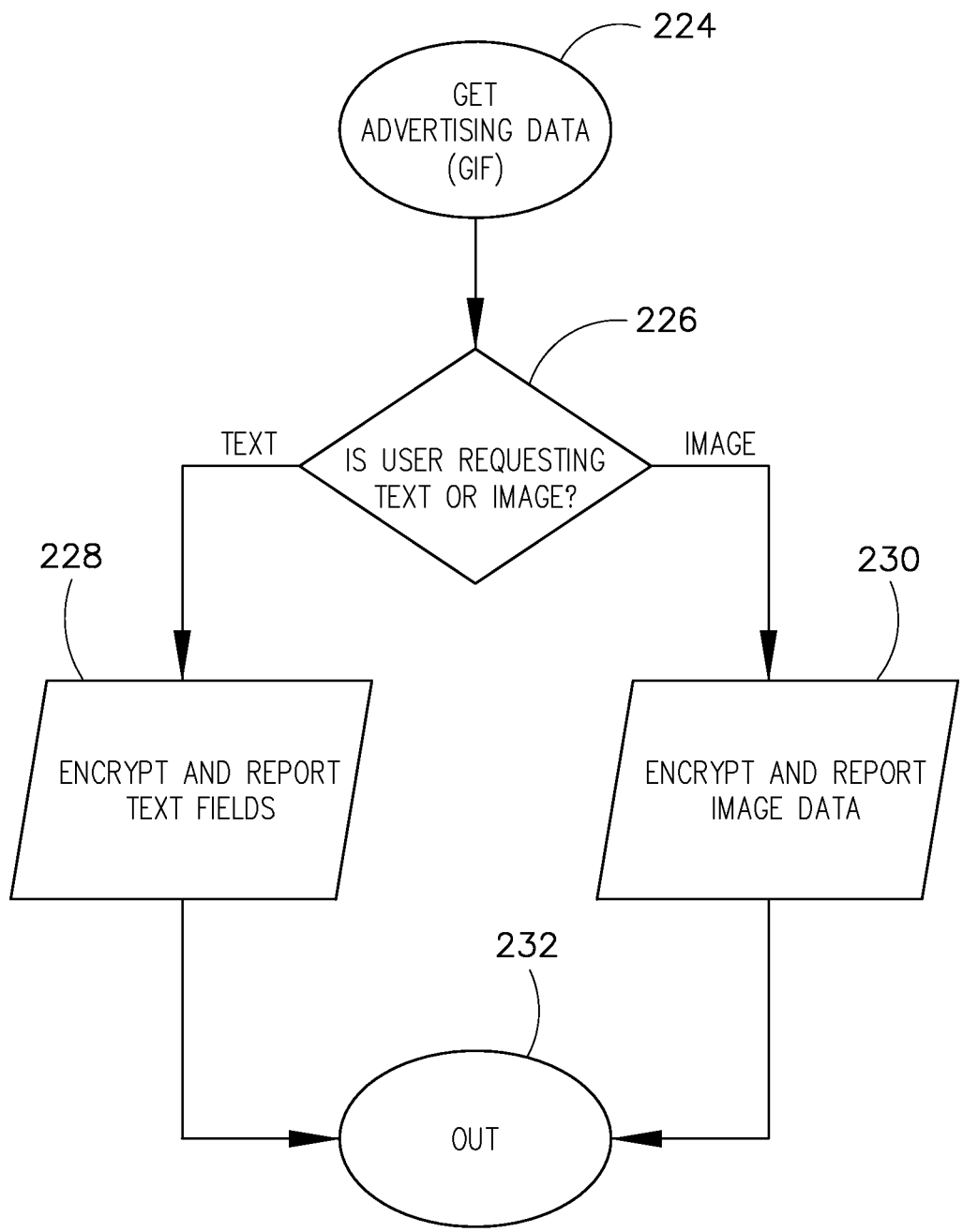
FIG. 15 is a simplified flowchart diagram view showing, in greater detail, the step of updating advertising data that is shown in block diagram form in FIG. 4, according to an exemplary embodiment.

FIG. 15 shows step 122 ("updating advertising data") of FIG. 4 in greater detail. In particular, steps 224-232 illustrate, in accordance with the present disclosure, that advertising text, and images are encrypted to thereby provide secure transmission to client system 14. It should be understood that for an existing user device, client system 14 may be executing a client script that includes a list containing needed advertising impressions. The process outlined in FIG. 15 would be executed for each advertising impression on the list. Step 224 marks the beginning of the advertising update method.

In step 226, main server system 12 determines whether the user, more particularly client system 14, is requesting "text" or "image" advertising data. If the answer is "text", then the method proceeds to step 228.

In step 228, main server system 12, particularly database server 24, encrypts the text of the advertising data, and reports out the resulting encrypted advertising data. It should be understood this encryption occurs in accordance with a server system encryption strategy.

Otherwise, the method proceeds to step 230 when the advertising data requested is "image" data. In step 230, the advertising data ("image" data) is encrypted by main server system 12 according to a main server system encryption strategy, resulting in encrypted advertising image data. The encrypted ad image data is then reported out to client system 14.

Step 232 defines the end of the advertising update process.

Figure 16:
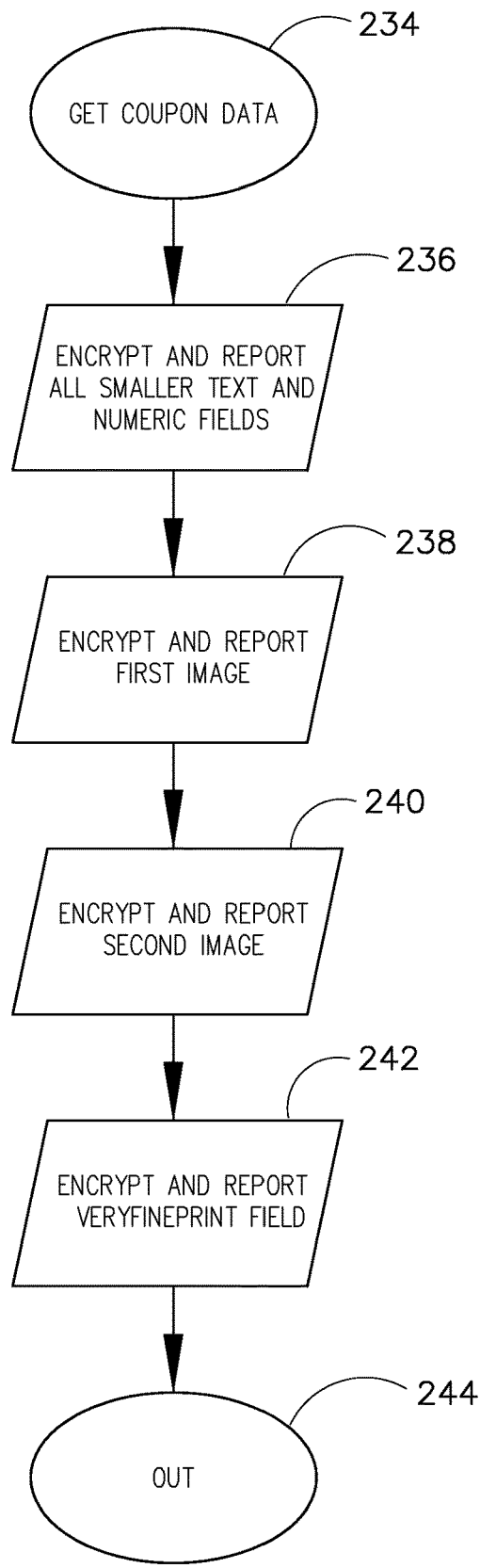
FIG. 16 is a simplified flowchart diagram view showing, in greater detail, the step of updating coupon data that is illustrated in block diagram form in FIG. 4, according to an exemplary embodiment.

FIG. 16 illustrates, in greater detail, step 124 in FIG. 4 ("updating coupon data"). It should be understood that for an existing user device, client system 14 may be executing a client script that includes a list containing needed coupon data. The process outlined in FIG. 16 would be executed for each electronic coupon on the list.

Steps 234-244 illustrate that coupon text and image data are encrypted in accordance with a server system encryption strategy prior to transmission to client system 14, resulting in encrypted coupon data. It bears emphasizing that the steps 234-244 in FIG. 16, occur at main server system 12. Since the coupon data is encrypted, even if intercepted, the actual coupons cannot be easily recovered and reprinted. This reduces the occurrence of fraud.

In step 234, client system 14 issues a request to get a particular electronic coupon. In step 236, database server 24 encrypts and reports (to client system 14) all smaller text and numeric fields. In steps 238 and 240, database server 24 encrypts and reports, respectively, first and second images associated with the requested electronic coupon. In step 242, the very fine print portions of the requested e-coupon in encrypted and reported out to client system 14. Step 244 is an exit step.

Figure 17:
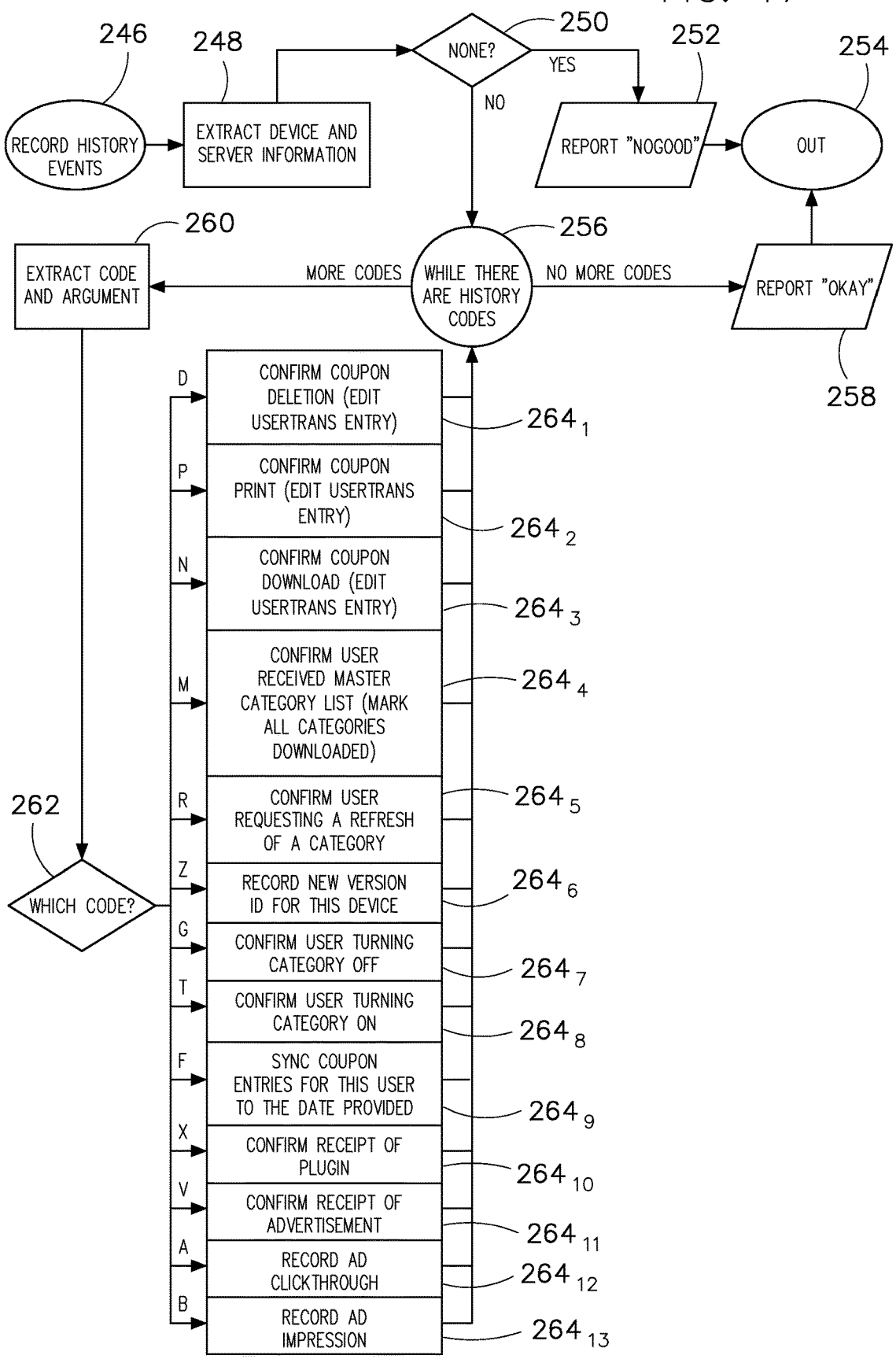
FIG. 17 is a simplified flowchart diagram view showing, in greater detail, the step of updating the main server system with a user history file that is shown in block diagram form in FIG. 4, according to an exemplary embodiment.

FIG. 17 shows, in greater detail, step 116 of FIG. 4 ("transmitting to the server system user history information"). Steps 246-264 occur principally on main server system 12, more particularly, between handler 22 and database server(s) 24. Prior to step 246, client system 14 sends a message to database server 24 containing the user history data 34. Step 246 marks the beginning of the process used by main server system 12 in recording the events contained in the user history data 34.

In step 248, the user and server information is extracted from the user history data 34. This information is used in updating the user transaction records associated with the identified user of electronic coupon distribution system 10. The information developed in this process is also used to generate a client script that will be described in further detail.

In step 250, a test is made to determine whether there is any user and server information in the user history file. If the answer to this inquiry is "NONE", then flow of the process proceeds to step 252 where an indictor "NO GOOD" is reported out. Flow of the process then continues to step 254 where the process exits.

On the other hand, if user and server information is successfully extracted from the user history file, flow of the process continues at step 256. In step 256, a "WHILE DO" process structure is established. Method steps 256, 260, 262, and 264 are continuously repeated while there are new history codes remaining to be read-out and extracted from the user history data 34.

In step 260, the next history code is extracted along with any arguments pertaining thereto. Flow of the process then proceeds to step 262, and 264 where the extracted user history codes are decoded. For example, a user history code designated "F" indicates that coupon entries should be synchronized, for this user to the date so provided as the argument (i.e., to the so-called "sync date"). This is shown in block 2649. As another example, a user history code "B", specifies that an advertising impression described in the argument should be recorded in a user transaction record. This is shown in block 26413. The ad impression, when recorded, may be used thereafter to prepare reports for the sponsor of the advertising impression. Other user history codes involve modification of a user transaction entry. For example, the code "N" indicates a positive confirmation by client system 14 that certain coupons were downloaded successfully. Accordingly, the user transaction entry should be edited to so indicate. In this way, positive feedback is provided as to what coupons have been safely received at the remote client system 14. FIG. 17 specifically identifies thirteen codes, and corresponding responses, respectively designated 2641-26413.

When the last remaining history code has been extracted and decoded, the "WHILE DO" loop at step 256 fails, and flow of the process proceeds to step 258. In step 258, database server 24 reports an "Okay" message to handler 22. Flow of the process then proceeds to an exit step, designated step 254.

Figure 18:
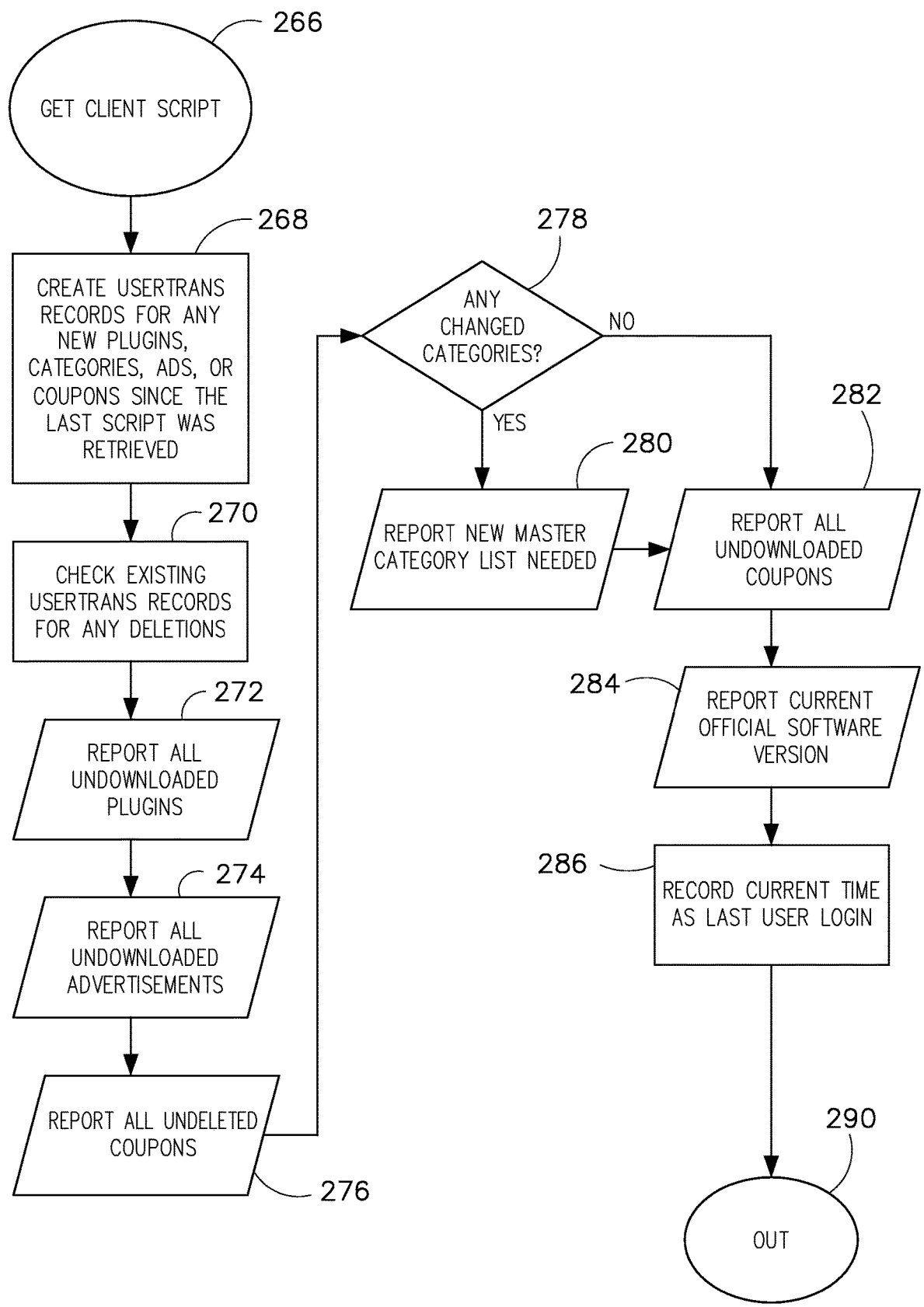
FIG. 18 is a simplified flowchart diagram view showing the steps involved in obtaining a client script, according to an exemplary embodiment.

Referring now to FIG. 18, after the user history codes from user history data 34 have been extracted and decoded, a "client script" is built by client system 14 based on information (e.g., lists) from handler 22 in cooperation with database server 24. The client script provides instructions for main server system 12 to execute.

In step 266, client system 14 issues a request to handler 22 to obtain the "user" or "client" script. The client script is then returned to client system 14. Step 268 show the execution of the client script by client system 14, which issues the commands shown in the steps 268-290.

In step 268, client system 14 issues commands via handler 22 to database server 24 to create user transaction records for any new plugins, main coupon categories, advertising data, or coupon data received by client system 14 since the last client script was retrieved.

In step 270, client system 14 issues commands via handler 22 to database server 24 to check existing user transaction records for any deletions. Any deletions are processed whereby the affected user transaction record will be modified to indicate that the client coupon has been deleted.

In step 272, client system 14, in execution of the client script, issues a command via handler 22 to database server 24 to report all undownloaded plugins. Database server 24, through handler 22, returns a message containing a listing of all undownloaded plugins. This list will be processed by client system 14 after the client script has been completed.

In step 274, client system 14, in execution of the client script, issues a command via handler 22 to database server 24 to report all undownloaded advertising impressions. Database server 24 returns a list of all undownloaded ad impressions.

In step 276, client system 14, in execution of the client script, issues a command via handler 22 to database server 24 to report all undeleted coupons.

In step 278, client system 14, in execution of the client script, issues a command via handler 22 to database server 24 to determine whether any of the main coupon categories have been changed. If the answer to this inquiry is "YES", then flow of the process continues at step 280, wherein the database server 24 reports to client system 14 that a new master category list is needed. Flow then proceeds to step 282.

If the answer to the inquiry in step 278 is "NO", then flow of the process proceeds to step 282. In step 282, client system 14, in execution of the client script, issues a command via handler 22 to database server 24 to report all undownloaded electronic coupons. Database server 24 returns a listing of all undownloaded coupons.

In step 284, client system 14, in execution of the client script, issues a command via handler 22 to database server 24 to report the current official software version. Database server 24 returns the latest version number.

In step 286, database server 24 is requested to record the current time as the last user login. Flow of the process then continues to step 290, which marks the end of the client script execution.

Figure 19:
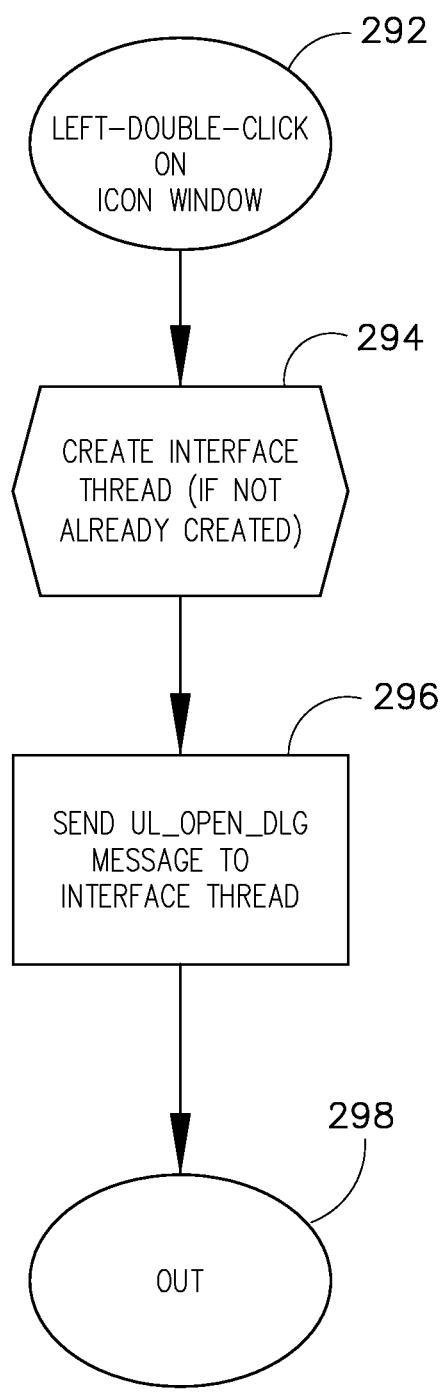
FIGS. 19-20 are simplified flowchart diagram views showing alternate responses taken by client system 14 in response to double-clicking taskbar icon 102, according to an exemplary embodiment.

Referring now to FIGS. 16 and 17, upon initial execution of client application software 28, taskbar icon 102 is created, as illustrated in FIG. 3B. Referring particularly now to FIG. 19, steps 292-298 illustrate the steps that client application software 28 performs when the taskbar icon 102 is left double clicked. Step 292 marks the beginning of the process that initiates the display of user interface 62. Step 292 is performed when it is detected that the user has left-double-clicked on taskbar icon 102.

In step 294, client application software 28 creates an interface thread, unless user interface 62 has already been created by a preexisting interface thread.

In step 296, a user interface open dialog message is sent to interface thread by client application software 28. The result of the execution of steps 294, and 296 results in the display shown in FIG. 3A.

In step 298, the process that creates user interface 62 via an interface thread exits.

Figure 20:
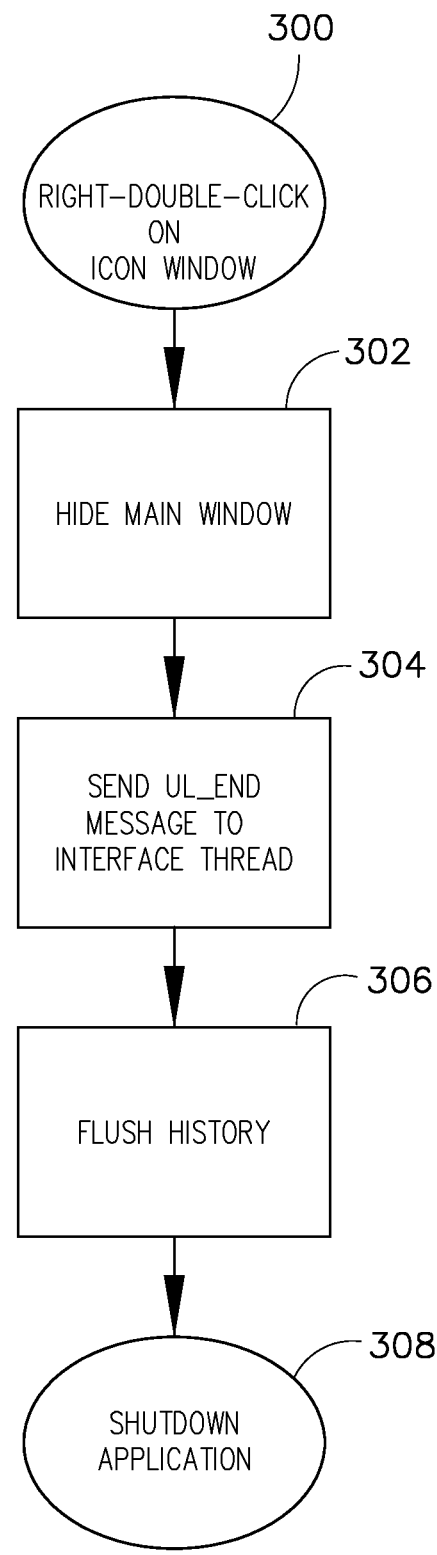

Referring now particularly to FIG. 20, in step 300, main client application software 28 determines (via the OS, for example) when taskbar icon 102 has been right double clicked and enters the process of steps 300-308.

In step 302, the "window" in which main user interface 62 would generally be displayed is hidden from the user (i.e., disappears from the display as viewed on display device 40 of client system 14).

In step 304, client application software 28 sends a user interface-end message to the interface thread portion of client application software 28.

In step 306, client application software 28 flushes the history (i.e., any unsaved user history actions or events are encrypted and written to the user history file).

In step 308, client application software 28 shuts down. This removes client application software 28 from client system 14.

Figure 21:
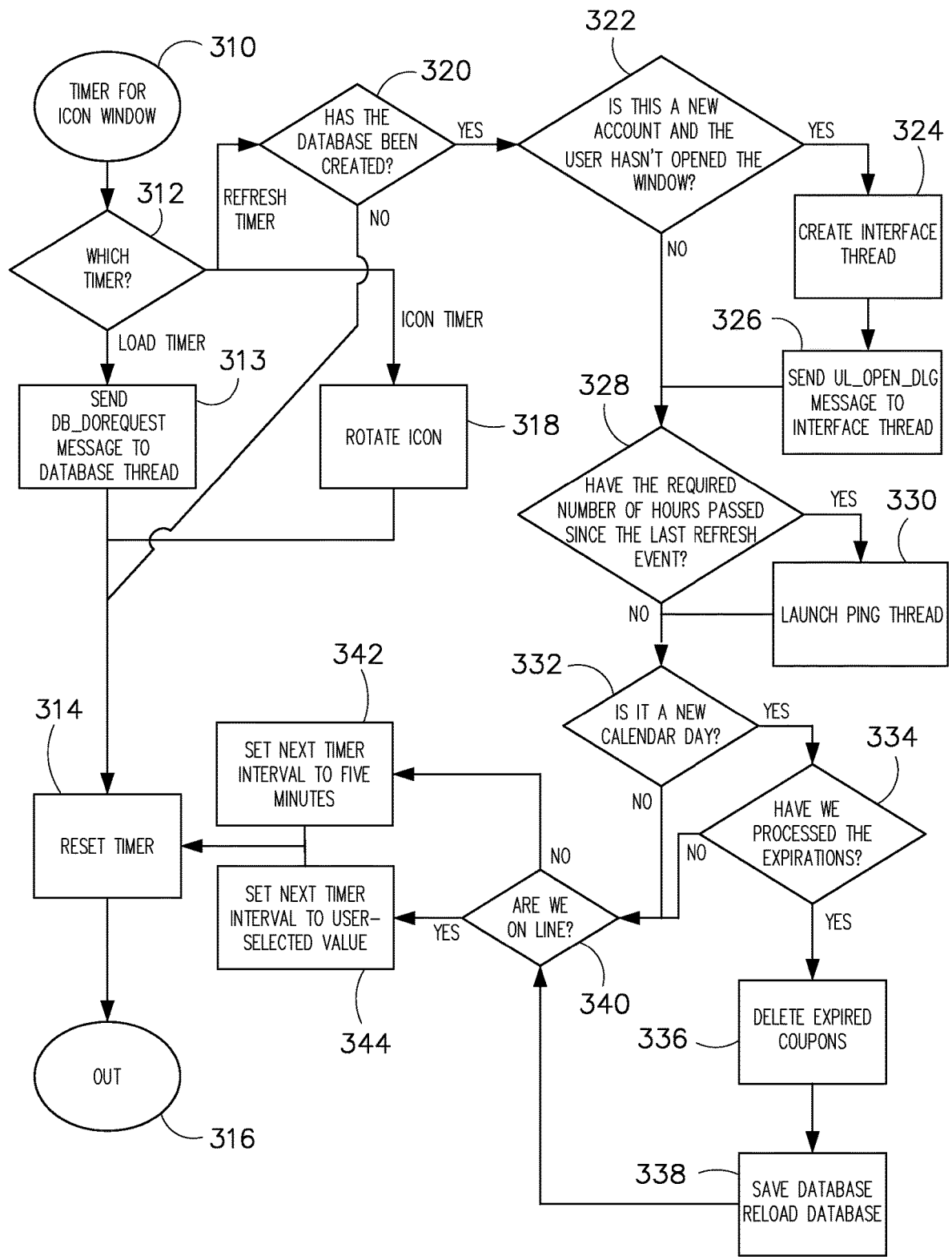
FIG. 21 is a simplified flowchart diagram view showing timing mechanisms for automatically updating coupon data without user intervention, according to an exemplary embodiment.

FIG. 21 illustrates a portion of the timing loops executing on main client application software 28.

The flow chart illustrates the operation of three timers: the "load" timer, the "icon" timer, and the "refresh" timer. The steps in FIG. 21 may hereafter be referred to as the timing loop thread. Step 310 marks the beginning of the processing for evaluating the various timing loops illustrated in FIG. 21.

In step 312, a decision is made by client application software 28 as to which timer is being evaluated. If the "load" timer is being evaluated in the timing loop thread illustrated in FIG. 21, then flow of the process continues at step 313. In step 313, the timing loop thread sends a message to the database thread. In particular, the DB_DOREQUEST is the event the database thread uses to perform the delayed downloading. Client system 14 feeds a DB_DOREQUEST event to the database thread while there are any coupons, plugins, or ad impressions remaining to download. In response to this event, the database thread pops the top download request off the download queue and retrieves that item.

Flow of the process then proceeds to step 314, wherein the "load" timer is reset. Flow of the process then proceeds to step 316, where the timing loop thread exits.

On the other hand, if the timer being evaluated is the "icon" timer, as determined in step 312, then flow of the process proceeds to step 318. In step 318, client application software 28 rotates taskbar icon 102. This is done only when there are new coupons or offers available to the user on electronic coupon distribution system 10. That is, this is the loop that causes the taskbar icon 102 to change display states so as to present a "flashing" effect to alert the user to the availability of new coupons and/or offers. The flow of the process then proceeds through steps 314-316, wherein the "icon" timer is reset and the timing loop thread is exited.

Finally, if the timer being evaluated in the timing loop thread is the "refresh" timer, as determined in step 312, then flow of the process proceeds to step 320. In step 320, the timing loop determines whether the coupon database has been created. If the answer is "NO" then the process proceeds through steps 314-316, where the refresh timer is reset, and the timing loop is exited.

On the other hand, if the answer to the inquiry in step 320 is "YES", then flow of the process proceeds to step 322. In step 322, if a user has not opened the user interface window containing user interface 62 (FIG. 3A), and, the account is a new account, then flow of the process proceeds to step 324, wherein the "create interface" thread is invoked to create user interface 62 (best shown in FIG. 3A). The process then proceeds to step 326, wherein a user interface open dialog message is sent to the interface thread, which displays user interface 62 in a window. Flow then proceeds to step 328. If the answer to the inquiry in step 322 is "NO", then flow of the process also proceeds to step 328.

In step 328, the timing loop determines whether the predetermined, number of hours has passed since the last refresh event. In accordance with the disclosure, the user may select, as described above, from a number of different refresh intervals (e.g., one-hour, two-hours, etc.). The value of this parameter is what is being tested in step 328. If the answer to this inquiry is "YES", then the process branches to step 330, where the echo-request/ping-the-net thread is invoked (FIG. 9). If the answer to step 328 is "NO", then the process branches to step 332.

In step 332, the timing loop thread determines whether the present day is a new calendar day. This parameter needs to be tested because some coupons may now be "expired" that were not "expired" on the prior calendar day. If the answer to this inquiry is "YES", then the process branches to step 334. In step 334, the timing loop thread determines whether client application software 28 has processed the coupon expirations arising because of the new calendar day. If the answer to this inquiry is "YES", then the process branches to steps 336, and 338, where expired coupons are deleted from the database (memory), the database is saved (file), and the database is thereafter reloaded into the memory of the client application software 28. The method proceeds to step 340.

If the answer to the inquiry in step 332 or step 334 is "NO" then the method branches to step 340. In step 340, the timing loop thread determines whether client system 14 is "online." It may make this determination based on the response from the "ping" thread, invoked in step 330. If the answer to this inquiry is "NO", then the process branches to step 342. In step 342, the next timer interval is set to five minutes (i.e., try again in five minutes to see if the user is "online"). According to an exemplary embodiment, client application software 28 will not force the user device to connect to Internet 16 to refresh client system 14, but will simply wait a preselected time (e.g., five minutes) and check again to see if the user is connected.

Otherwise, if the answer to step 340 is "YES", then the process branches to step 344, in which the next timer interval is set to the user-selected value (i.e., the one hour, two hour, etc. that the user chooses as the selected refresh interval).

Flow then proceeds from both steps 342 and 344 to step 314 where the "refresh" timer is reset. The process exits in step 316.

In FIG. 22, steps 346-350 illustrate the response of client application software 28 when a user "clicks" or otherwise selects logo pane 74 of user interface 62 (best shown in FIG. 3A). Step 346 marks the beginning of the routine. Step 346 is entered when client application software 28 (via the OS) detects that the user has "clicked" on or otherwise selected a portion of logo pane 74.

In step 348, client application software 28 invokes an Internet browser registered with the operating system of client system 14 as the default browser and passes thereto a URL. The Internet browser then connects to a website server resource corresponding to the specified URL. This "click" action, therefore, takes the user to the website of the company displayed in logo pane 74. Step 350 marks the end of this routine.

FIG. 23 shows the response of client application software 28 when a user "clicks" on or otherwise selects a portion of advertising pane 72 (best shown in FIG. 3A). Step 352 marks the beginning of the routine.

In step 354, client application software 28 creates a click-through history record indicative of the fact that the user has "clicked" or otherwise selected the advertiser displayed in advertising pane 72. This will be included in user history data 34, which will thereafter be encrypted and transmitted to main server system 12 for processing.

In step 356, the client application software 28 launches an Internet browser registered with the operating system of client system 14, and passes thereto a URL corresponding to the advertiser displayed in advertising pane 72. When the Internet browser executes, it connects to a website server resource defined by the URL. In-effect, the foregoing actions take the user to the advertiser's website specified in the URL.

Step 358 marks the end of this routine.

Figure 24:
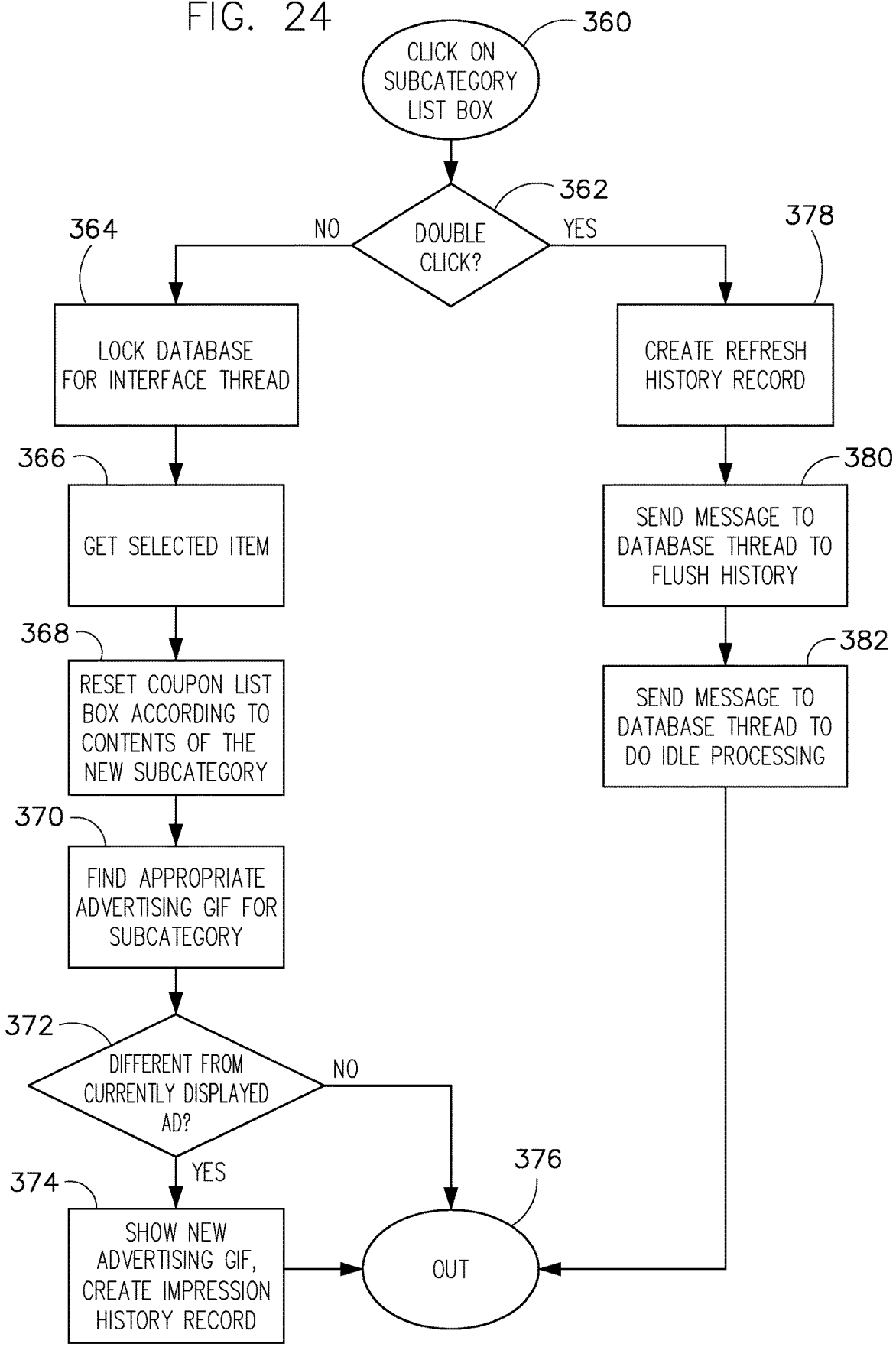
FIG. 24 is a simplified flowchart diagram view showing the steps executed by the client system when a user selects an item from a coupon subcategory list, according to an exemplary embodiment.

FIG. 24 illustrates a response taken by client application software 28 when a user "clicks" on or otherwise selects an item appearing in coupon subcategory list 68 (best shown in FIG. 3A). Step 360 marks the beginning of the process. Step 360 is entered when client application software 28 (via the OS) determines that an item in coupon subcategory list 68 has been "clicked" on.

In step 362, client application software 28 determines whether the selection was a "click" or a "double-click." Depending on which of these events occurred, client application software 28 will take alternative courses of action. If the action is a single-click, then the method branches to step 364. In step 364, the local coupon database is locked by client application software 28. The process proceeds to step 366.

In step 366, the selected subcategory item is retrieved from the local database on client system 14.

In step 368, the contents of coupon list 70 is reset by client application software 28 according to the contents of the new subcategory. For example, if the new subcategory pertains to coupons, then the new coupons associated with the new selected subcategory are displayed in coupon list 70 (best shown in FIG. 3A).

In step 370, client application software 28 determines or otherwise selects an advertising impression to be displayed in advertising pane 72 in accordance with a predetermined advertising impression selection strategy. In the illustrated embodiment, the selection criteria includes the identity of the selected coupon subcategory.

In step 372, a test is performed by client application software 28 to determine whether the newly selected advertising impression is different from the advertising impression currently being displayed. If the answer is "YES", then the process branches to step 374, where the new advertising impression is displayed in advertising pane 72, and an advertising impression history record is created for inclusion in the user history data 34. The method proceeds to step 376, which exits the thread shown in FIG. 24. If the answer to step 372 is "NO", however, then the process branches to step 376, which is an exit step.

If the action evaluated in step 362 is determined to be a "double click", then the process branches to step 378. "Double clicking" a coupon subcategory is a user request to refresh the contents of that subcategory.

In step 378, client application software 28 creates a refresh history event for that subcategory.

In step 380, client application software 28 sends to the database thread a request to flush the current history. The contents of that subcategory are then downloaded (available on display device 40) as if they were new.

In step 382, a message is sent to the database thread to do idle processing.

Figure 25:
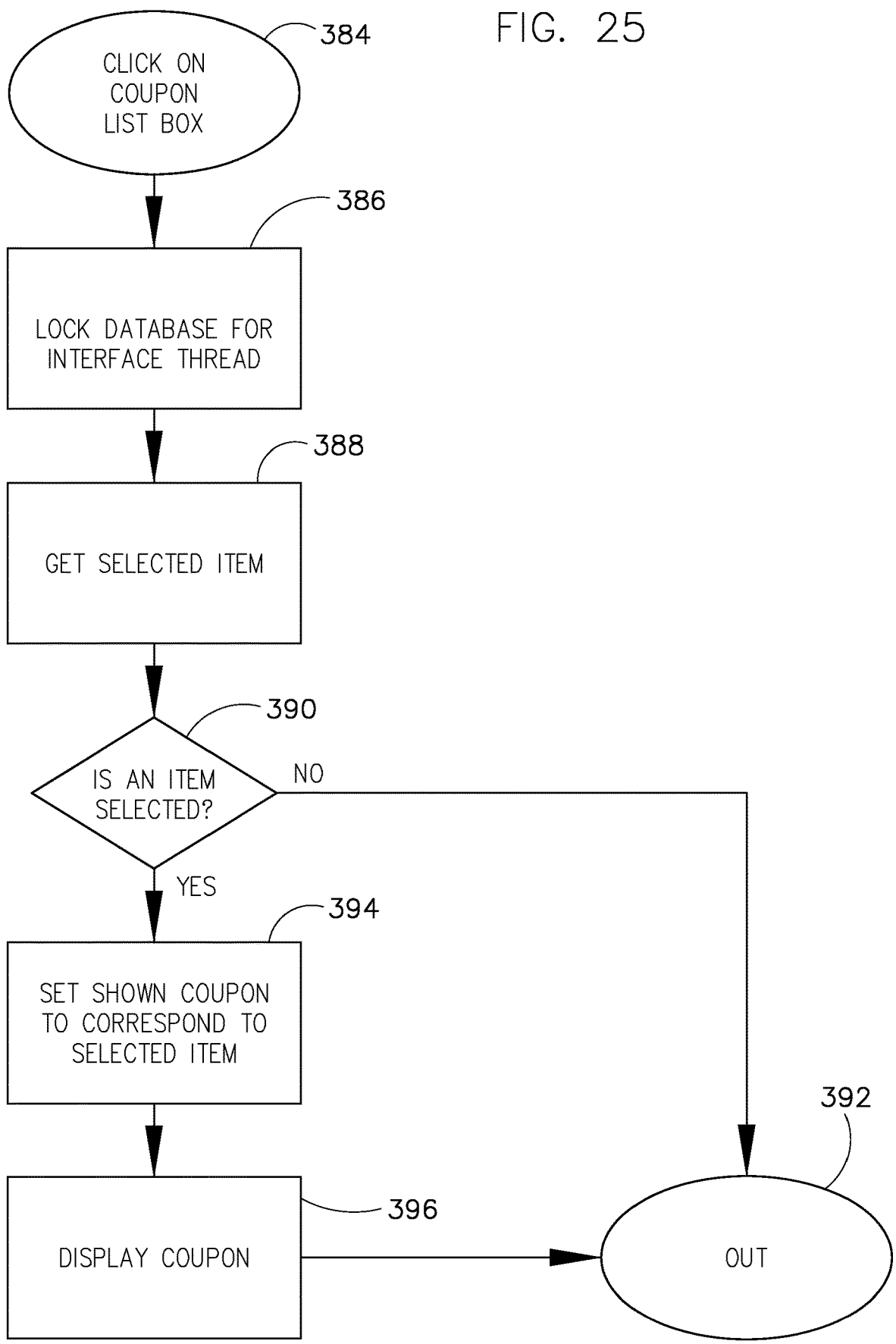
FIG. 25 is a simplified flowchart diagram view showing the steps executed by the client system when the user selects a particular coupon, according to an exemplary embodiment.

FIG. 25 illustrates the response by client application software 28 when a user "clicks" on an item from coupon list 70.

The process begins in step 384. Step 384 is entered when client application software 28 detects that an item in the coupon list 70 (VIA the OS) has been "clicked" on.

In step 386, client application software 28 locks the local coupon database for the interface thread.

In step 388, client application software 28 obtains from the local coupon database the item corresponding to that selected in coupon list 70.

In step 390, client application software 28 determines whether the item in coupon list 70 that was clicked on was actually "selected." If the answer to this inquiry is "NO", then the method branches to step 392, which is an exit.

If the answer to step 390 is "YES", then the process branches to step 394.

In step 394, client application software 28 sets the shown coupon to correspond to the item selected in coupon list 70. The process then proceeds to step 396.

In step 396, client application software 28, by way of the interface thread, displays the coupon in coupon display area 76. The method then proceeds to step 392, which is an exit step.

Figure 26:
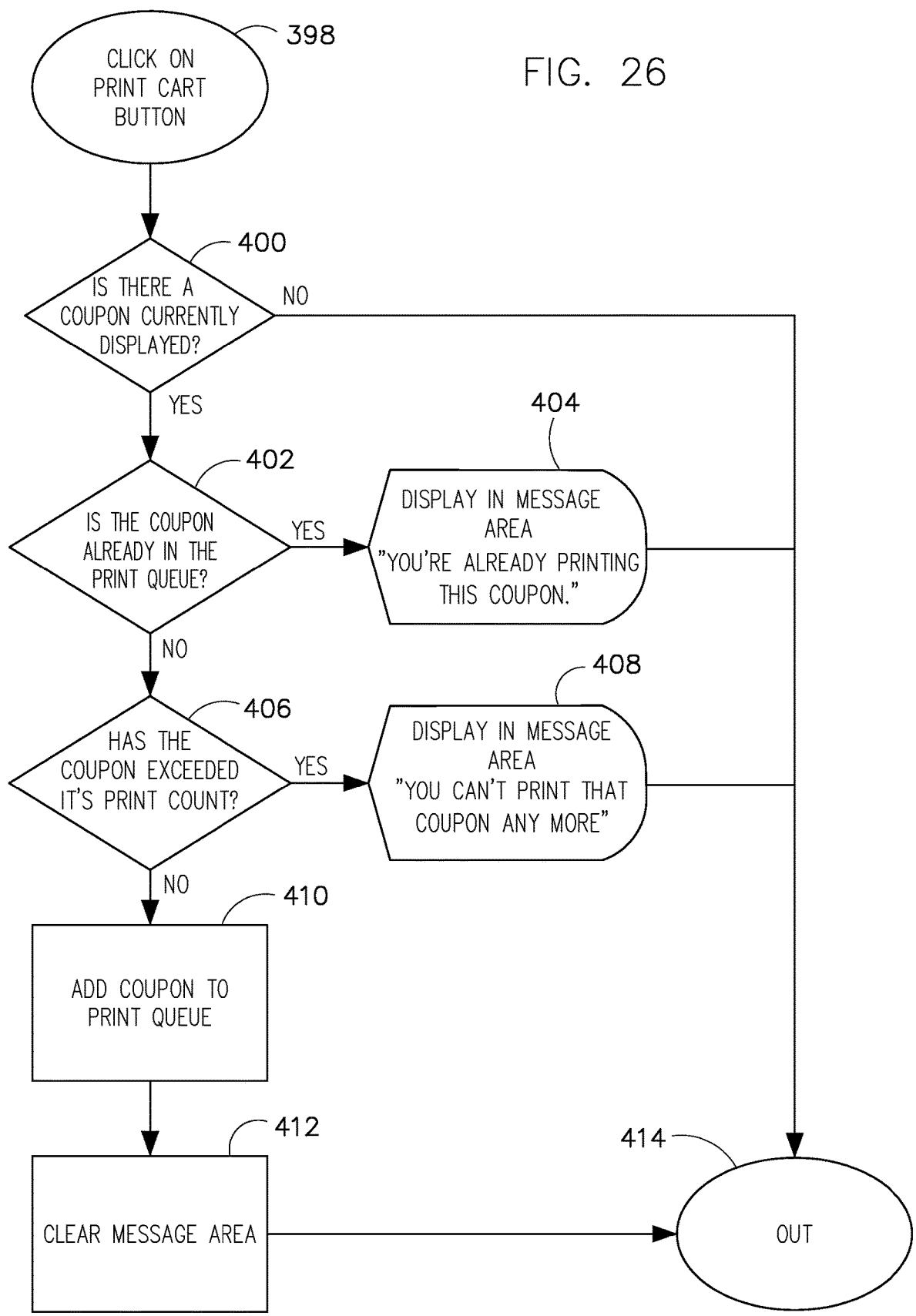
FIG. 26 is a simplified flowchart diagram view showing the steps executed by the client system when a coupon is selected and added to a print cart, according to an exemplary embodiment.

FIG. 26 illustrates the process carried out by client application software 28 when the "Print Cart" button 78 is "clicked" on or otherwise selected by the user. Step 398 is invoked when client application software 28 (VIA the OS) determines that the Print Cart button has been "clicked" on. The process then proceeds to step 400.

In step 400, client application software 28 performs a test to determine whether there is a coupon currently displayed in coupon display area 76. If the answer to step 400 is "NO", then the method branches to step 414, which is an exit step.

If the answer to step 400 is "YES", then the method branches to step 402. In step 402, client application software 28 determines whether the coupon currently being displayed in coupon display area 76 is already in the print queue. If the answer to this inquiry is "YES", then the method branches to step 404. In step 404, client application software 28 causes a predetermined message to be displayed in message display area 94 advising, for example, the user that the coupon is already in the print queue ready for printing. This insures that coupons are not inadvertently printed more times than the user desires. If the user in-fact wishes to make multiple hard copies of the coupon in coupon display area 76, the user may alternatively click on the "Print Now" button to print more than one hard-copy version of the coupon (if permitted by the rules or instructions associated with the coupon). The process then proceeds to step 414, which is an exit step.

If the answer to step 402 is "NO", then the method branches to step 406. In step 406, client application software 28 determines whether the proposed printing of the coupon would exceed the associated maximum print count for that coupon. If the answer to this step is "YES", then the method branches to step 408. In step 408, an appropriate message is displayed to the user in message display area 94, advising that no further printouts of the coupon can be made. The method then proceeds to step 414, which is an exit step.

If the answer to step 406 is "NO", then the method branches to step 410. In step 410, the coupon currently being displayed in coupon display area 76 is added to the print queue. The method proceeds to step 412, wherein message display area 94 is cleared, thereby clearing any pre-existing message displayed therein. The process then proceeds to step 414, which is an exit step.

For some electronic coupons, it is of value to limit the number of times a specific user can access and print an electronic coupon. For example, a particular vendor may wish to limit the number of electronic coupons available to a user to a specific amount. Similarly, for clickable links from advertisers (i.e., clickable advertisements), it is also of value to limit the number of times a specific user can click on the advertisement. In response to a click on a clickable advertisement, a user is typically transferred to another website that relates to the information present in the clickable advertisement. By being able to limit the number of times a specific user can click on the advertisement, the advertiser can be more certain that the click on the advertisement was a true access or intended click by a particular user.

Limiting the clicking of clickable advertisements is particularly useful to avoid click fraud. Click fraud can occur, for example, in pay per click online advertising when a person, automated script, or computer program imitates a legitimate user of a web browser clicking on an ad for the purpose of generating a charge per click without having actual interest in the target of the ad's link. Pay per click advertising is an arrangement in which webmasters (operators of web sites), acting as publishers, display clickable advertisements from advertisers, in exchange for a charge per click. By limiting the number of times a particular client system 14 can click on a clickable advertisement to a set amount, e.g., three, the ability to commit click fraud is significantly reduced. Moreover, if an advertiser can control the number of clicks to a clickable advertisement from a particular client system 14, the advertiser is more likely to increase the amount it will pay for each unique click of the clickable advertisement.

To promote control over the clicking on of clickable advertisements, each clickable advertisement can include an access limit, which defines the number of times any client system can click on the clickable advertisement. For example, if the access limit for a clickable advertisement is three, then client application software 28 of a particular client system 14 would only be able to click on that clickable advertisement three times. In an exemplary embodiment, client application software 28 may be configured to allow access to the advertisement but not increment the count for revenue generation purposes (e.g., search engine revenue, etc.).

The system for displaying an advertisement from an advertisement database on a client computer on a network may include processing circuit 502 configured to receive a display request for an advertisement and to provide access to display the advertisement. Processing circuit 502 may be further configured to determine a revenue counting display limit and a number of times the advertisement has been displayed. Processing circuit 502 may also be configured to increment a revenue account or revenue counter based on a comparison of the number of times the advertisement has been displayed to the revenue counting display limit.

The system for displaying an advertisement from an advertisement database on a client computer on a network may also not increment the revenue account if the number of times the advertisement has been displayed exceeds the revenue counting display limit. The system for displaying an advertisement from an advertisement database on a client computer on a network may also increment the revenue account if the number of times the advertisement has been displayed does not exceed the revenue counting display limit.

The system for displaying an advertisement from an advertisement database on a client computer on a network may also include processing circuit 502 or components thereof being configured to be partially operated on main server system 12. Processing circuit 502 or components thereof may also be configured to be partially operated on client system 14 or client computing device.

The system for displaying an advertisement from an advertisement database on a client computer on a network may also include the revenue counting display limit being stored on main server system 12.

The access limit for each clickable advertisement could be stored, for example, in database server 24, or in a secure area of client system 14. In addition, for each clickable advertisement, a counter can be maintained in the database server 24 for each DeviceID data 30. The counter counts the number of times a particular DeviceID data 30 has clicked on the associated clickable advertisement.

The method for controlling access to electronic coupons may include assigning an identifier (e.g., DeviceID data 30) to a client computer and receiving a request from client application software 28 operating on the client computer to view electronic coupon image data for the electronic coupon. The method may also include displaying the electronic coupon image data on the client computer and receiving a request to access the electronic coupon from client application software 28. The request may include the identifier assigned to the client computer. The method may also include determining an access limit for the electronic coupon. The access limit being a number of times that the client computer is permitted to access the electronic coupon. The method may also include determining the number of times the electronic coupon has been accessed based on the identifier and controlling access to the electronic coupon based on the number of times the electronic coupon has been accessed and the access limit. The method may further include transmitting the electronic coupon to the client computer based on the controlling step. The method may also include transferring the user to a website corresponding to the electronic coupon in response to a request for more information from the client computer. The method may also include incrementing a counter associated with the electronic coupon in response to the request wherein the counter corresponding to the number of times the electronic coupon has been accessed. The method may also include transmitting the electronic coupon access report to a remote device. The method may further include that the electronic coupon image data comprises a thumbnail image and an overlay information.

It should be noted that access may include transmitting data to a print queue, transmitting data based on clicking on or any other method of activating a hyper link, initiating a search (e.g., an internet search engine, an intranet search engine, a local computing device search, or any other search known to a person skilled in the art), displaying data, receiving data, transmitting data or any combination thereof. Access as used herein may refer to any of a number of ways that client system 14 may be configured to provide access to the user, in various alternative embodiments. It should also be noted that access limit may include number of times client system 14 may print an advertisement, number of times client system 14 may send an advertisement to a print queue, number of times client system 14 may be allowed to display an advertisement, the number of times client system 14 may be allowed to click thorough a clickable link to display an advertisement, the number of times client system 14 may be allowed to download an advertisement from the advertisement server, the number of times a user may click on a link which is a result of a search performed on an internet search engine, or any other way client system 14 may be allowed to access an advertisement. The access limit may be limits on other user accesses to advertisement. Accordingly, providing access, limiting access, or requesting access as used herein may refer to steps relating to any of the above mentioned types of access.

FIGS. 27A and 27B are flow diagrams of processes for controlling the number of clicks to a clickable advertisement. As shown in FIG. 27A, in step 420, a request is received from client application software 28 of a particular client system 14 to view clickable advertisements. The request preferably includes DeviceID data 30, which is a unique identifier assigned to the client system 14 that uniquely identifies client system 14 making the request. The request can be made in response to linking or accessing a particular website or by submitting the request through user interface 62.

In step 422, an access limit is identified for each of the clickable advertisements that are responsive to the received request. Based on the received request, main server system 12 can identify an appropriate handler 22 and database server 24 for servicing the request. Handler 22 accesses database server 24, which can includes a list of available clickable advertisements, to identify the clickable advertisements (including coupons) responsive to the request and to identify the access limits associated with those clickable advertisements.

In step 424, for each of the clickable advertisements responsive to the request, it is determined how many times each clickable advertisement has been clicked on by client application software 28 and/or client system 14 based on the associated DeviceID data 30. This information can be determined by checking the values of the counters held in database server 24 for each clickable advertisement corresponding to DeviceID data 30 provided in the request.

In step 426, clickable advertisements are made available to the requesting client system 14 that have been accessed (i.e., clicked on) by client system 14 fewer times than the access limit. To determine if a clickable advertisement should be made available, main server system 12 compares the identified access limit to the determined number of accesses set in the corresponding counter. If the access limit is greater than the determined number of accesses set in the corresponding counter, then the clickable advertisement is made available to the requesting client system 14. On the other hand, if the access limit is equal to (or less than) the determined number of accesses set in the corresponding counter, then the clickable advertisement is not made available to the requesting client system 14. The clickable advertisements made available to the client system 14 can be viewed, for example, in advertising pane 72 and or logo pane 74. Each of the clickable advertisements made available to client system 14 can be accessed, i.e., clicked on, by the user at client system 14.

In step 428, in addition to making the clickable advertisement available to be clicked on by the user at client system 14, if the clickable advertisement is an electronic coupon, then the user is permitted to print those electronic coupons as well. To print an electronic coupon, the user can select the "Print Now" button 80 which prints the coupon currently being viewed on printer 46. In step 430, in response to the click of the clickable advertisement, the counter associated with that clickable advertisement and corresponding to DeviceID data 30 of client application software 28 and/or client system 14 is incremented. More specifically, client application software 28 can generate a signal to main server system 12 indicating that the clickable advertisement has been clicked on, and based on that signal the server increments the applicable counter in database server 24. The signal may include information identifying the clickable advertisement, as well as DeviceID data 30 of client system 14. Accordingly, each time a clickable advertisement is clicked on, the counter associated with the clickable advertisement is incremented, and once the count in the counter reaches the access limit, the user at that client system 14 is no longer permitted to click on that clickable advertisement. It should be noted that client system 14 may be a client computer.

The method for controlling access to advertisement in a network may include assigning an identifier to a client computer and receiving a request from client application software 28 operating on the client computer to access the advertisement. The request may include the identifier assigned to the client computer. The advertisement may have an access limit. The access limit may comprise the number of times that the client computer is permitted to access the advertisement. The method may also include determining the number of times that the advertisement has been accessed by the client computer based on the identifier. The method may further include comparing the number of times the advertisement has been accessed to the access limit and providing the client computer with access to the advertisement based on the comparison. The method may also include sending to the client computer the advertisement if the access limit has not been exceeded. The method may further include transferring the user to a website corresponding to the advertisement if the access limit has not been exceeded. The method may further include refusing access for the client computer to the advertisement if the access limit has been met or exceeded. The method may also include sending to the client computer a message indicating that access has been refused. The method may also include incrementing the access counter based on receiving the request from the client application operating on the client computer to access the advertisement. The method may further include transmitting an advertisement access report to a remote server. The method may further include the identifier being assigned to the client computer by the client application. The method may also include that the identifier being assigned to the client computer is not one of a DeviceID data 30 or an internet protocol address. The method may also include encrypting the advertisement at a server to generate a first encrypted advertisement and further encrypting the first encrypted advertisement at the client computer to generate a second encrypted advertisement.

The system for monitoring access to an advertisement may include processing circuit 502 configured to determine an advertisement access limit and the number of times the advertisement has been accessed, according to an exemplary embodiment. The system may further include processing circuit 502 being configured to be partially operated on a server, according to an exemplary embodiment. The system may also include processing circuit 502 being configured to be partially operated on a client computing device, according to an exemplary embodiment. The system may further include processing circuit 502 being configured to receive a request to access an advertisement, according to an exemplary embodiment. The request may include an identifier assigned to the computing device, according to an exemplary embodiment. Processing circuit 502 may determine the number of times that the advertisement has been accessed by the computing device based on the identifier, according to an exemplary embodiment. Processing circuit 502 may generate a comparison based on an access counter module/circuit data and an access limit module/circuit data, according to an exemplary embodiment. Processing circuit 502 may transmits an access control signal based on the comparison, according to an exemplary embodiment. The system may also include processing circuit 502 determining that the access limit has not been exceeded based on the comparison and transmits the advertisement to the computing device, according to an exemplary embodiment. The system may further include the user being transferred to a website corresponding to the advertisement based on a request for more information, according to an exemplary embodiment. The system may also include processing circuit 502 determining that the access limit has been exceeded and the advertisement is not sent to the computing device, according to an exemplary embodiment.

FIG. 27B illustrates a process similar to the one in FIG. 27A. Like the process of FIG. 27A, in step 432 of FIG. 27B, a request is received from the client application software 28 to view clickable advertisements, the request including DeviceID data 30 that uniquely identifies client system 14 making the request. However, instead of checking the access limit of responsive clickable advertisements, all clickable advertisements that are responsive to the request are made available to the requesting client system 14 in step 434. To determine which clickable advertisements are responsive, main server system 12 can identify an appropriate handler 22 and database server 24 for servicing the request. Handler 22 can access database server 24 to identify the clickable advertisements responsive to the request. The user at client system 14 can try to click on any of the clickable advertisement made available to client system 14.

In step 436, in response to clicking on a selected clickable advertisement, a request is received by main server system 12 for access to that clickable advertisement. The request may include information identifying the selected clickable advertisement, as well as DeviceID data 30 of the requesting client system 14. In step 438, in response to the received request, an access limit is identified for the selected clickable advertisement. More particularly, main server system 12 can identify an appropriate handler 22 to access database server 24 and identify the access limits associated with the selected clickable advertisement. In step 440, it is determined how many times the selected clickable advertisement has been clicked on by client application software 28 and/or client system 14 based on the associated DeviceID data 30. This information can be determined by checking the values of the counter held in database server 24 for the selected clickable advertisement corresponding to DeviceID data 30 provided in the request.

In step 442, the user is permitted to click on and access the selected clickable advertisement if it is determined that the clickable advertisement has been accessed by client system 14 fewer times than the access limit. To determine if a clickable advertisement should be made available, main server system 12 compares the identified access limit to the determined number of accesses (i.e., clicks) set in the corresponding counter. If the access limit is greater than the determined number of accesses set in the corresponding counter, then the user is permitted to click on and access the clickable advertisement at the requesting client system 14. On the other hand, if the access limit is equal to (or less than) the determined number of accesses set in the corresponding counter, then the user is not permitted to click on and access the clickable advertisement at client system 14. If permitted to click on and access the clickable advertisement, and the clickable advertisement is an electronic coupon, then the user can print the electronic coupon, for example, by selecting the "Print Now" button 80, which prints the coupon currently being viewed on printer 46.

In step 444, in response to the click of a clickable advertisement, the counter associated with that clickable advertisement and corresponding to DeviceID data 30 of client application software 28 and/or client system 14 is incremented. More specifically, client application software 28 can generate a signal to main server system 12 indicating that the accessed clickable advertisement has been clicked on, and based on that signal main server system 12 increments the applicable counter in database server 24. The signal may include information identifying the clickable advertisement, as well as DeviceID data 30 of client system 14. Accordingly, each time a clickable advertisement is clicked on and accessed, the counter associated with the clickable advertisement is incremented, and once the count in the counter reaches the access limit, no user at that client system 14 is permitted to click on and access that clickable advertisement.

The method for controlling access to a clickable advertisement in a network includes assigning a computer identifier to a client computer and receiving a request from client application software 28 operating on the client computer to access the clickable advertisement. The request includes the computer identifier assigned to the client computer. The clickable advertisement having an access limit. The access limit being the number of times that the client computer is permitted to access the clickable advertisement. The method may include determining the number of times that the clickable advertisement has been accessed by the client computer based on the computer identifier. The method also may include comparing the number of times the clickable advertisement has been accessed to the access limit. The method may include providing the client computer with access to the clickable advertisement based on the comparison and storing the comparison. The method may further include sending to the client computer the clickable advertisement based on the comparison because the comparison determined that the access limit has not been exceeded. The method may further include transferring the user to a website corresponding to the clickable advertisement based on the comparison because the comparison determined that the access limit has not been exceeded. The method may further include refusing access for the client computer to the clickable advertisement based on the comparison because the comparison determined that the access limit has been exceeded. The method may also include sending a message to the client computer indicating that access has been refused. The method may further include incrementing an access counter based on receiving the request from client application software 28 operating on the client computer to access the clickable advertisement. The method may further include transmitting a clickable advertisement access report.

Figure 28:
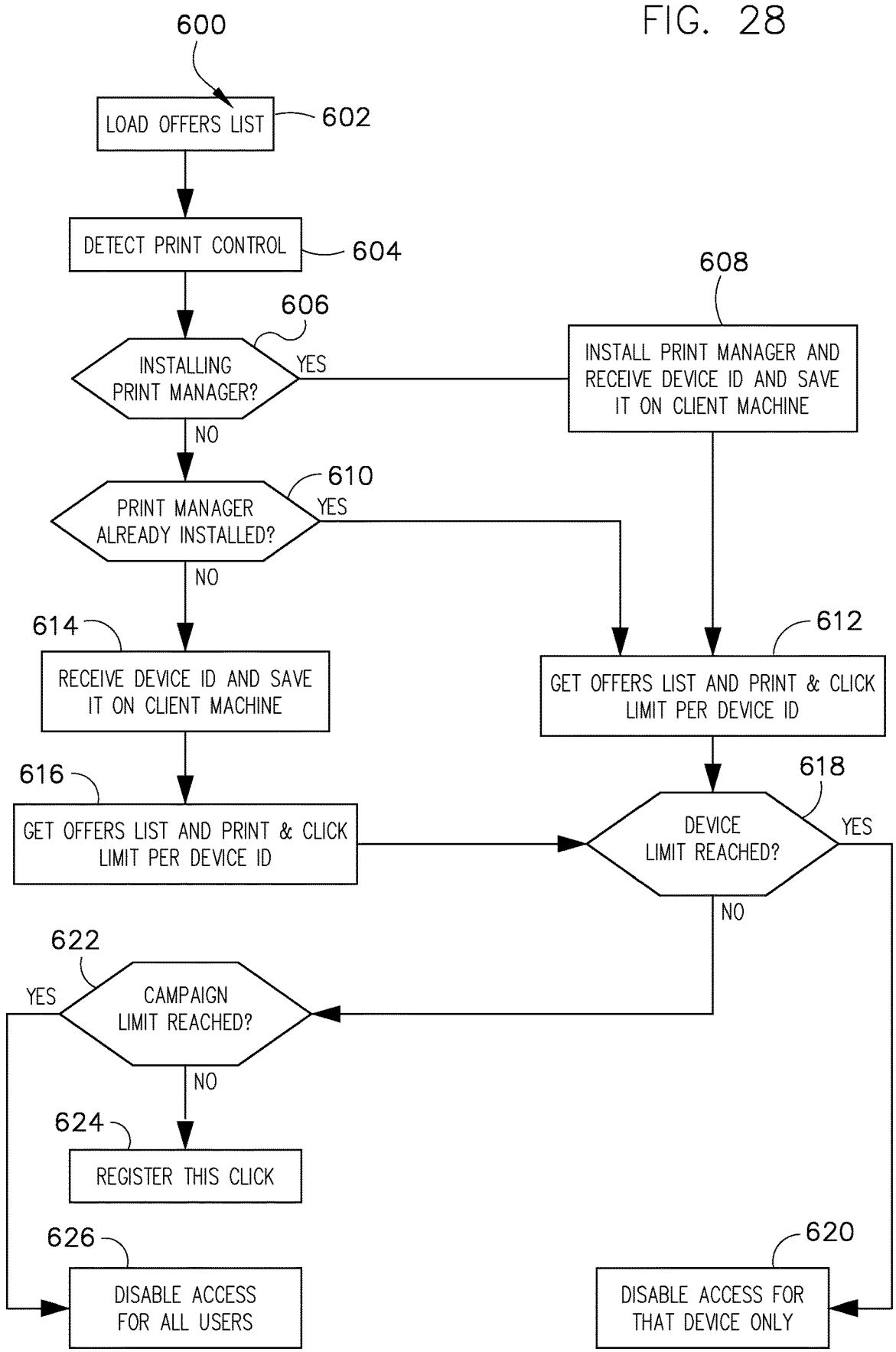
FIG. 28 is another flow diagram of the process for controlling the number of clicks to a clickable advertisement, according to an exemplary embodiment.
Figure 29:
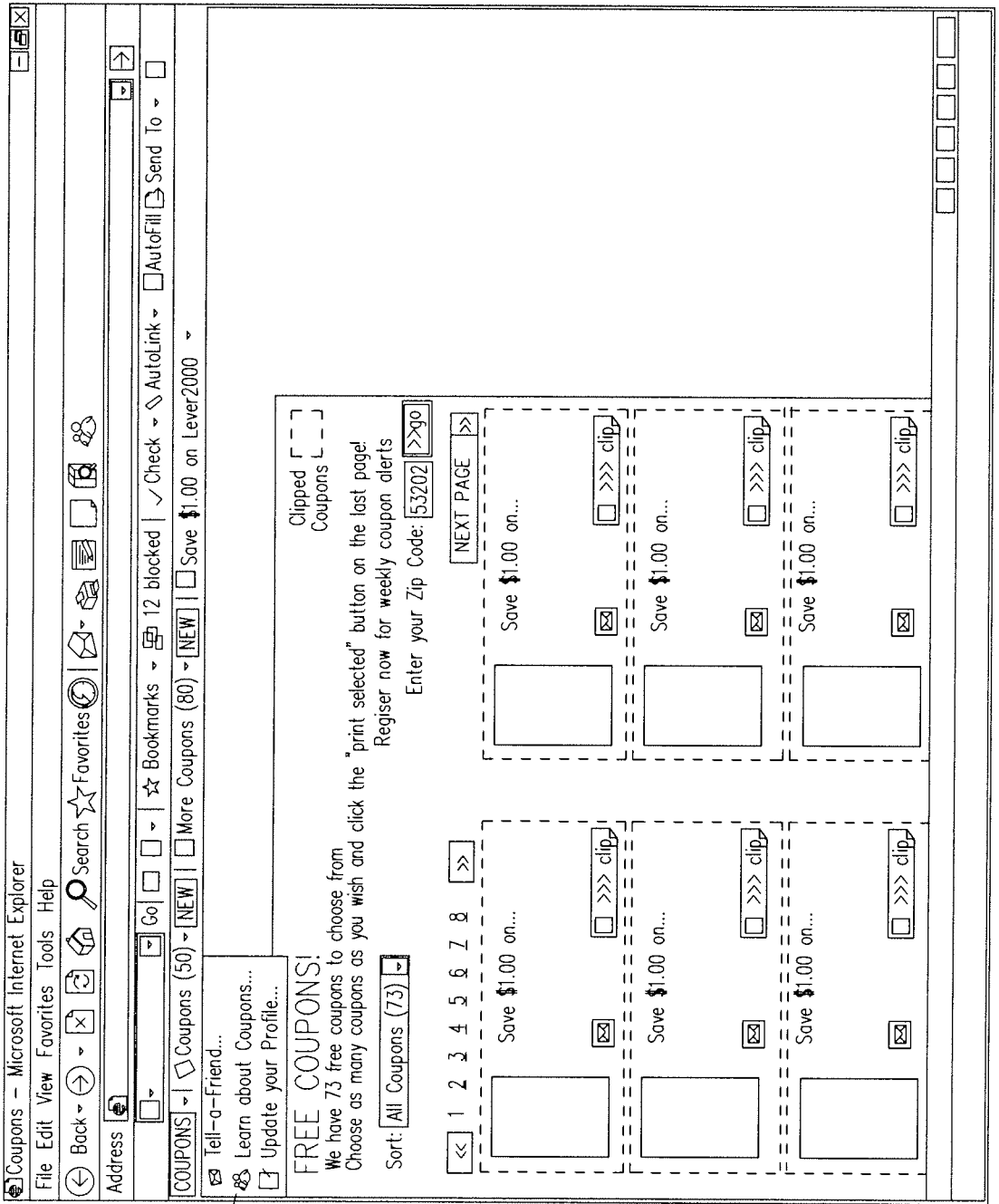
FIG. 29 illustrates a screen display defining an interface associated with a client system portion, according to an exemplary embodiment.
Figure 30:
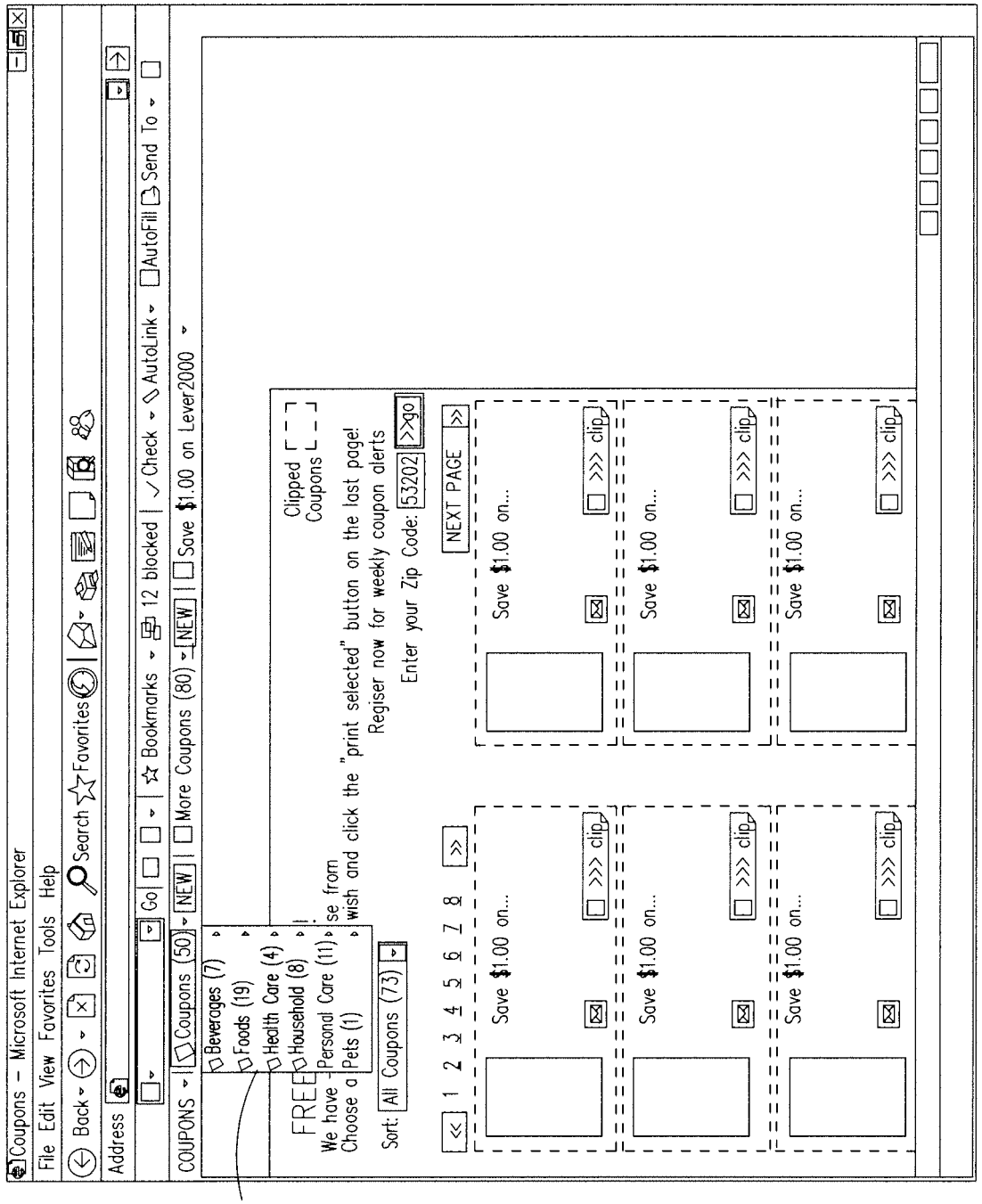
FIG. 30 illustrates another screen display defining an interface associated with a client system portion, according to an exemplary embodiment.
Figure 31:
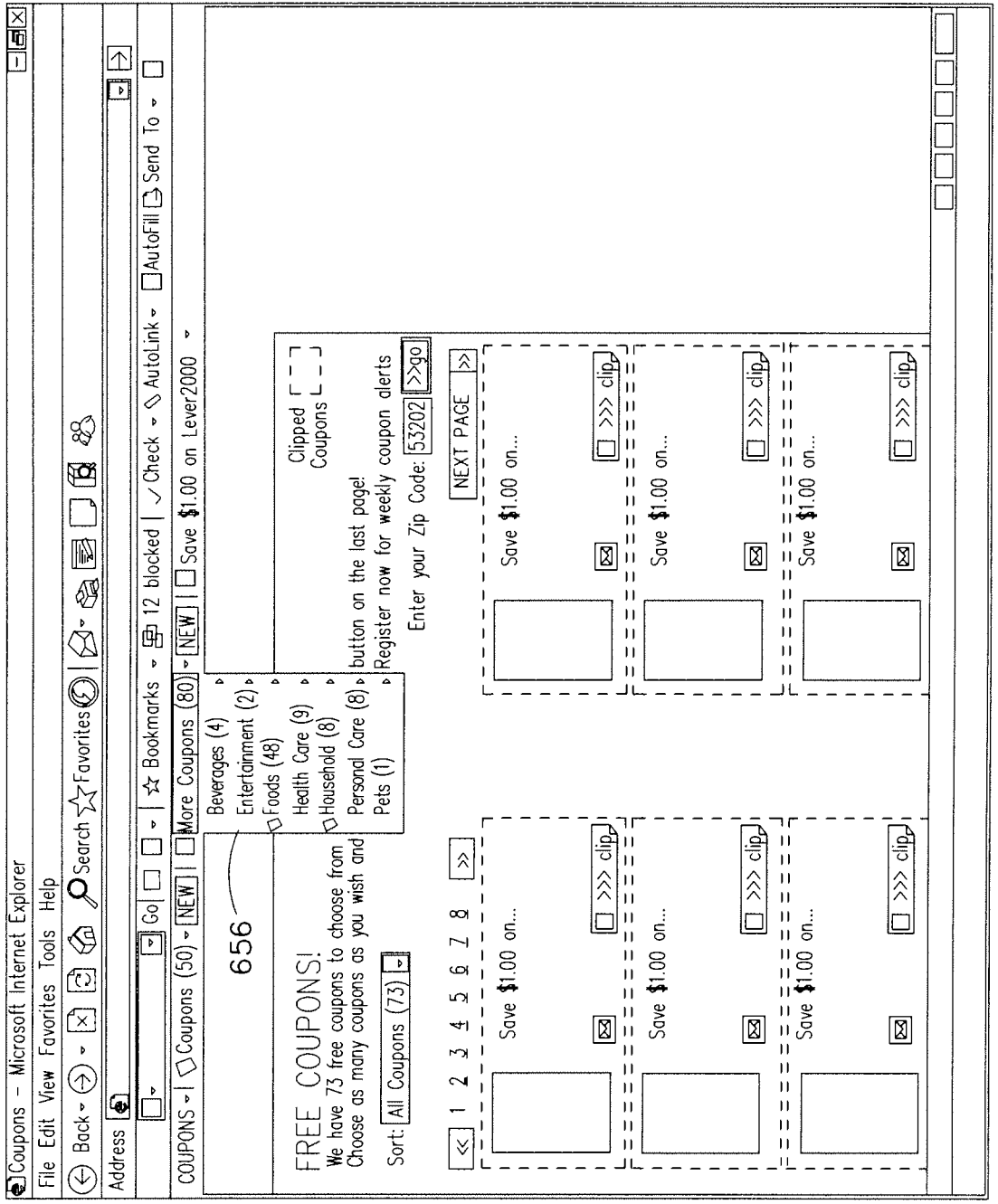
FIG. 31 illustrates another screen display defining an interface associated with a client system portion, according to an exemplary embodiment.
Figure 32:
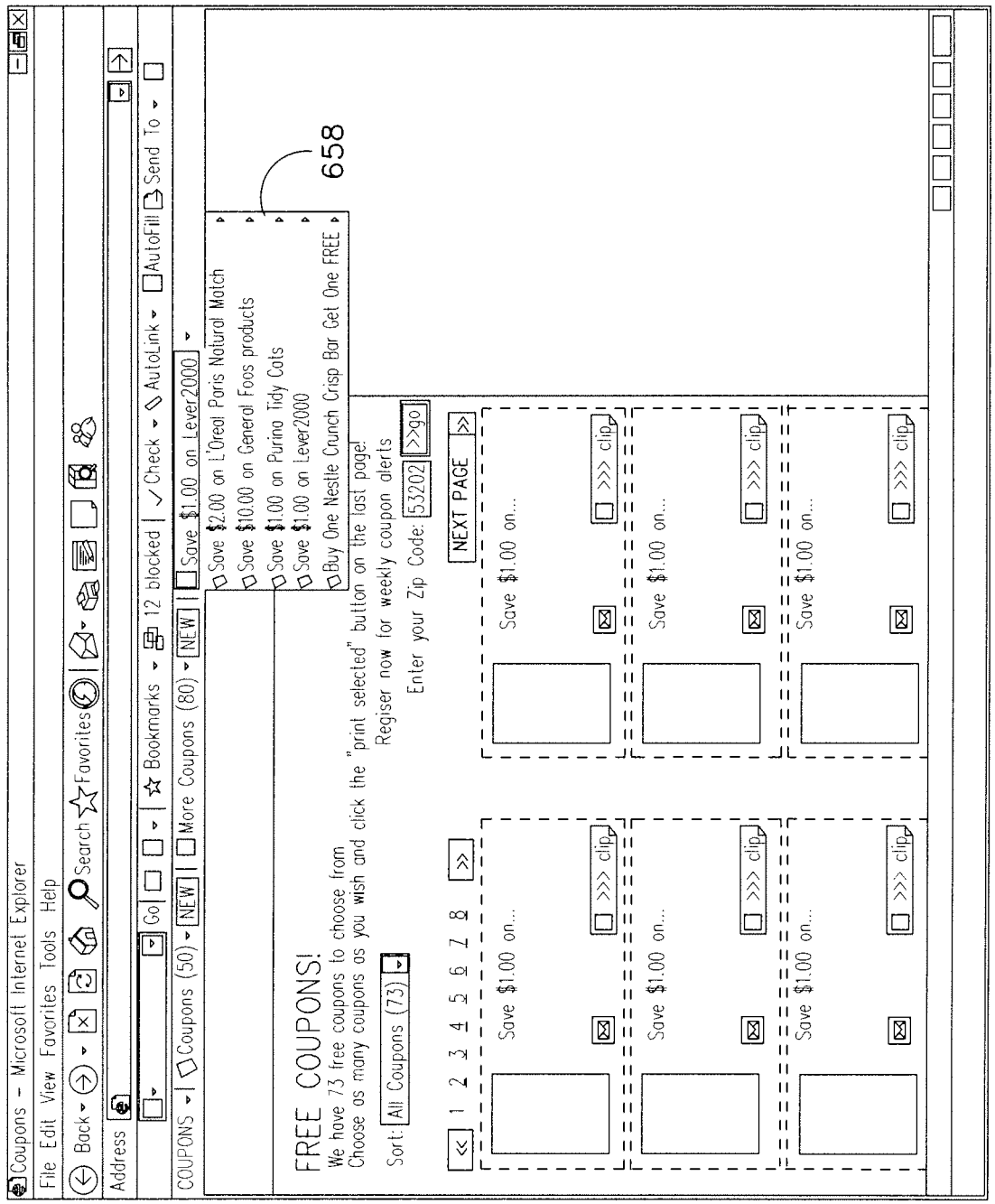
FIG. 32 illustrates another screen display defining an interface associated with a client system portion, according to an exemplary embodiment.

Referring to FIG. 28, a flow diagram 600 of the process for controlling the number of clicks to a clickable advertisement is shown, according to an exemplary embodiment. In step 602, the system loads an offers list onto the client device, a server, and/or another computing device. An offers list is a set of advertisements, coupons, websites, or any other offers. In step 604, the system detects the print control of the client device, server, and/or another computing device. In step 606, the system determines whether the print manager will be installed. If the print manager will be installed, then the process moves to step 608. In step 608, the system installs the print manager and receives DeviceID data 30 and save it on client device, server, and/or another computing device. After installing print manager and receiving DeviceID data 30 (step 608), the process moves to step 612. If the print manager will not be installed, then the process moves to step 610. In step 610, the system determines whether the print manager is already installed. If the print manager is not already installed, the process moves to step 614. In step 614, the system receives DeviceID data 30 and saves it on client device, server, and/or another computing device. In step 616, the system receives the offering lists, print limits per DeviceID data 30 and click limits per DeviceID data 30. If the print manager is already installed, the process moves to step 612. In step 612, the system receives the offering lists, print limits per DeviceID data 30 and click limits per DeviceID data 30. In step 618, the system determines whether the device limit has been reached. If the device limit has been reached, then in step 620 the system disables access to the data requested by that device. If the device limit has not been reached, then the process moves to step 622. In step 622, the system determines whether the campaign limit has been reached. A campaign limit may be a promotional limit, a budget limit, a sales limit or any other limit placed on the advertisement. If the campaign limit has been reached, then the system in step 626 disables access to the data for all devices. If the system determines that the campaign limit has not been reached, then the system in step 624 registers the access to the data.

Referring to FIGS. 29-32, illustrations of a screen display defining an interface associated with a client system portion are shown, according to exemplary embodiments. FIGS. 29-32 are similar to FIGS. 3A and 3B with the added feature of being able to utilize a pull down menu 652, 654, 656, and 658 to retrieve coupon data.

It is to be understood that the above description is merely exemplary rather than limiting in nature, the disclosure being limited only by the appended claims. Various modifications and changes may be made thereto by one of ordinary skill in the art which embody the principles of the disclosure and fall within the spirit and scope thereof. For example, one or more steps described herein as being performed by client system 14 or main server system 12 may be performed by the other of client system 14 or main server system 12, or by both. For example, a thin client may be operable on client system 14 to interface with main server system 12. A thin client is a client computer or client software in client-server architecture networks which depends primarily on the central server for processing activities, and mainly focuses on conveying input and output between the user and the remote server. In contrast, a thick or fat client does as much processing as possible and passes only data for communications and storage to the server. Many thin client devices run only web browsers or remote desktop software, meaning that all significant processing occurs on the server.

The foregoing description of exemplary embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments (which can be practiced separately or in combination) were chosen and described in order to explain the principles of the disclosure and as a practical application to enable one skilled in the art to make and use the disclosure in various embodiments and with various modifications suited to the particular uses contemplated. It is intended that the scope of the disclosure be defined by the claims appended hereto and their equivalents.

What is claimed is:

1. A method comprising:
storing, by a server computer, for a specific advertisement, a revenue counting access limit for reducing click fraud;
resetting the revenue counting access limit for the specific advertisement at a predetermined time interval for a predetermined number of times, including resetting the revenue counting access limit automatically to a new access limit value in response to determining that a specified time passed since the last access attempt;
receiving, by the server computer, a request from a particular client to allow the particular client executing at a particular device to access to the specific advertisement, the request specifically identifying to the server computer the specific advertisement, the request further including a device identifier that identifies the particular device, wherein the device identifier is not a user identifier;

identifying, by the server computer, the revenue counting access limit for the specific advertisement;

based on the device identifier, determining, by the server computer, a number of times that access to the specific advertisement has previously been requested for the particular device;

based on comparing the revenue counting access limit to the number of times that access to the specific advertisement has previously been requested for the particular device, determining, by the server computer, whether to increment a revenue counter for the specific advertisement in response to the request;

when the number of times that access to the specific advertisement has previously been requested for the particular device is less than the revenue counting access limit, granting, by the server computer, the particular client access to the specific advertisement in response to the request, and further generating, by the server computer, a charge to an advertiser of the specific advertisement for the particular client accessing the specific advertisement;

when the number of times that access to the specific advertisement has previously been requested for the particular device exceeds the revenue counting access limit for the specific advertisement, determining to not increment the revenue counter, and further granting access to the specific advertisement in response to the request;

wherein the method is performed by one or more computing devices.

2. The method of claim 1, further comprising not incrementing the revenue counter when the number of times that access to the specific advertisement has previously been requested for the specific advertisement exceeds the revenue counting access limit for the specific advertisement.

3. The method of claim 1, wherein the one or more computing devices are members of a server-side system; wherein the request is received from the particular client.

4. The method of claim 1, wherein the one or more computing devices is the particular device, connected to a server from which the particular client is configured to receive the specific advertisement; wherein the request is received from a user of the particular client.

5. The method of claim 1, wherein the specific advertisement comprises a discount coupon.

6. The method of claim 1, further comprising not generating a charge based on the request when the number of times that access to the specific advertisement has previously been requested for the particular device exceeds the revenue counting access limit for the specific advertisement.

7. The method of claim 1, further comprising receiving the specific advertisement from the advertiser, wherein the advertiser is a third party advertiser.

8. The method of claim 1, further comprising granting access to the specific advertisement regardless of whether the revenue counter is incremented, in response to the request.

9. The method of claim 1, further comprising granting access to the specific advertisement by performing at least one of:

sending the specific advertisement to the particular client;

sending a message to the particular client indicating that the particular client is authorized to allow a user to browse to a clicked link from which the specific advertisement may be obtained;

sending a message to the particular client indicating that the particular client is authorized to display the specific advertisement to the particular client, the specific advertisement having been previously downloaded by the particular client.

10. The method of claim 1, wherein number of times that access to the specific advertisement has previously been requested for the particular device is a number of times that access to the specific advertisement has previously been requested for the particular device over a specific period of time.

11. A system comprising a processing circuit, wherein the processing circuit comprises one or more processors configured to cause:

storing, at a server, for a specific advertisement, a revenue counting access limit for reducing click fraud;

receiving, at the server, a request to allow a particular client executing at a particular device to provide access to the specific advertisement, the request specifically identifying the specific advertisement, the request further including a device identifier that identifies the particular device, wherein the device identifier is not a user identifier;

the server identifying the revenue counting access limit for the specific advertisement;

resetting the revenue counting access limit for the specific advertisement at a predetermined time interval for a predetermined number of times, including resetting the revenue counting access limit automatically to a new access limit value in response to determining that a specified time passed since the last access attempt;

based on the device identifier, the server determining a number of times that access to the specific advertisement has previously been requested for the particular device;

based on comparing the revenue counting access limit for the specific advertisement to the number of times that access to the specific advertisement has previously been requested for the specific advertisement, the server determining whether to increment a revenue counter for the specific advertisement in response to the request;

when the number of times that access to the specific advertisement has previously been requested for the particular device is less than the revenue counting access limit, the server granting the particular client access to the specific advertisement in response to the request, and further generating a charge to an advertiser of the specific advertisement for the particular client accessing the specific advertisement;

when the number of times that access to the specific advertisement has previously been requested for the particular device exceeds the revenue counting access limit for the specific advertisement, determining to not incrementing the revenue counter, and further granting the particular client permission to provide access to the specific advertisement in response to the request.

12. The system of claim 11, wherein the one or more processors are further configured to cause not incrementing the revenue counter when the number of times that access to the specific advertisement has previously been requested exceeds the revenue counting access limit for the specific advertisement.

13. The system of claim 11, wherein the specific advertisement comprises a coupon.

14. The system of claim 11, wherein the one or more processors are further configured to cause not generating a charge based on the request when the number of times that access to the specific advertisement has previously been requested for the particular device exceeds the revenue counting access limit for the specific advertisement, not generating a charge based on the request.

15. The system of claim 11, wherein the one or more processors are further configured to cause receiving the specific advertisement from the advertiser, wherein the advertiser is a third party advertiser.

16. The system of claim 11, wherein the one or more processors are further configured to cause granting the particular client permission to provide access to the specific advertisement regardless of whether the revenue counter is incremented, in response to the request.

17. The system of claim 11, wherein the one or more processors are further configured to cause granting access to the specific advertisement by performing at least one of:
    sending the specific advertisement to the particular client;
    sending a message to the particular client indicating that the particular client is authorized to allow a user to browse to a clicked link from which the specific advertisement may be obtained;
    sending a message to the particular client indicating that the particular client is authorized to display the specific advertisement to the particular client, the specific advertisement having been previously downloaded by the particular client.

18. The system of claim 11, wherein number of times that access to the specific advertisement has previously been requested for the particular device is a number of times that access to the specific advertisement has previously been requested for the particular device over a specific period of time.

19. One or more non-transitory computer-readable storage media comprising instructions that, when executed by one or more computing devices, causes:
    at a particular client executing at a particular device, receiving input from a user indicating a request for access to a specific advertisement, the input specifically identifying the specific advertisement;
    the particular client receiving the specific advertisement from a server;
    identifying a revenue counting access limit for reducing click fraud for the specific advertisement;
    resetting the revenue counting access limit for the specific advertisement at a predetermined time interval for a predetermined number of times, including resetting the revenue counting access limit automatically to a new access limit value in response to determining that a specified time passed since the last access attempt;
    determining a number of times that access to the specific advertisement has previously been requested at the particular device;
    based on comparing the revenue counting access limit to the number of times that access to the specific advertisement has previously been requested for the particular device, determining whether to increment a revenue counter for the specific advertisement in response to the request; and
    when the number of times that access to the specific advertisement has previously been requested for the particular device is less than the revenue counting access limit, granting the user access to the specific advertisement in response to the request, and further sending a report to the server that access to the specific advertisement was provided;
    when the number of times that access to the specific advertisement has previously been requested for the particular device exceeds the revenue counting access limit, determining to not incrementing the revenue counter, granting the user access to the specific advertisement in response to the request, and further sending a report to the server that access to the specific advertisement was provided.

20. The one or more non-transitory computer-readable storage media of claim 19, wherein the instructions, when executed by the one or more computing devices, further cause granting access to the specific advertisement regardless of whether the revenue counter is incremented.

21. The one or more non-transitory computer-readable storage media of claim 19, wherein the specific advertisement comprises a discount coupon.

22. The one or more non-transitory computer-readable storage media of claim 19, wherein the instructions, when executed by the one or more computing devices, further cause not sending a report to the server that access to the specific advertisement was provided when the number of times that access to the specific advertisement has previously been requested at the particular device exceeds the revenue counting access limit for the specific advertisement.

23. The one or more non-transitory computer-readable storage media of claim 19, wherein the instructions, when executed by the one or more computing devices, further cause receiving the specific advertisement from the advertiser, wherein the advertiser is a third party advertiser.

24. The one or more non-transitory computer-readable storage media of claim 19, wherein the instructions, when executed by the one or more computing devices, further cause granting access to the specific advertisement by performing at least one of:
    requesting the specific advertisement from the server;
    browsing to a clicked link from which the specific advertisement may be obtained;
    display the specific advertisement to the user, the specific advertisement having been previously downloaded by the particular client.

25. The one or more non-transitory computer-readable storage media of claim 19, wherein number of times that access to the specific advertisement has previously been requested for the particular device is a number of times that access to the specific advertisement has previously been requested for the particular device over a specific period of time.

* * * * *